United States Patent [19]

Tanaka et al.

[11] Patent Number: 5,181,818
[45] Date of Patent: Jan. 26, 1993

[54] METHOD FOR SHIFTING GOODS AND APPARATUS THEREFOR

[75] Inventors: Nobuhiro Tanaka, Saitama; Hirotoshi Tawara; Eiji Hirata, both of Koshigaya, all of Japan

[73] Assignee: KAO Corporation, Tokyo, Japan

[21] Appl. No.: 672,339

[22] Filed: Mar. 20, 1991

Related U.S. Application Data

[62] Division of Ser. No. 341,856, Apr. 24, 1989, Pat. No. 5,020,965.

[30] Foreign Application Priority Data

| Apr. 28, 1988 | [JP] | Japan | 63-106168 |
| Jul. 21, 1988 | [JP] | Japan | 63-182050 |
| Nov. 21, 1988 | [JP] | Japan | 63-151583 |
| Dec. 26, 1988 | [JP] | Japan | 63-167860 |
| Jan. 23, 1989 | [JP] | Japan | 1-6305 |
| Jan. 24, 1989 | [JP] | Japan | 1-14776 |
| Jan. 26, 1989 | [JP] | Japan | 1-16927 |
| Jan. 30, 1989 | [JP] | Japan | 1-20584 |

[51] Int. Cl.$^5$ ............................................. B65G 65/23
[52] U.S. Cl. .................................... 414/414; 221/75
[58] Field of Search ............................ 414/403–405, 414/414; 221/75, 112, 114, 115, 153, 253

[56] References Cited

U.S. PATENT DOCUMENTS

| 1,110,256 | 9/1914 | Dalgleish | 414/405 |
| 1,214,302 | 1/1917 | Hamilton | 414/404 |
| 1,270,756 | 6/1918 | Holmberg | 414/404 |
| 2,074,383 | 3/1937 | Funk | 414/414 |
| 2,255,036 | 9/1941 | Gedge | 414/414 X |
| 2,407,402 | 9/1946 | Clem | 221/253 X |
| 2,664,218 | 12/1953 | Johnson et al. | 414/414 |
| 2,671,742 | 3/1954 | Cozzoli | 414/405 X |
| 2,727,641 | 12/1955 | Tomkins | 414/414 |
| 2,729,375 | 1/1956 | Pace | 414/404 X |
| 3,016,166 | 1/1962 | Fürst | 221/114 X |
| 3,067,891 | 12/1962 | Anderson | 414/414 |
| 3,199,694 | 8/1965 | Garney et al. | 414/414 |
| 3,518,752 | 7/1970 | Lentz | 414/405 X |
| 3,840,148 | 10/1974 | Fontana | 221/153 |
| 3,861,543 | 1/1975 | Elsworth | 414/414 X |
| 3,949,891 | 4/1976 | Butler et al. | 414/405 |
| 4,000,821 | 1/1977 | Naito et al. | 221/253 X |
| 4,244,673 | 1/1981 | Henderson | 414/405 |
| 4,431,361 | 1/1984 | Bayne | 414/405 |
| 4,455,117 | 6/1984 | Cartoceti | 414/414 X |
| 4,661,033 | 4/1987 | Worsham | 414/405 |
| 4,830,564 | 5/1989 | Walker et al. | 414/405 |
| 4,874,281 | 10/1989 | Bergerioux et al. | 414/404 X |
| 4,995,769 | 2/1991 | Berger et al. | 414/414 X |

FOREIGN PATENT DOCUMENTS

| 145461 | 12/1980 | German Democratic Rep. | 414/414 |
| 52-23147 | 6/1977 | Japan . | |
| 53-7875 | 3/1978 | Japan . | |
| 55-43873 | 11/1980 | Japan . | |
| 57-21842 | 12/1982 | Japan . | |
| 58-47220 | 3/1983 | Japan . | |
| 60-13615 | 1/1985 | Japan . | |
| 60-36911 | 3/1985 | Japan . | |
| 62-153017 | 7/1987 | Japan . | |
| 62-185604 | 8/1987 | Japan . | |
| 63-17702 | 1/1988 | Japan . | |

OTHER PUBLICATIONS

"(Material-handling and Machine) and Order Picking System Handbook", pp. 28–29, Niyaku Kenkyusho.

*Primary Examiner*—David A. Bucci

[57] ABSTRACT

A method for shifting goods in which goods arranged in a predetermined manner within a container having an opening portion are taken out of the container in such a manner as to correspond to the arrangement of the storing state of the goods. The method comprising the steps of superposing a goods take-out tool including partitions which are formed in such a manner as to correspond to the arrangement of the storing state of the goods on the opening portion of the container, and inverting the superposed container and goods take-out tool. The goods in the container can be taken into the goods take-out tool without changing the arrangement of the storing state of the goods.

22 Claims, 34 Drawing Sheets

| D(93-1) | D₁(93-1) | D₂(93-1) | Dw(93-1) |
|---------|----------|----------|----------|
| D(93-2) | D₁(93-2) | D₂(93-2) | Dw(93-2) |
| D(93-3) | D₁(93-3) | D₂(93-3) | Dw(93-3) |
| D(95-1) | D₁(95-1) | D₂(95-1) | Dw(95-1) |
| D(95-2) | D₁(95-2) | D₂(95-2) | Dw(95-2) |
| D(98)   | D₁(98)   | D₂(98)   | Dw(98)   |

99

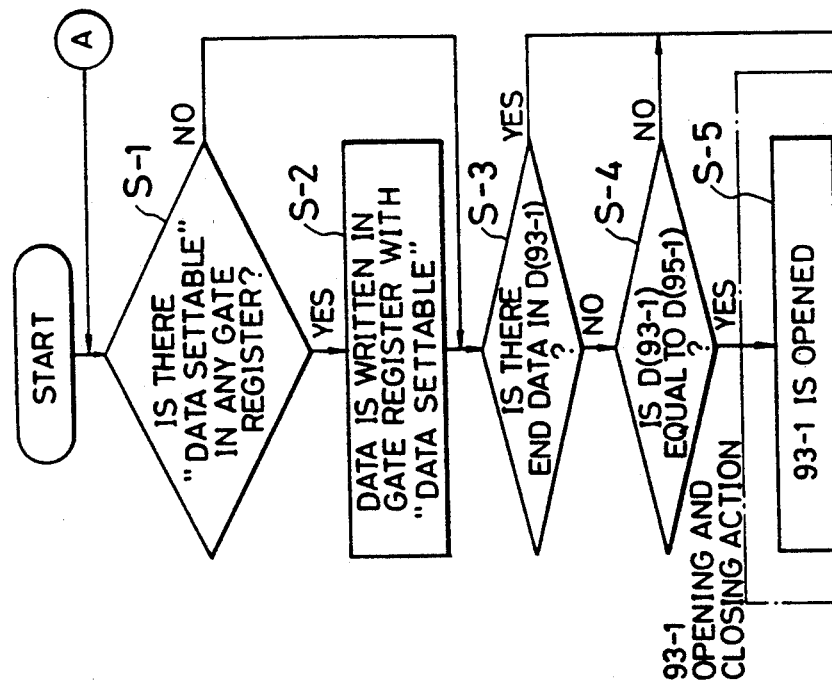

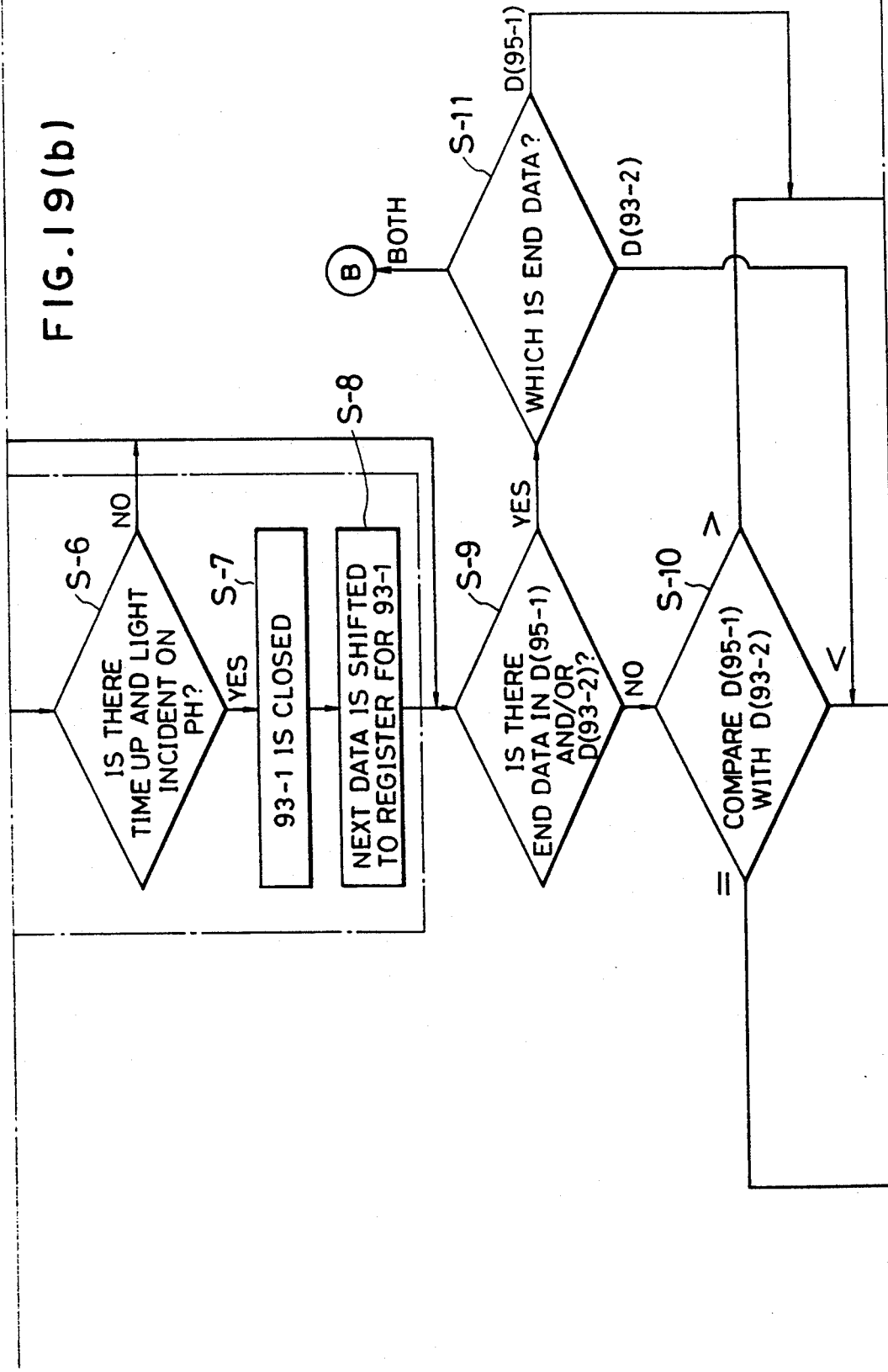

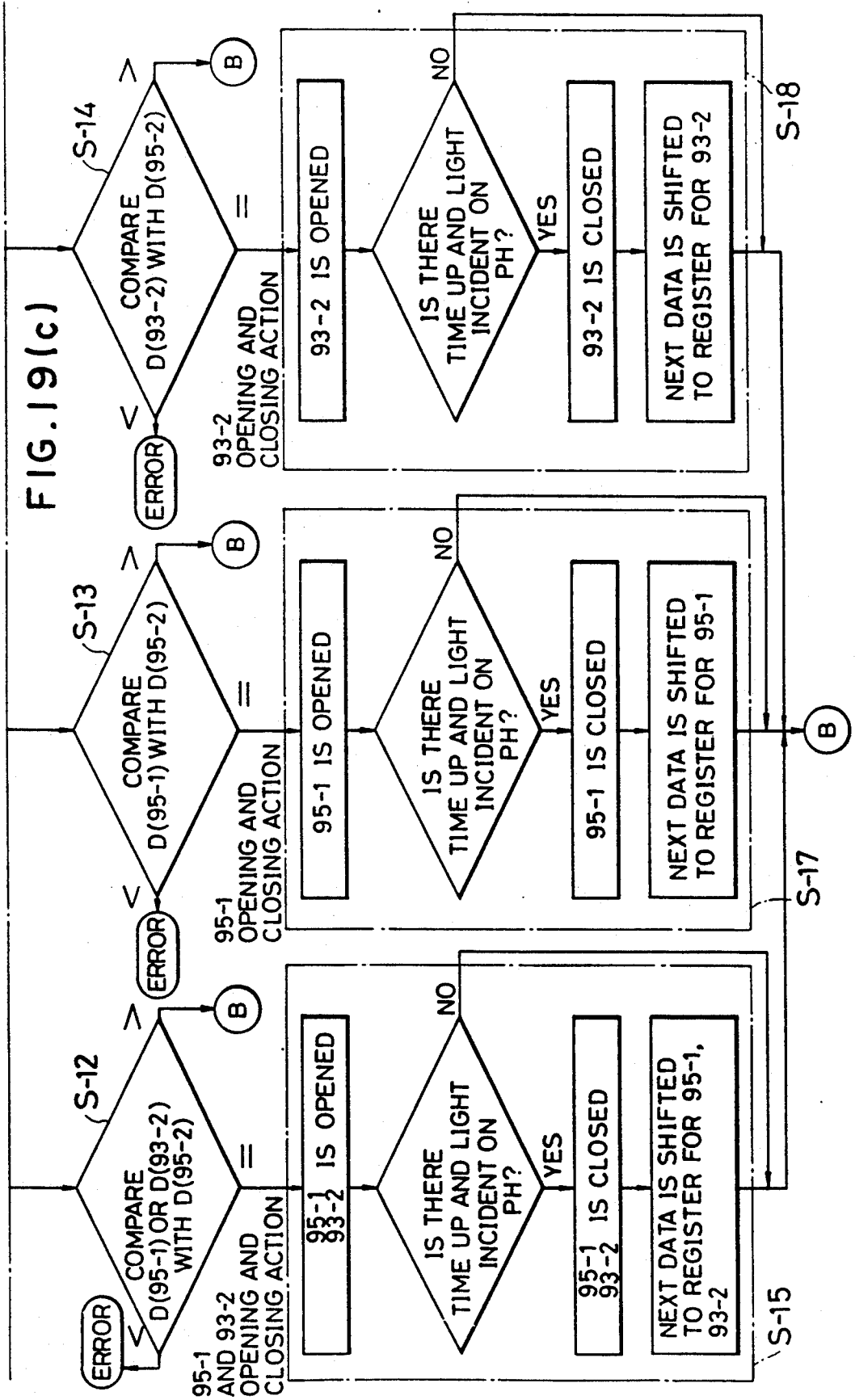

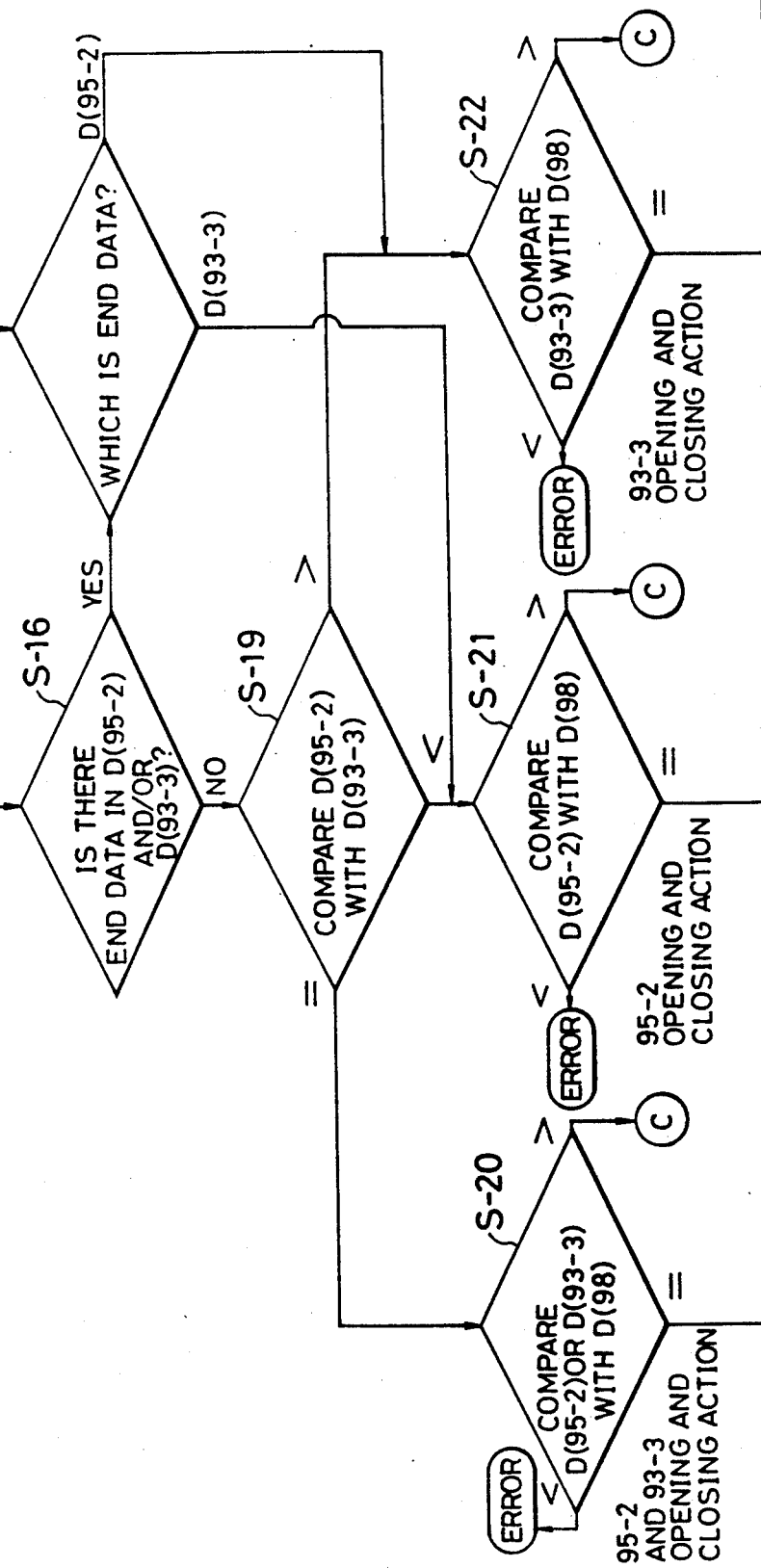

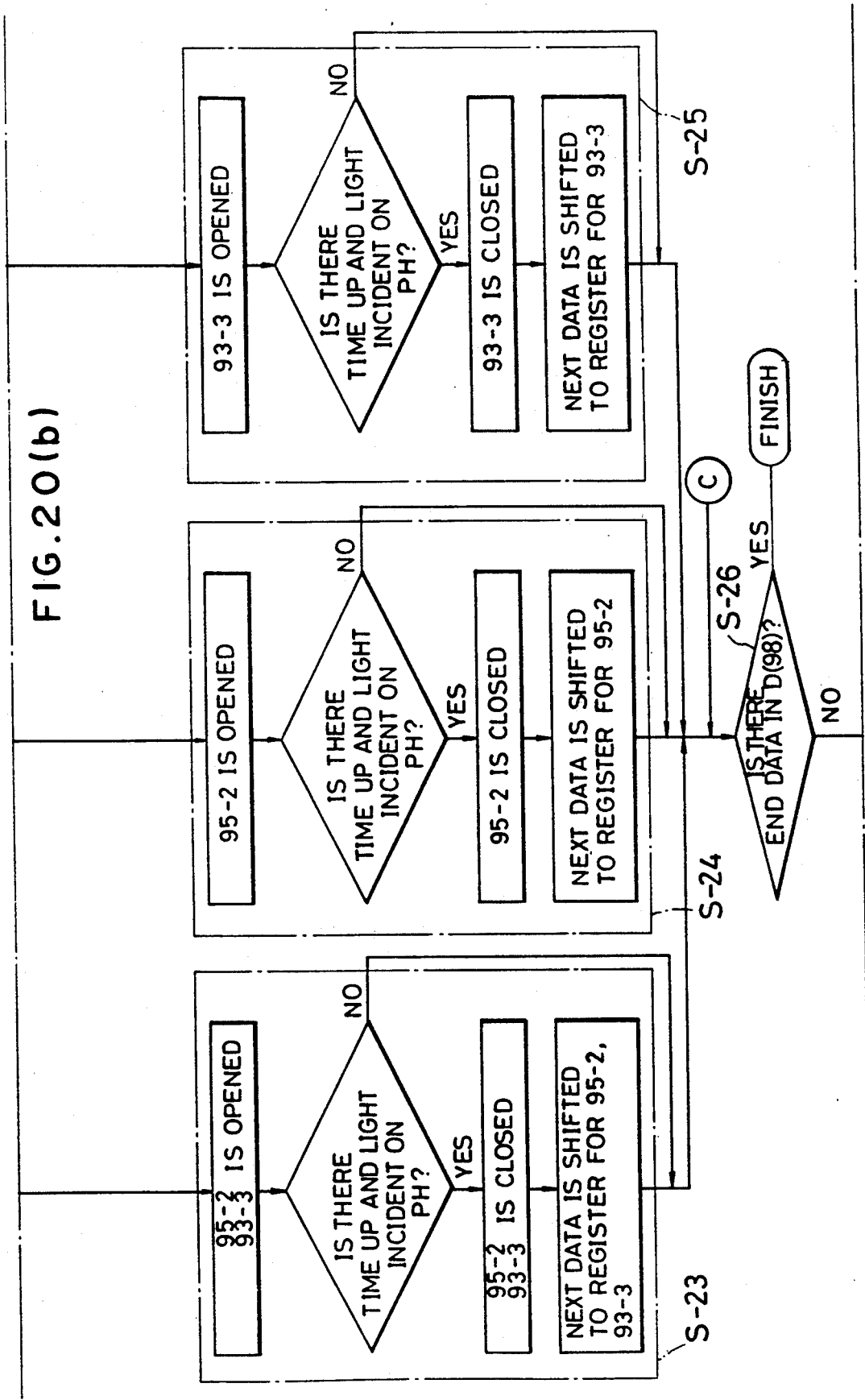

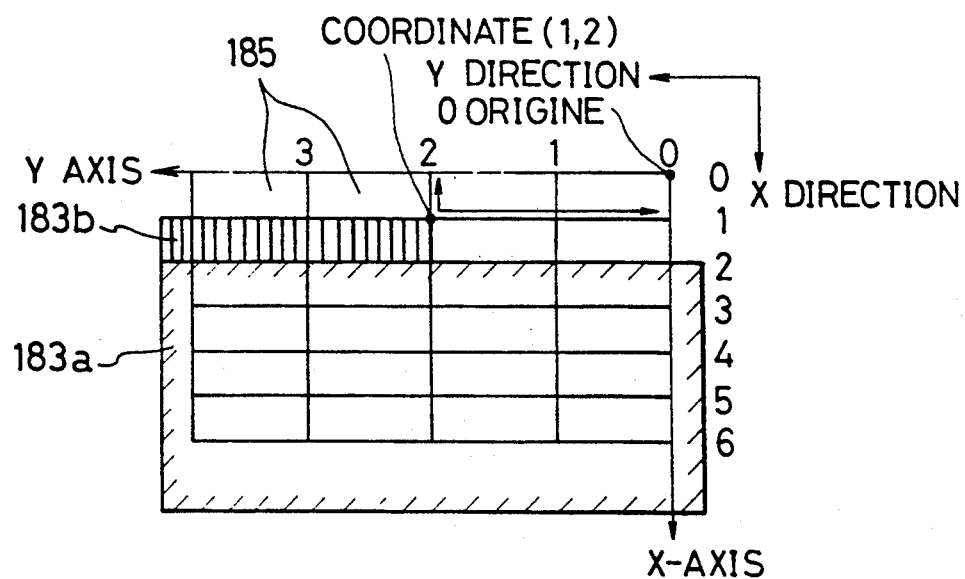
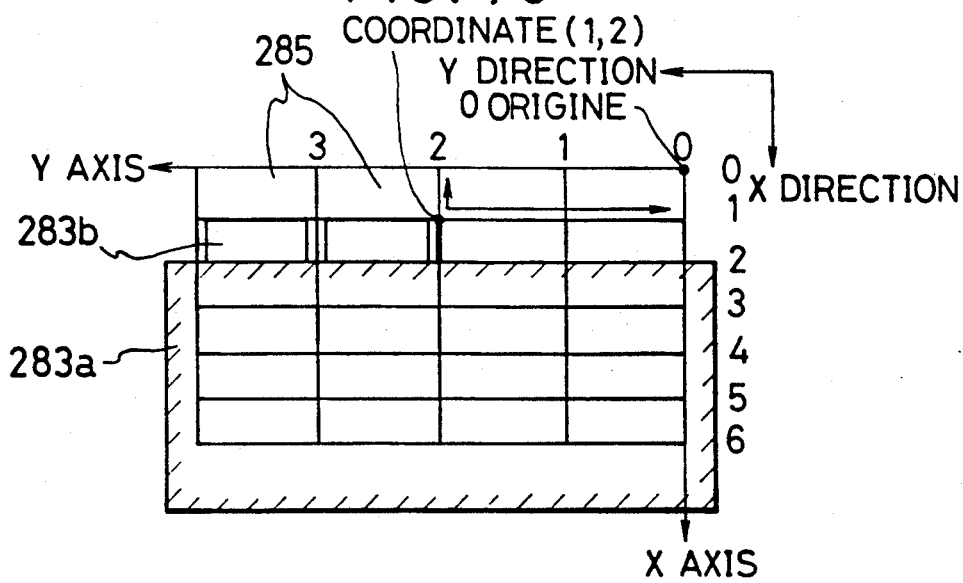

METHOD FOR SHIFTING GOODS AND APPARATUS THEREFOR

This application is a divisional of copending application Ser. No. 07/341,856, filed on Apr. 24, 1989, now U.S. Pat. No. 5,020,965.

BACKGROUND OF THE INVENTION

1. Field of the Invention

This invention relates to a method for shifting goods and an apparatus for carrying out the method in which goods are taken out of a container having an opening portion, such as a corrugated fiberboard box, a plastic container or the like, and particularly to a method for shifting goods and an apparatus for carrying out the method in which goods can be effectively and certainly taken out in such a manner as to correspond to the arrangement of goods contained in a container.

2. Description of the Prior Art

On the prior art relating to a method for shifting goods and an apparatus therefor, there have been known those as described in Japanese Patent Publication No. Sho 53-7875, Japanese Patent Early Laid-open Publication No. Sho 60-13615, Japanese Patent Early Laid-open Publication No. Sho 62-153017, Japanese Patent Publication No. Sho 55-43873, Japanese Utility Model Publication No. Sho 57-21842, etc.

In Japanese Patent Publication No. Sho 53-7875, there is described a method for encasing goods, in which a packing box including an inner partition has an open bottom so that goods can smoothly be encased through the open bottom. In Japanese Patent Early Laid-open Publication No. Sho 60-13615, there is described a guiding frame of a bottle packing machine, in which goods (bottles) are guided to a packing box or case and stored therein as one lot without disordering the arrangement of the goods. Also, in Japanese Patent Early Laid-open Publication No. Sho 62-153017, there is described an apparatus for orderly taking out goods which are transferred on the line without disordering the arrangement of the goods.

Also, in Japanese Patent Publication No. Sho 55-43873, there is described a manipulator, in which a plurality of goods can simultaneously be held or released by one driving system. In Japanese Utility Model Publication No. Sho 57-21842, there is described an uncaser (uncasing device) of the type in that goods arranged in several rows and stored within a delivery case are taken out and fed by a single row at a time.

However, the encasing method described in Japanese Patent Publication No. Sho 53-7875, the guiding frame described in Japanese Patent Early Laid-open Publication No. Sho 60-13615, or the apparatus for orderly taking out bottles, etc. described in Japanese Patent Early Laid-open Publication No. Sho 62-153017 merely discloses encasing techniques, etc. which are utilized at one stage of processes for producing goods. None of them discloses or even suggest that goods contained in a container are taken out in the form as arranged in the container. That is, in the method for encasing goods described in Japanese Patent Publication No. Sho 53-7875, it is impossible to shift goods contained in a container into the above-mentioned packing box in the form as orderly arranged in the container because the inner partitions of the packing box are not projected outside the packing box and therefore, the inner partitions cannot be inserted into the container which contains goods therein. Also, in the guiding frame described in Japanese Patent Early Laid-open Publication No. Sho 60-13615, although a guiding frame (partition) can be inserted between bottles (goods) which are held by a bottle holder, the goods contained in the container cannot be taken out because it is designed as such that the partitions must be inserted between the goods from the bottom side thereof. Also, in the apparatus for orderly taking out bottles, etc. which is described in Japanese Patent Early Laid-open Publication No. 62-153017, goods contained in a container having a side wall cannot be taken out of the container because a bottle arranging member must be horizontally moved in order to take out the goods according to this apparatus.

Also, in the manipulator described in Japanese Patent Publication No. Sho 55-43873 or in the uncaser for taking out and feeding goods arranged in several rows within a container by each row at a time described in Japanese Utility Model Publication No. Sho 57-21842, since a plurality of goods contained in a container is held, one each at a time, by a chucking head, any disorderly arrangement of the goods within a container makes it impossible for the chucking head to hold goods for shifting.

Also, as the prior art relating to an apparatus for shifting goods, there have been known those disclosed in a printed matter titled "[Material-handling and Machine] an order picking system handbook" (hereinafter referred to as the "literature 1"), extra edition issued by Niyaku Kenkyusho (Japan Material-handling Laboratory) on Oct. 1, 1981, Japanese Patent Early Laid-open Publication No. Sho 62-185604, etc. In FIG. 2 on page 29 of the literature 1, there is illustrated a gravity flow rack (goods racking apparatus) having racking spaces intermittently arranged along an outlet conveyor. Also, in Japanese Patent Early Laid-open Publication No. Sho 62-185604, there is described an automatic warehouse (automatic storage & retrieval system) including two moving apparatuses (goods transfer apparatus), end portions of moving paths (traveling path) thereof being overlapped with each other, and a storing rack (goods racking apparatus) having storing portions (racking spaces) continuously disposed at both sides along the traveling path.

However, the apparatus described in the literature 1 and the automatic warehouse described in Japanese Patent Early Laid-open Publication No. Sho 62-185604 do not describe or even suggest that goods are shifted from a goods racking apparatus such as storing facilities, etc. to another goods racking apparatus such as goods take-out apparatus, etc. with a traveling path disposed therebetween. And, in the automatic warehouse described in Japanese Patent Early Laid-open Publication No. Sho 62-185604, any of the goods racking apparatuses disposed at both sides of the traveling path has racking spaces continuously disposed and goods are taken in and out of the racking spaces at both sides of the traveling path by the respective goods transfer apparatuses. Therefore, there is a high degree of possibility that the adjacent goods transfer apparatuses enter into an interference zone with each other. Therefore, it frequently occurs that one of the goods transfer apparatuses must wait until the adjacent other goods transfer apparatus comes out of the interference zone. Thus, the working efficiency for transferring goods is lowered.

Also, as the prior art relating to a method for taking out goods which have been shifted during the goods shifting work and an apparatus for carrying out the method, there has been known one described in Japanese Patent Early Laid-open Publication No. Sho 58-47220, etc. In this Publication, there is described an automatic weighing apparatus comprising an opening and closing shutter disposed proximate to an upper surface of a series of containers which are to be carried to a predetermined position, and a timing hopper provided with the same number of pooling spaces for objects to be weighed with respect to the number of the containers formed in such a manner as to correspond to the respective containers of said series of containers by serving the opening and closing shutter as a bottom surface thereof, the opening and closing shutter being moved to feed the objects to be weighed and pooled in the respective pooling spaces to the corresponding containers.

However, in the automatic weighing apparatus described in Japanese Patent Early Laid-open Publication No. Sho 58-47220, the objects to be weighed and pooled in a plurality of pooling spaces can be taken out and brought into the corresponding containers. However, since the opening and closing shutter is formed of one sheet plate, the goods (objects to be weighted) contained (pooled) in the respective goods storing portions (pooling spaces) are taken out all at a time, and the goods (objects to be weighted which are pooled) cannot be taken out by a desired number (pooling spaces) at a time.

Also, as the prior art relating to a goods feeding apparatus in which goods shifted are fed to a desired storing box, there has been known one described in Japanese Patent Publication No. Sho 52-23147, etc. In this Publication, there is described a spiral chute including a plurality of the paths for throwing in (chutes) so that goods fed into the chutes are transferred (slid) downward.

However, in the spiral chute described in the above-mentioned Publication, the goods which have been carried into the plurality of the paths for throwing in (chutes) cannot be stored midway in the paths for throwing in (chutes) and/or on the respective goods transfer paths of the spiral chute. Also, since the goods cannot be stored midway in the paths for throwing in (chutes) and/or on the respective transferring paths of the spiral chute, in case that goods are to be fed to a plurality of storing boxes, whenever a required number of the goods must be carried into the spiral chute through the paths for throwing in (chutes) in order to be fed to each of the plurality of storing boxes. Therefore, in case that the goods are to be fed to a plurality of storing boxes, etc. through one spiral chute, it must be started every time from the beginning state where goods are fed to the chutes. Therefore, there is the possibility of a waste of time for feeding goods to storing boxes, etc.

Also, as the prior art relating to a spiral chute which is to be used in a goods feeding path, there has been known those described in Japanese Utility Model Early Laid-open Publication No. Sho 60-36911, Japanese Patent Publication No. Sho 52-23147, etc. In Japanese Utility Model Early Laid-open Publication No. Sho 60-36911, there is described a shock absorbing apparatus comprising a cushion member disposed on a surface on which goods are to be dropped. Also, in Japanese Patent Publication No. Sho 52-23147, there is described a spiral chute which is spiraled leftward, the direction in which goods packed in a box-shape are to be slid.

However, the shock absorbing apparatus described in Japanese Utility Model Early Laid-open Publication No. Sho 60-36911 aims at absorbing the shock when goods are dropped, so as to prevent possible breakage of the goods. It merely has the function for absorbing the shock occurrable when goods are dropped onto the chute. However, no consideration is given to a point for preventing possible damages which are likely to occur to the outer surfaces of goods when they are slid down. Also, it does not describe nor even suggests that bottle-shaped goods are to be slided.

Also, in a spiral chute described in Japanese Patent Publication No. Sho 52-23147, since its sliding surface is not provided with a hair rising portion, possible damages on the outer surface of goods during sliding cannot be prevented. Also, this Publication does not describe nor even suggest that goods having a piece threadedly engaged with a screw portion are slid at random and such goods are slid by taking into consideration the spiraled direction of the spiral chute and the threadedly engaging direction of the piece so that the piece will not be loosened.

Also, as goods transfer apparatus for recovering empty containers from which goods have been shifted, there has been known one described in Japanese Patent Early Laid-open Publication No. 63-17702, etc. In this Publication, there is described the facilities for an automatic warehouse including a take-in and take-out apparatus which comprises a traveling machine body being able to travel along a plurality of divided storing spaces, a lifting table mounted on the traveling machine body, a take-in and take-out device mounted on the lifting table, a holding device for holding a container on the take-in and take-out device, an inverting device for inverting the holding device, etc.

However, since the facilities for automatic warehouse are designed as such that when the parts (goods) contained in the container have been taken out and fed into a hopper, the empty container is transferred to a container receiving table which is disposed at an end position of the divided storing spaces by means of the traveling machine body and the upward and downward movement of the lifting table and discharged, much time is required for discharging the empty container. Since the next container cannot be taken out and fed to the hopper in the meantime, overall working ability including the discharging of the empty container is extremely lowered.

The present invention has been accomplished in order to overcome the shortcomings inherent in the prior art.

SUMMARY OF THE INVENTION

It is therefore a first object of the present invention to provide a method for shifting goods in which goods arranged in a predetermined manner within a container having an opening portion such as a corrugated fiberboard box, a plastic container, etc. are taken out of the container in such a manner as to correspond to the arrangement of the storing state of the goods.

A second object of the present invention is to provide a goods shifting apparatus suitable for carrying out the above-mentioned method for shifting goods.

A third object of the present invention is to provide a goods shifting apparatus in which, even when the apparatus is provided with a plurality of goods transfer apparatuses, when the adjacent goods transfer apparatuses are moved, the probability that they interfere with each other is lowered and in which goods can be shifted with high efficiency.

A fourth object of the present invention is to provide a goods take-out tool which can be suitably used for the goods shifting apparatus.

A fifth object of the present invention is to provide a goods take-out method in which goods stored in a plurality of goods storing portions can be taken out by a desired number at a time through the goods take-out tool.

A sixth object of the present invention is to provide a goods take-out apparatus which is suitable for carrying out the above-mentioned goods take-out method.

A seventh object of the present invention is to provide a goods feeding apparatus in which the goods taken out of a container by the goods take-out apparatus can be effectively and smoothly fed to a storing box, etc. without a time loss.

An eighth object of the present invention is to provide a spiral chute in which bottle-shaped goods can be smoothly slid without causing any damage on their surfaces.

A ninth object of the present invention is to provide a spiral chute in which goods having a piece threadedly engaged with a screw portion can be smoothly slid without causing any damage on their outer surfaces and without causing the piece to be loosened.

The tenth object of the present invention is to provide a transfer apparatus in which empty containers having an opening portion such as corrugated fiberboard boxes, plastic containers, etc. and from which goods have been taken out can be taken out and discharged at position where the goods have been taken out while maintaining a traveling body and a lifting table in their stopped state.

The first object of the present invention can be achieved by providing a method for shifting goods in which goods arranged in a predetermined manner within a container having an opening portion are taken out of the container in such a manner as to correspond to the arrangement of the storing state of the goods, the method comprising the steps of superposing goods take-out tool including partitions which are formed in such a manner as to correspond to the arrangement of storing state of the goods on the opening portion of the container; and inverting the superposed container and goods take-out tool and taking out the goods contained in the container into the goods take-out tool without changing the arrangement of the storing state of the goods.

The second object of the present invention can be achieved by providing an apparatus for shifting goods in which goods arranged in a predetermined manner within a container having an opening portion are taken out of the container in such a manner as to correspond to the arrangement of the storing state of the goods, the apparatus comprising a goods take-out tool including partitions for separating the goods contained in the container according to the arrangement of the storing state of the goods by inserting foremost ends of the partitions into the opening portion of the container;

a superposing device for superposing the goods take-out tool on the container by inserting the foremost ends of the partitions of the goods take-out tool into the container through the opening portion; and an inverting device for inverting the superposed container and goods take-out tool and taking out the goods of the container into the goods take-out tool in accordance with the partitions.

That is, according to a method for shifting goods and an apparatus therefor, by inverting a goods take-out tool and a container after superposing the goods take-out tool on an opening portion of the container, goods which are arranged in a predetermined manner within a container having an opening portion such as a corrugated fiberboard box, a plastic container, etc. can be taken out of the container in such a manner as to correspond to the arrangement of the storing state of the goods within the container.

The third object of the present invention is to provide a goods shifting apparatus including a plurality of goods transfer apparatuses being able to travel on a traveling path, and goods racking apparatuses respectively disposed at both sides of the traveling path, goods being shifted between the goods racking apparatuses disposed at said both sides by the goods transfer apparatuses, the goods racking apparatus at one side including racking spaces continuously formed along the traveling path, the goods racking apparatuses at the other side including racking spaces formed by intermittently interposing spaces along the traveling path, an interference control zone for preventing collision between the adjacent goods transfer apparatuses being provided at a part of the traveling path opposite the space within the goods racking apparatus at said other side.

Also, according to a goods shifting apparatus including a plurality of goods transfer apparatuses according to the present invention, one of the goods racking apparatuses disposed at both sides of a traveling path is provided with racking spaces formed by intermittently interposing spaces along the traveling path and a part of the traveling path of the goods transfer apparatus opposite the space is provided with an interference control zone. Accordingly, when the adjacent goods transfer apparatuses are caused to travel, the probability of an occurrence of collision between these goods transfer apparatuses can be lowered and goods can be shifted with a high efficiency.

The fourth object of the present invention is to provide a goods take-out tool in which goods arranged in a predetermined manner within a container having an opening portion are taken out in such a manner as to correspond to the arrangement of the storing state of the goods, the tool comprising partitions for separating the goods contained in the container according to the arrangement of the storing state of the goods by inserting its foremost ends into the opening portion of the container; and a shutter being able to open and close in a basic end portion side of the partitions.

Also, according to the goods take-out tool of the present invention, goods arranged in a predetermined manner within a container having an opening portion such as a corrugated fiberboard box, a plastic container, etc. can be taken out of the container in such a manner as to correspond to the arrangement of the storing state of the goods with ease and with a high efficiency.

A fifth object of the present invention can be achieved by providing a goods take-out method which includes goods storing portions arranged in a matrix shape including n pieces of line and shutters opening and closing an opening portion of said goods storing portions, a desired number of goods being taken out by moving the shutter, said method being characterized in that after the total number of goods taken out is converted from a decimal number (base 10 number) to n-ary number (base n number), the shutter is moved with reference to the numeral value shown by the n-ary number (base n number) converted, thereby to take out a desired number of goods in succession.

The sixth object of the present invention can be achieved by providing a goods take-out apparatus comprising a plurality of goods storing portions disposed in a matrix shape, a first shutter and a second shutter for opening and closing an opening portion of the goods storing portions, and driving mechanisms for driving the first shutter and the second shutter respectively, one of said first and second shutters being able to move in the line direction and the other being able to move in the row direction.

Also, according to a method for taking out goods and an apparatus therefor of the present invention, a shutter is moved along the opening portions of the goods storing portions arranged in the line direction and in the row direction according to a desired number and goods stored in goods storing portions arranged in a matrix shape including n pieces of line can be taken out by a desired number. That is, after the total number of the goods taken out is converted from a decimal number (base 10 number) to an n-ary number (base n number) corresponding to n showing the number of lines of the goods storing portions, the opening portions of the goods storing portions are opened and closed with reference to the numerical value shown in the n-ary number (base n number) converted, thereby a desired number of goods can be taken out rapidly and with a high efficiency.

A seventh object of the present invention can be achieved by providing a goods feeding apparatus including a spiral chute and a chute for sliding goods onto the spiral chute; said chute being provided with a gate, said spiral chute being provided in the midway of a goods sliding path at an upstream side of the chute with an intermediate gate which forms a pair with the gate, a control apparatus being provided for controlling the opening and closing operation of the gate and the intermediate gate.

Also, according to the goods feeding apparatus of the present invention, the goods taken out of a container such as a corrugated fiberboard, a plastic container, etc. can be smoothly fed into a storing box, etc. without a time loss and with a high efficiency.

An eighth object of the present invention can be achieved by providing a spiral chute for sliding bottle-shaped goods at random wherein said spiral chute is provided on its sliding surface with a seat having a hair tufted portion.

A ninth object of the present invention can be achieved by providing a spiral chute for sliding goods having a piece threadedly engaged with a screw portion at random, wherein a sliding surface of said spiral chute is spiraled in the opposite direction with respect to the threadedly engaging direction of said screw portion of the goods and said sliding surface is provided with a seat having a tufted portion.

Also, according to a spiral chute of the present invention, goods having a piece threadedly engaged with a screw portion can smoothly be transferred without damaging their surfaces and without loosening the member.

The tenth object of the present invention can be achieved by providing a transfer apparatus comprising a traveling table provided with a container transfer apparatus for transferring a container with goods contained therein from storing facilities and an inverting device for inverting the container which has been transferred onto the container transfer apparatus and a traveling table being able to travel toward the storing facilities, a lifting table for movably supporting the traveling table, and a traveling body for vertically movably supporting the said lifting table, said traveling table and said traveling body being disposed as such that they travel in the generally perpendicular directions with respect to each other, said lifting table being provided with a passage for the container to be dropped and discharged therethrough.

Also, according to a transfer apparatus of the present invention, since an empty container having an opening portion such as a corrugated fiberboard, a plastic container, etc., out of which goods have been taken, can be taken out and discharged at position where the empty container has been taken out, the empty container can be effectively discharged and the transferring performance can greatly be increased as a whole.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 11 and FIG. 12 respectively are front views looked from a traveling rail side, for explaining the arrangement of goods which are to be racked in take-out compartments of a gravity flow rack and goods drop-out devices;

FIG. 17 and FIG. 18 are illustrations for explaining the arrangement of gates of a chute and intermediate gates of a spiral chute and the register of a sequencer;

FIGS. 19a–19c and 20a–20c are flow charts showing a method for open and close controlling a gate and intermediate gates;

FIG. 35 and FIG. 36 are schematic views showing the moving state of the shutters in the embodiment of FIG. 33;

FIG. 40 is a schematic plan view showing the moving states of the first and the second shutters of FIG. 38;

DETAILED DESCRIPTION OF THE PREFERRED EMBODIMENT

One embodiment of a goods shifting apparatus suitable for carrying out a goods shifting method according to the present invention will now be described first. This embodiment is suitable for taking out goods such as bottles, boxes, bags, etc. from a container having an opening portion, such as a corrugated fiberboard box, a plastic container, etc. and feeding the goods into a storing box, etc. for assembling and storing.

Figure 1:
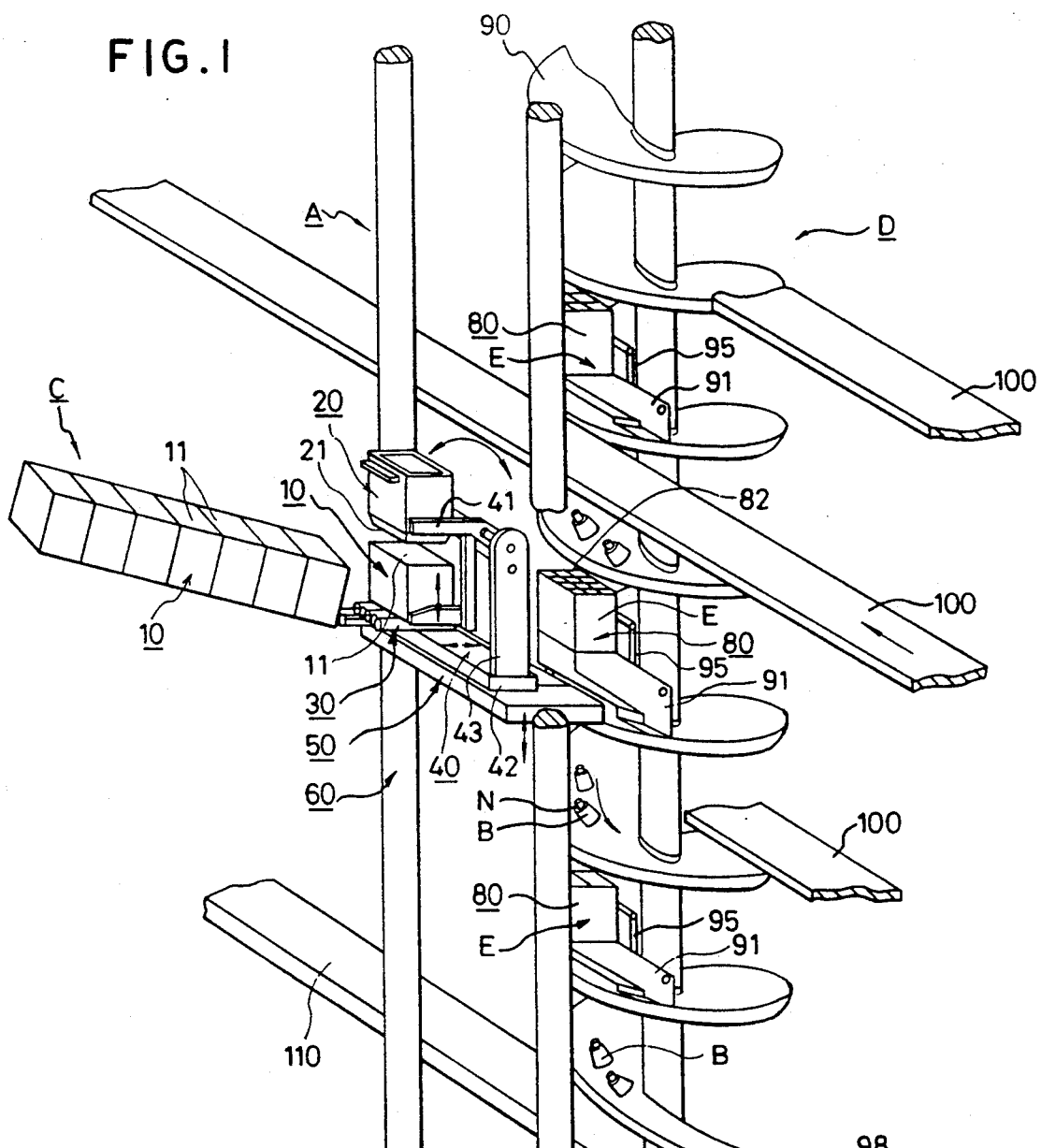
FIG. 1 is a perspective view showing one embodiment of a goods shifting apparatus according to the present invention.
Figure 2:
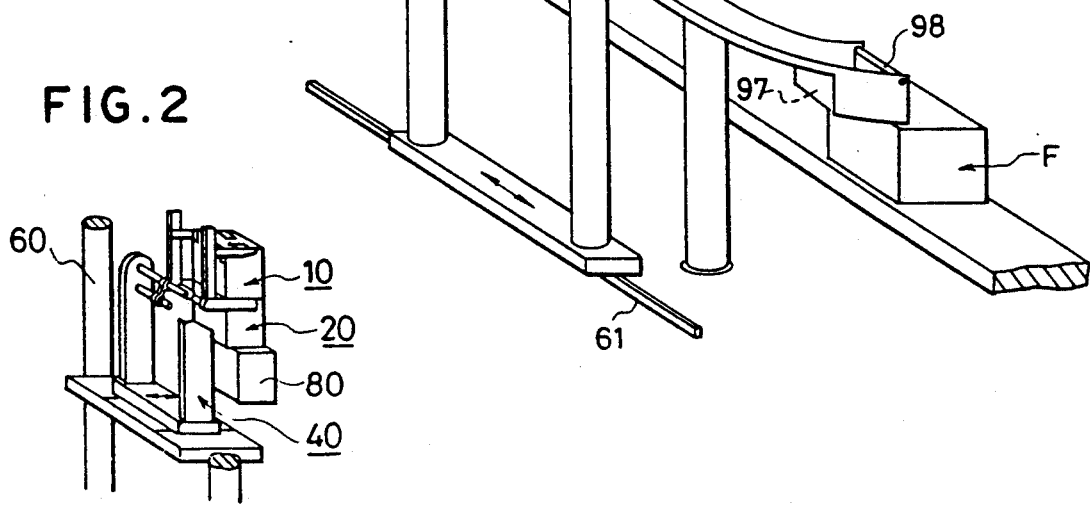
FIG. 2 is a perspective view showing a container and a goods take-out tool already inverted to a goods drop-out device side by an inverting device of the goods shifting apparatus.
Figure 3:
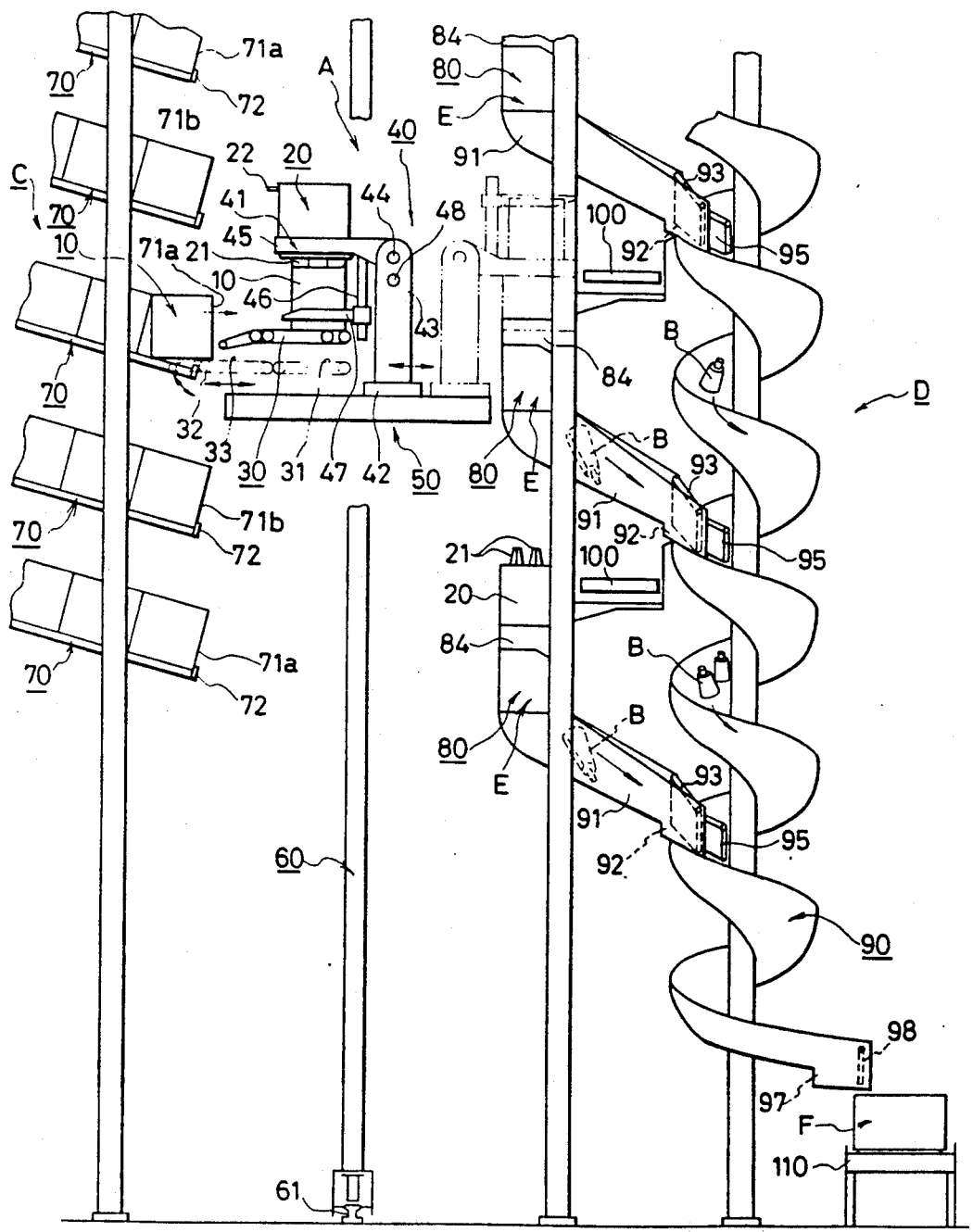
FIG. 3 is a side view of FIG. 1.

FIG. 1 and FIG. 2 are perspective views showing one embodiment of a goods shifting apparatus. FIG. 1 is an illustration showing a whole picture of the goods shifting apparatus, whereas FIG. 2 is an illustration showing a container and a goods take-out tool inverted to a goods drop-out device side by an inverting device of the goods shifting apparatus. FIG. 3 is a side view of FIG. 1.

In the goods shifting apparatus of this embodiment, a goods transfer apparatus A, as shown in FIG. 1 and FIG. 3, takes out a container 10 from storing facilities C for storing goods B and shifting only the goods B from the container 10 to a goods take-out apparatus E through an inverting device 40. The goods transfer apparatus A is disposed between the storing facilities C and the goods take-out apparatus E. Also, all of the goods B contained in the container 10 are shifted once into the goods take-out apparatus E and thereafter, a desired number of the goods B are taken to a goods feeding apparatus D from the goods take-out apparatus E, and then the goods B taken out are fed into a storing box F.

Figure 4:
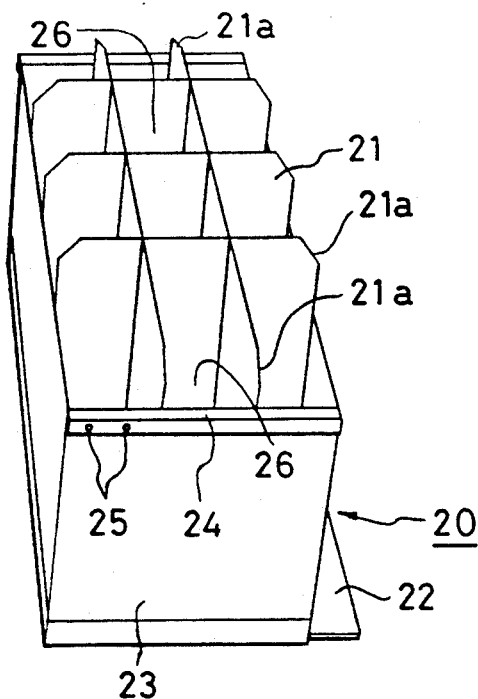
FIG. 4 is a perspective view showing a goods take-out tool forming the goods shifting apparatus.
Figure 5:
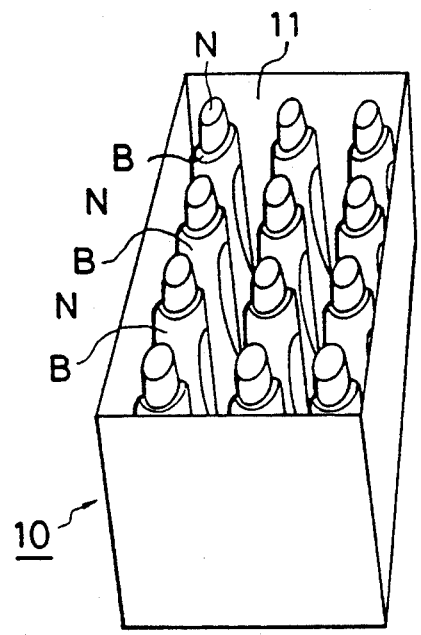
FIG. 5 is a perspective view showing a container with goods contained therein.

The goods transfer apparatus A comprises a goods take-out tool 20 which is provided with partitions 21 corresponding to the arrangement of a plurality of the goods B contained in the container 10 and adapted to individually separate the goods B as shown in FIG. 4 and FIG. 5, a container take-out device 30 for taking out the container 10 from the storing facilities C as shown in FIG. 1 and FIG. 3, an inverting device 40 including a superposing device 41 for superposing the goods take-out tool 20 and the container 10, a lifting table (carriage) 50 provided with the inverting device 40 mounted thereon, and a traveling body (stacker crane) 60 for vertically movably supporting the carriage 50.

Figure 10:
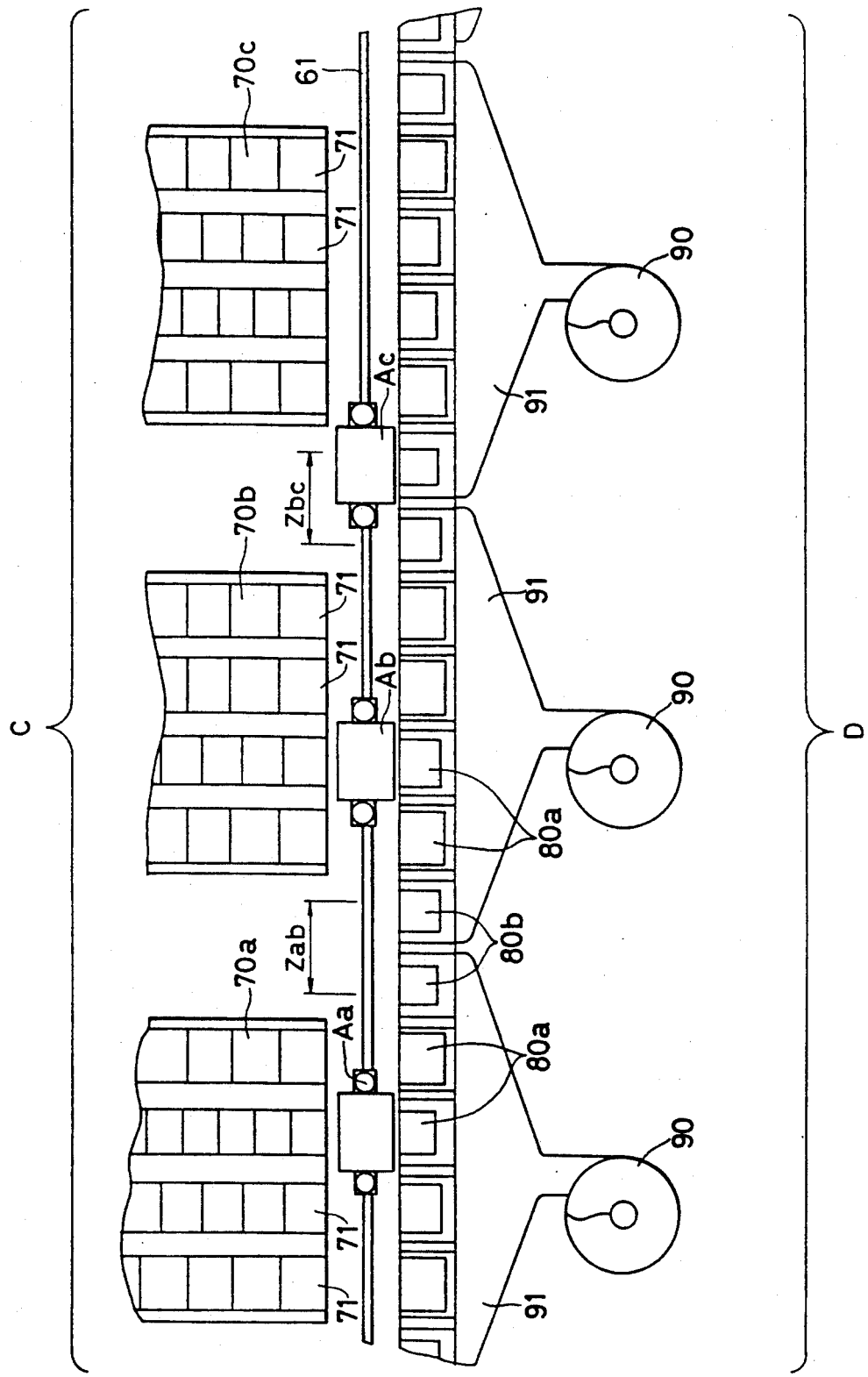
FIG. 10 is a plan view of FIG. 1.

Also, as is shown in FIG. 10, the storing facilities C are disposed opposite the goods feeding apparatus D with a traveling path (traveling rail) 61 disposed therebetween and include gravity flow racks 70 having a multirow and a multistage storing sections, as will be described, disposed along the traveling rail 61 at a plurality of spaces intermittently. Also, the goods feeding apparatus D chiefly comprises a spiral chute 90 provided with a goods drop-out device 80 continuously formed along the traveling rail 61.

Each of the above-mentioned component elements will now be described.

Firstly, the goods take-out tool 20, the container take-out device 30, the inverting device 40, etc. which form the goods transfer apparatus A will be described with reference to FIG. 1 and FIG. 2.

Figure 6:
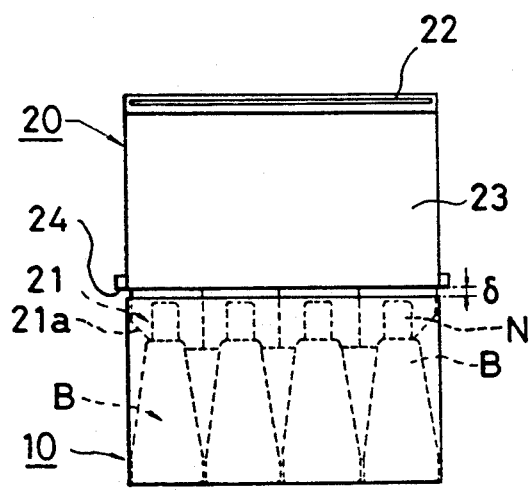
FIG. 6 is a front view showing the goods take-out tool of FIG. 4 which is already superposed on the container of FIG. 5 by a superposing device.
Figure 7:
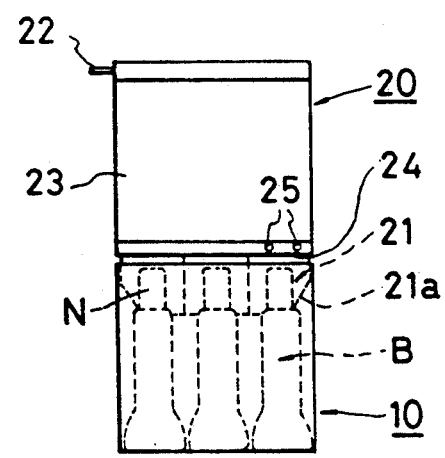
FIG. 7 is a side view of FIG. 6.

The goods take-out tool 20, as shown in FIG. 4, is formed as a transferable casing 23 which is provided with partitions 21, a shutter 22, etc., the foremost end portion of the partitions 21 projecting outward from a basic portion 24 along an opening edge of the transferable casing 23 of the goods take-out tool 20. And, if the projected foremost end portion of the partitions 21, as shown in FIG. 6 and FIG. 7, is inverted to the opening portion 11 side of the container 10 in order to superpose the goods take-out tool 20 on the container 10, the foremost end of the partitions 21 will come to a position lower than the shoulder portions of the goods B. In the superposed state, the partition 21, as shown in FIG. 4, separates as a goods storing portion 26 for individually storing the goods B therein according to the arrangement (four lines x three rows) of the goods B contained in the container 10 and is provided at its external end portion with a chamfering 21a in order to enhance an easy introduction of the goods take-out tool 20 into the opening portion 11 of container 10. Also, the shutter 22 is formed of one sheet plate and open- closably mounted with respect to the basic end portion side of the goods take-out tool 20 so that all of the goods B can be shifted to goods take-out apparatus E simultaneously. After the goods B have been shifted to the goods take-out apparatus E from the goods take-out tool 20, the goods B are fed to the storing box F through a chute 91 and the spiral chute 90 in order to assemble and store the goods in the storing box F.

The container take-out device 30, as shown in FIG. 3, comprises a pantagraph type lifting device (not shown) disposed on the carriage 50 of the stacker crane 60, a fixed conveyor 31 mounted on the said lifting device, and a slidable conveyor 33 being vertically swingable about a pivotal point 32 at the container take-out side and being slidable in such a manner as to advance into the gravity flow rack 70.

Also, the inverting device 40 comprises a traveling table 42 for traveling in the flowing direction of the container 10 stored in the gravity flow rack 70 on the carriage 50 of the stacker crane 60, i.e., in the forward and backward direction with reference to the gravity flow rack 70, a frame 43 erected upward from the upper surface of the traveling table 42, a rotary shaft 44 supported in the vicinity of an upper end of the frame 43, a first holding hand 45 which is opened and closed in the axial direction (hereinafter referred to as the "right and left direction") of the rotary shaft 44 and adapted to hold the goods take-out tool 20, a guide member 46 extending down to the vicinity of the rotary shaft 44 side of the first holding hand 45, and a second holding hand 47 which, in the state holding the container 10, is moved upward and downward along the guide member 46 to superpose the container 10 on the goods take-out tool 20 held by the first holding hand 45. Of these component elements, the first and the second holding hands 45 and 47 and the guide member 46 form the superposing device 41, and the superposing device 41 is integrally caused to pivot about the rotary shaft 44 by the inverting device 40. The first holding hand 45 is opened and closed by a revolution of a screw shaft 48 which is supported by the frame 43 in such a manner as to be parallel with the rotary shaft 44 and which is formed on the right half thereof from its center with a right screw and on the left half thereof with a left screw in such a manner as to be symmetric with each other. Also, the first holding hand 45 is provided on its inner side with an engaging projection (not shown) for engaging in an engaging recess 25 (see FIG. 4) formed in the vicinity of the basic portion 24 at each side of the opening end of the goods take-out tool 20 so that the first holding hand 45 can firmly hold the goods take-out tool 20 and so that the goods take-out tool 20 is not literally dropped during the inverting action. Also, the second holding hand 47 is formed of a parallelogram-like link mechanism (not shown) having, as one side thereof, a holding hand base which is moved upward and downward along the guide member 46 and is moved in the right and left direction unitl it forms a desired space for holding the container 10. Also, the guide member 46 is provided at its inner side with a screw shaft (not shown) so that the second holding hand 47 is moved upward and downward by means of the actuation of the screw shaft.

Furthermore, the stacker crane 60 is designed in such a manner as to travel on the traveling rail 61 which is disposed along the take-out compartments 71 of each gravity flow rack 70 arranged among spaces. The stacker crane 60 is provided with the container take-out device 30 and the inverting device 40 mounted on the carriage 50 as such that the devices 30 and 40 can be moved upward and downward.

Next, there will be described the gravity flow rack 70 forming the storing facilities C, the goods drop-out device 80 forming the goods take-out apparatus E, etc.

The storing facilities C include, as described in the foregoing, racking spaces, i.e., a plurality of sets of gravity flow racks 70a, 70b, ... disposed at spaces along the traveling rail 61 (see FIG. 10). And, the traveling rail 61 is provided at its portion opposite a space formed between the adjacent gravity flow racks 70a and 70b with an interference control zone $Z_{ab}$ for preventing the collision between the adjacent goods transfer apparatuses Aa and Ab. Likewise, the traveling rail 61 is provided at its portion opposite a space formed between the adjacent gravity flow racks 70b and 70c with an interference control zone $Z_{bc}$ for preventing the collision between the adjacent goods transfer apparatuses Ab and Ac.

Also, the storing facilities C, as described in the foregoing, include a plurality of sets of gravity flow racks 70a, 70b, ... disposed among spaces along the traveling rail 61. Each of the gravity flow racks 70a, 70b, ... comprises an inclination roller conveyor of a plurality of rows and a plurality of stages continuously formed along the traveling rail 61 and is provided on its inclined front end with a take-out compartment 71. The inclination roller conveyor is provided on its front end portion with a stopper 72. Due to the foregoing arrangement, the container 10 fed is slid downward along the inclination roller conveyor by its own weight and retained by the stopper 72. And, the take-out compartment 71 comprises a main take-out compartment 71a disposed opposite the goods drop-out device 80, as will be described, with the traveling rail 61 placed therebetween, and an auxiliary take-out compartment 71b disposed between the adjacent main take-out compartments 71a in such a manner as to be opposite the goods drop-out device 80 with the traveling rail 61 placed therebetween with a step difference. In other words, the auxiliary take-out compartment 71b is not opposite the goods drop-out device 80 (see FIG. 3 and FIG. 11).

Also, the goods drop-out devices 80 of the goods take-out apparatus E, as shown in FIG. 10, are continuously disposed along the traveling rail 61. The goods drop-out device 80 comprises main goods drop-out devices 80a disposed opposite to the gravity flow racks 70, and auxiliary goods drop-out devices 80b disposed opposite a portion where the gravity flow racks 70 are not disposed. In other words, the auxiliary goods drop-out devices 80b are disposed opposite to a space formed between the adjacent gravity flow racks 70. The main goods drop-out device 80a and the auxiliary goods drop-out device 80b respectively comprise a casing 81 for containing the goods B which are shifted from the goods take-out tool 20 and discharging them one by one, a partition 82 for individually separating the goods in such a manner as to correspond to the partition 21 of the goods take-out tool 20, and a shutter (opening & closing plate) 83 (see FIG. 8) for discharging, one by one, the goods B contained and dropping the goods B onto a chute 91 for guiding them to the spiral chute 90. The main goods drop-out device 80a and the auxiliary good drop-out device 80b are fixedly mounted on an upper portion of the chute 91 as shown in FIG. 3. Also, the goods drop-out device 80 is provided on its upper end with a guide plate 84 for guiding the container 10 which contains the goods B therein so that the container 10 containing the goods B will be smoothly superposed on the goods drop-out device 80 through the goods take-out tool 20.

Also, the spiral chute 90 is designed as such that the goods B discharged from the respective goods drop-out devices 80 are slid and fed into desired storing boxes F such as containers through a plurality of chutes 91 in the stage direction, i.e., in the vertical direction. The chutes 91 are formed as such that the width thereof is gradually reduced as it goes toward the spiral chute 90 from the goods drop-out devices 80 in order to guide the goods B discharged from six goods drop-out devices 80 arranged in the horizontal direction to the spiral chute 90.

Also, an empty container discharging conveyor 100, which is located in a position of a generally same height as the container 10 under a status where the goods take-out tool 20 inverted by the inverting device 40 of the goods transfer apparatus A is superposed on the goods drop-out device 80, is disposed in a space formed between the spiral chute 90 and the goods drop-out device 80, so that the empty container 10 would be conveyed onto the empty container discharging conveyor 100 by the second holding hand 47 and discharged outside the system.

Also, a storing box carrying conveyor 110 is disposed in such a manner as to connect the vicinities of the downstream end portions of the plurality of sets of the spiral chutes 90, so that the storing box F can be conveyed to the vicinity of the downstream end portion of a desired spiral chute 90.

The goods B illustrated in FIG. 5 through FIG. 7 are flat-shaped plastic bottles containing liquid, etc. with each having a screw portion formed of a right screw threadedly engaged with a screw cap N. In the figures, twelve such goods B are arranged in a form of four lines by three rows within the container 10. The plurality of the goods B contained in the container 10 have a clearance of a certain dimension around the upper part of them and therefore, are apt to be disordered in arrangement. In order to prevent such an undesirable situation from occurring, the partition 21 of the goods take-out tool 20 is formed in such a manner as to be projected from the basic portion 24.

Also, in case that the container 10, as shown in FIG. 5, is a corrugated fiberboard box, a plastic container or the like having an opening portion 11 at its upper surface, the container 10 may be fed to the gravity flow rack 70 as it is. However, in case that the container 10 is a corrugated fiberboard box or the like which is packed, the package should be out at its upper surface to form the opening portion 11 beforehand and then fed to the gravity flow rack 70.

Next, there will be described one mode of carrying out a goods shifting method of the present invention with reference to an operating mode of a case where the above-mentioned goods shifting apparatus is used. In the apparatus of this embodiment, the shifting mode is different between cases where goods are frequently shifted and where goods are not frequently shifted.

Firstly, one example of a goods shifting mode for goods B which are to be frequently shifted will be described. For the purpose of convenience for explanation, the main goods drop-out device 80a and the auxiliary goods drop-out device 80b are illustrated as the goods drop-out device 80 in FIG. 1, FIG. 2 and FIG. 3.

Figures 11, 12:
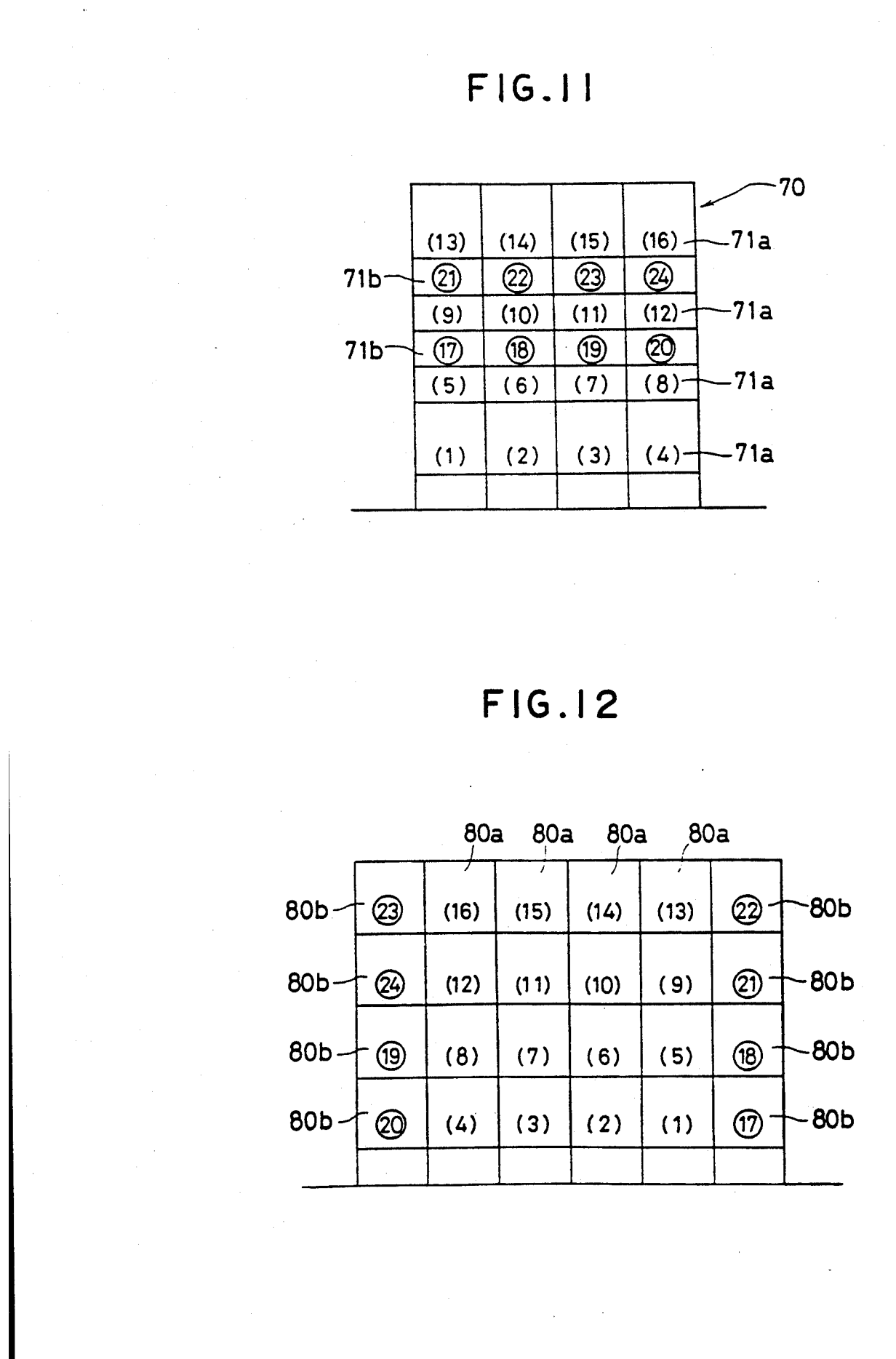

In FIG. 11, a plurality of containers containing one item of goods B, which are to be frequently shifted, are stored in the main take-out compartment 71a of the gravity flow rack 70 of the storing facilities C, whereas a plurality of containers containing one item of goods B, which are not to be frequently shifted, are stored in the auxiliary take-out compartment 71b thereof.

On the other hand, when the goods B stored in the goods take-out tool 20 have been shifted to the main goods drop-out device 80a, the inverting device 40 is moved to a position opposite the empty goods take-out tool 20 by means of the traveling of the stacker crane 60 and by means of the upward and downward movement of the carriage 50, and the empty container 10 is poked out onto the empty container discharging conveyor 100 with the front edge of the second holding hand 47. That is, in the state that a distance between the hand elements of the second holding hand 47 is slightly smaller than the width of the container 10, the traveling table 42 is moved in the direction of the empty container discharging conveyor 100. In other words, the traveling table 42 is moved backward with reference to the gravity flow rack 70 in order to transfer the empty container 10 onto the empty container discharging conveyor 100. Also, when the empty container 10 has been transferred onto the empty container discharging conveyor 100, since the first holding hand 45 is positioned outside the engaging recess 25 of the goods take-out tool 20, the first holding hand 45 is closed in order to hold the goods take-out tool 20. When the first holding hand 45 is caused to hold the goods take-out tool 20, it is rotated counterclockwise by approximately 10° in the side view of FIG. 3 and thereafter, the traveling table 42 is advanced to a position shown by the solid line in the figure. In that state, the first holding hand 45 is further rotated counterclockwise by approximately 170° and comes to a position as shown by the solid line of FIG. 3.

At this time, since the carriage 50 of the stacker crane 60 is also opposite a main take-out compartment 71a with the goods B to be supplied stored therein, the container take-out device 30 is caused to take out the container 10 containing the goods B stored in the main take-out compartment 71a. That is, at the position where the empty container 10 was discharged, the slidable conveyor 33 is moved forward to the main take-out compartment 71a without moving the carriage 50 of the stacker crane 60, and when the container 10 containing the goods B was taken out, by one piece, by means of the pivotal movement of its goods take-out side upward about its pivotal point, the slidable conveyor 33 is moved backward in order to convey the container 10 to a predetermined position on the fixed conveyor 31.

Thereafter, when the fixed conveyor 31 and the slidable conveyor 33 are moved up to a centering position through a pantagraph type lifting device outside the figure, the second holding hand 47 is caused to hold the side surfaces of the container 10 taken out while still supporting the bottom surface thereof and centering thereof is performed. After centering, the second holding hand 47 is moved upward along the guide member 46 to lift the container 10 up to the vicinity of the basic portion 24 of the goods take-out tool 20 and stopped with the partition 21 projecting downward from the basic portion 24 and inserted into the container 10 as shown in FIG. 6 and FIG. 7. Even if there occurs a disorderly arrangement of the goods B due to a clearance formed at an upper part of the container 10, the goods are individually separated in order to maintain the original orderly arrangement of the goods B by means of the insertion of the partition 21 into the clearance. Also, when the goods take-out tool 20 is superposed on the container 10, if a space δ of approximately 5 mm is left as shown in FIG. 6, the goods B can smoothly be shifted to the goods take-out tool 20 from the container 10.

When the basic portion 24 of the goods take-out tool 20 and the opening portion 11 of the container 10 are superposed in the manner as described, the inverting device 40 is activated to invert the goods take-out tool 20 and the container 10 in the manner as shown in FIG. 2. That is, the first and the second holding hands 45, 47 and the guiding member 46 are inverted counterclockwise in FIG. 3 by serving the rotary shaft 44 as a supporting shaft thereof. This inverting device will be described in more detail. After the first holding hand 45 is rotated clockwise by approximately 170°, the traveling table 42 is moved backward to bring the goods take-out tool 20, which is being inverted, to a position at a generally upper part of the main goods drop-out device 80a. Thereafter, the first holding hand 45 is further rotated clockwise by approximately 10° to superposed the goods take-out tool 20 and the container 10 on the good drop-out device 80a. By this inverting action, the goods B contained in the container 10 and individually separated by the partition 21 are shifted to the goods take-out tool 20.

When the goods take-out tool 20 and the container 10 have been superposed on the main goods drop-out device 80a, the first holding hand 45 is opened to release the goods take-out tool 20, and at the same time, the second holding hand 47 is also opened to release the container 10. Thereafter, the traveling table 42 is moved forward and waits for the next goods B to be shifted.

The goods B, which were shifted to the goods storing portions 85 (see FIG. 8) which are defined in a matrix shape consisting of four lines by two rows within a main goods drop-out device 80a respectively, are dropped out when the shutter 83 for opening and closing the opening portions of the goods storing portions 85 is moved in the releasing direction and dropped onto the chute 91. As soon as all of the goods B are sequentially dropped out from the main goods drop-out device 80a, the shutter 22 of the goods take-out tool 20 is released in the direction as shown by an arrow of FIG. 8 to automatically shift all of the goods B contained in the goods take-out tool 20 into the main goods drop-out device 80a which is closed at its bottom by the shutter 83.

Next, there will be described the goods B which are less frequently to be shifted.

In case that the goods B are shifted to the auxiliary goods drop-out device 80b from the auxiliary take-out compartment 71b in which the goods B less frequently required to be shifted are stored, since the auxiliary take-out compartment 71b and the auxiliary goods drop-out device 80b are not faced with each other, the inverting device 40 is caused to hold the empty goods take-out tool 20 racked on the auxiliary goods drop-out device 80b. When the traveling table 42 is moved to a position as shown by the solid line in FIG. 3, the inverting device 40 holding the empty goods take-out tool 20 is rotated counterclockwise by approximately 170°. After the inverting device 40 has been rotated in the manner described or while the device 40 is being rotated, the stacker crane 60 is caused to travel and the carriage 50 is moved upward and downward until it comes to a position opposite the auxiliary take-out compartment 71b which stores therein the goods B to be supplied. In the foregoing state, the container 10 containing the goods B is taken out by the container take-out device 30 and the container 10 containing the goods B and the goods take-out tool 20 are superposed one upon the other by the superposing device 41. Then, after the inverting device 40 has been rotated clockwise by approximately 170° or while the device 40 is being rotated, the stacker crane 60 is caused to travel and the carriage 50 is moved upward and downward until it comes to face with the predetermined auxiliary goods drop-out device 80b again. Then, the inverting device 40 is further rotated clockwise by approximately 10° to superpose the goods take-out tool 20 and the container 10 on the auxiliary goods drop-out device 80b.

Figure 8:
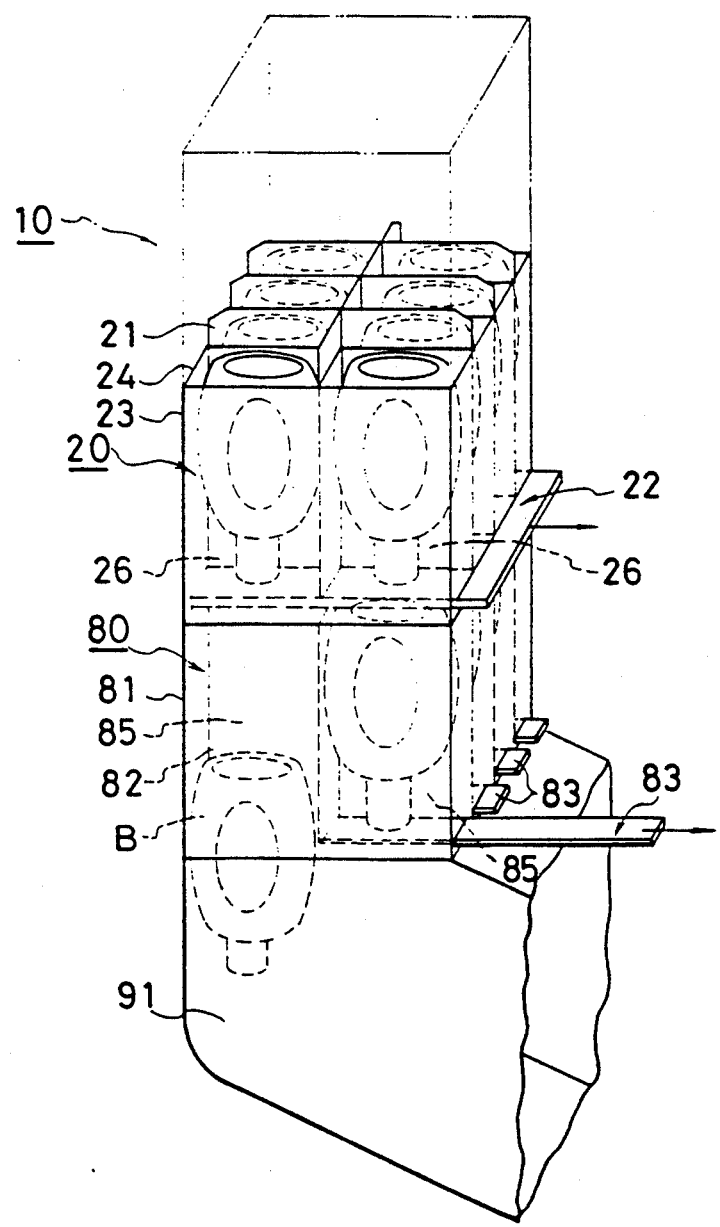
FIG. 8 is a perspective view showing a container containing goods having a shape different from that of FIG. 5 and a goods take-out tool inverted and superposed on a goods drop-out device.

After the goods B, which are frequently required to be shifted or the goods B, which are less frequently required to be shifted in the manner described, are racked on the goods drop-out device 80 through the goods take-out tool 20, the goods B which have been shifted onto the goods drop-out device 80 are taken out in sequence by releasing the shutter 83 as shown, for example, in FIG. 8 according to a desired number commanded by a picking command. The goods B taken out are slid to the storing box F, such as a desired container, etc., through the chute 91 and the spiral chute 90. Since a plurality of chutes 91 are connected to one spiral chute 90 at positions or levels of different heights, different items of goods B can almost simultaneously be taken out of the plurality of goods drop-out devices 80 into one storing box F, such as a container, etc., so as to be assembled and stored automatically.

FIG. 11 and FIG. 12 respectively are front views, when view from a traveling rail 61 side, for explaining the arrangement of the containers 10 containing therein the goods B which are racked in the take-out compartment 71 and in the goods drop-out device 80 respectively.

That is, as shown in FIG. 11 and FIG. 12, the containers (1) through (16) containing the goods B, which are frequently required to be shifted, are racked in the main take-out compartments 71a which are disposed in such a manner as to be placed opposite the main goods drop-out devices 80a. According to a command of shifting the goods B, the container 10 containing the goods B is racked onto the main goods drop-out device 80a from the main take-out compartment 71a through the goods take-out tool 20. Therefore, the containers (1) through (16) containing the goods B, which are frequently required to be shifted, can effectively be shifted to the main goods drop-out devices 80a from the main take-out compartments 71a without the need to move the stacker crane 60 and without the reciprocal movement of the carriage 50 upward and downward. Since one stacker crane 60 covers one unit of the gravity flow rack 70 as its working range, the containers (1) through (16) containing the goods B, which are frequently required to be shifted, can be shifted without the stacker crane 60 entering into the interference zones $Z_{ab}$, $Z_{bc}$, . . . . Therefore, the goods B can be shifted very efficiently and without a waste of time for the interference waiting.

Also, the containers 17 through 24 which are indicated by underlining in FIGS. 11, 12 and which contain the goods B, which are less frequently required to be shifted, are racked in the auxiliary take-out compartments 71b disposed between the main take-out compartments 71a and at position having a step difference with respect to the goods drop-out device 80, so that according to a command of shifting the goods B, the container 10 containing the goods B is racked in a portion where no gravity flow rack 70 is disposed, i.e., the auxiliary goods drop-out device 80b is disposed opposite a space interposed between the adjacent gravity flow racks 70 from the auxiliary take-out compartment 71b through the goods take-out tool 20. Therefore, although it is required to cause the stacker crane 60 to travel in order to shift the container 10, since the gravity flow racks 70 are disposed in such a manner that a plurality of spaces are intermittently interposed therebetween, the probability for the adjacent stacker cranes 60 interfering with each other can be lowered. Also, as already described, the traveling rail 61 as a traveling path for the stacker crane 60 is provided with the interference control zones $Z_{ab}$, $Z_{bc}$, . . . . In case that any of the adjacent stacker cranes 60, 60 is already within the interference control zones $Z_{ab}$, $Z_{bc}$, . . . , or in case that any of the adjacent stacker cranes 60, 60 has received a command for traveling into the interference control zones $Z_{ab}$, $Z_{bc}$, . . . , the other stacker crane 60 is caused to wait without traveling into the interference control zones $Z_{ab}$, $Z_{bc}$, . . . until the stacker crane 60, which has received the traveling command, comes out of the interference control zones $Z_{ab}$, $Z_{bc}$, . . . . The other stacker crane 60 is preferably controlled during the waiting time as such that the goods B, which are to be shifted next and which are present outside the interference control zones $Z_{ab}$, $Z_{bc}$, . . . , are shifted with priority.

In this way, whether the goods are frequently required to be shifted or less frequently required to be shifted, when the goods B are to be automatically taken out of the goods drop-out device 80 in this embodiment, the goods, which have been shifted to the goods drop-out device 80, are sequentially taken out by a desired number each time by moving the shutter 83 in the line direction (the direction shown by an arrow) as shown in FIG. 8 with reference to the numeral value shown in base 4 number, more specifically, with reference to the numeral value of each digit of base 4 number after the total number of the goods B taken out is converted from a decimal number to a base 4 number according to a picking command. That is, in case that one piece of the goods B is to be taken out, as shown in Table 1 and in FIG. 9 as will be described, one piece of the goods B is taken out of the goods drop-out device 80 first, and then, in case that five pieces of the goods B are to be taken out six pieces of the goods B are to be taken out in total.

In the respective cases, since the total number of the taken-out goods B becomes 1 in a decimal number (1 in a base 4 number) and 6 in a decimal number (12 in a base 4 number) respectively, firstly, the shutter 83 of No. 1 on the first line is moved by one row portion in the line direction (hereinafter sometimes referred to as the "x-direction") to take out one piece of the goods B and then, the shutter 83 of No. 1 is further moved by one row portion in the x-direction (two row portions are released), at the same time, the shutter 83 of No. 2 on the second line is moved by two row portions in the x-direction and furthermore, the shutters 83 of No. 3 and No. 4 on the third and the fourth lines are sequentially moved by one row portion each time in the x-direction to take out five pieces of the goods B. That is, if the number in upper digit (upper place) of a numerical value shown in base 4 number is "0", it shows that the opening portions of the goods storing portions 85 on the second row are all closed. The numerical value of the lower digit (lower place), when the number in upper digit (upper place) is "0", represents the number of the opening portions of the goods storing portions 85 on the first row which are to be opened. Likewise, when the number of upper digit is "1", it represents the number of the opening portions of the goods storing portions 85 on the second row which are to be opened. Therefore, it can easily be determined which shutters 83 should be moved and in what place the shutter 83 should be moved with reference to the total number of the taken-out goods B shown in a base 4 number, and a desired quantity of the goods B can be taken out in sequence by moving the shutter 83 based on such determination.

The goods B, which have been taken out of the goods drop-out device 80, are fed to a desired storing box F by the goods feeding apparatus D.

Next, there will be described the spiral chute 90, the chute 91, etc. which form the goods feeding apparatus in a goods shifting apparatus of the present invention.

In the goods shifting apparatus of this embodiment, the goods feeding apparatus D feeds the goods B, which have been taken out of the respective goods take-out apparatuses E in the manner described, to a desired storing box F by allowing the goods B to be transferred (slid) on the spiral chute 90 through the respective chutes 91.

Figure 13:
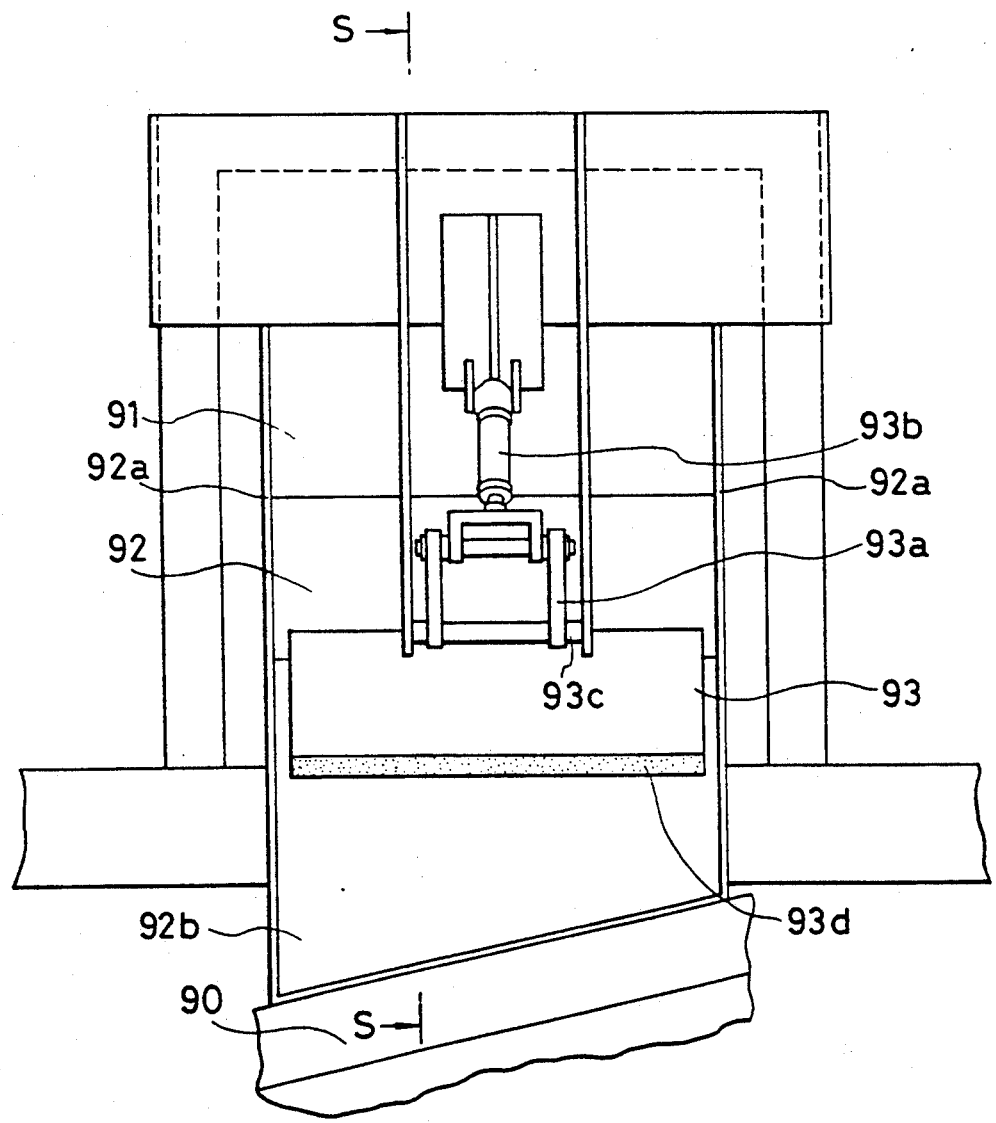
FIG. 13 is a front view showing a downstream end portion of a chute of a goods feeding apparatus.
Figure 14:
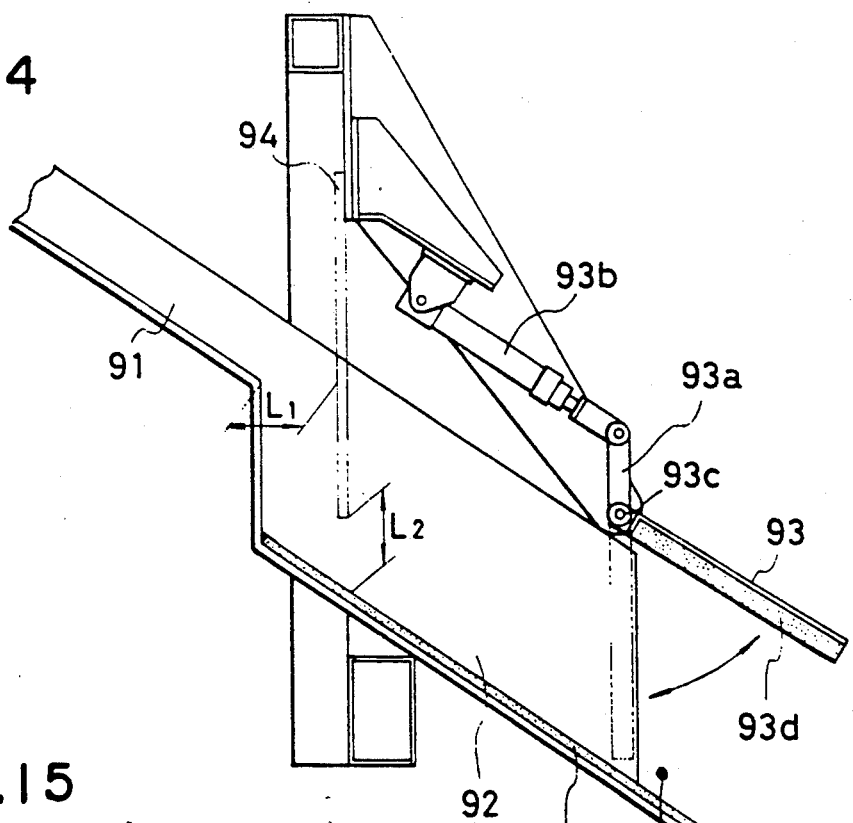
FIG. 14 is a sectional view taken along S—S of FIG. 13.

The sliding surface of the chute 91 is flat as shown in FIG. 13 and FIG. 14. Moreover, the chute 91 is attached at its sliding surface with a Teflon sheet so that the goods B can be transferred smoothly. Furthermore, the chute 91 is provided at the downstream end portion of the sliding surface thereof with a step portion which is lowered at its downstream side, thereby to form a pooling portion 92 adapted to pool the goods B. Also, the chute 91 is provided at the downstream end portion of the pooling portion 92 with a gate 93 adapted to stop the sliding of the goods B pooled. The chute 91 shown in FIG. 10 has a construction substantially the same as that of the chute 91 of FIG. 13, although the former has a different configuration in plan view.

It is connected with an air cylinder 93b through an arm 93a, and the air cylinder 93b opens and closes the gate 93 through a shaft 93c by causing a rod to be reciprocally moved. Also, the downstream end portion of the pooling portion 92 is located at an upper portion of a side wall of the spiral chute 90.

Therefore, the goods B, which have been discharged out of the goods drop-out device 80 and temporarily stopped by the gate 93, are stored in the pooling portion 92 and/or on the sliding surface of the chute 91.

The pooling portion 92 is provided with side plates 92a, 92a attached to both sides thereof, and its sliding surface is attached with a rubber sheet 92b of a thickness of approximately 5 mm, and a Teflon sheet is attached thereon. Also, the pooling portion 92 side of the gate 93 is attached with a cushion member 93d.

Also, there may be provided a blind 94 as shown by two dot chain line in FIG. 14. In that case, it is preferable to establish a dimension $L_1$ as such that the weight of the goods B is present at the pooling portion 92 side when the goods B slid down in the longitudinal direction hits the blind 94, so that the goods B will be dropped to the pooling portion 92 without fail. Also, it is preferable that a dimension $L_2$ is established to be larger than the thickness (the height in the sliding state) of the goods B, so that the goods B will be slid smoothly.

Figure 15:
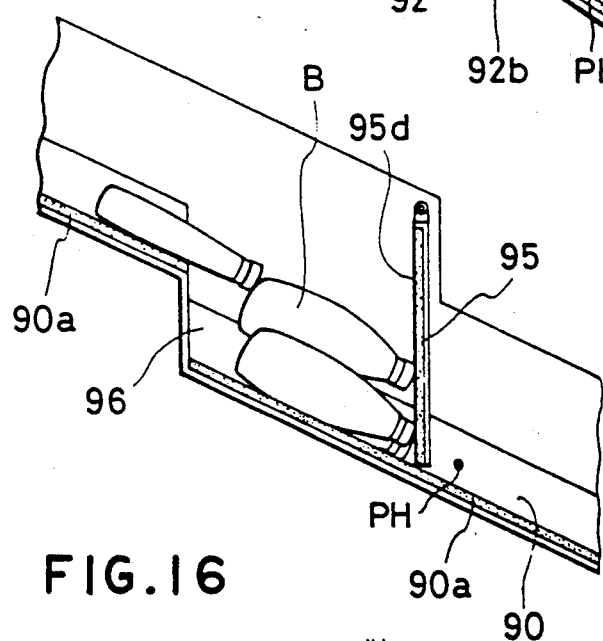
FIG. 15 is a sectional view showing the vicinity of an intermediate gate of a spiral chute.

Also, the bottom surface of the spiral chute 90, as shown in FIG. 15, is formed in a concave shape, and the goods transfer (sliding) path thereof is provided at its midway with a step portion which is lowered at its downstream side and with an intermediate gate 95, so that a pooling portion 96 for storing the goods B will be formed by the step and the intermediate gate 95. Furthermore, the spiral chute 90 is provided at its downstream end portion with a pooling portion 97 for storing the goods B which is formed in the same manner as the above-mentioned pooling portion 96 and at a front end portion of the pooling portion 97 with a gate 98. The intermediate gate 95 and the gate 98 are attached with cushion members 95d and 98d as in the same case with the gate 93 of the chute 91. Also, the intermediate gate 95 and the gate 98 can be opened and closed by an air cylinder (not shown).

The gate 93 of the chute 91 and the intermediate gate 95 of the spiral chute 90 form one pair respectively. The intermediate gate 95 is disposed at a somewhat upstream side of the gate 93 in the spiral chute 90. However, there is provided no intermediate gate 95 which is formed one pair with the gate 93 which is disposed at a downstream end portion of the chute 91 for the goods drop-out device 80 of the uppermost stage.

Figure 16:
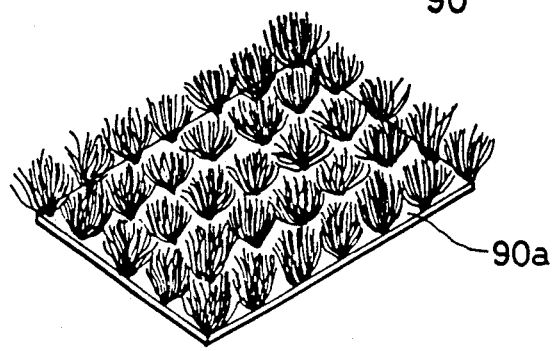
FIG. 16 is a perspective view of a chute having a tufted portion (artificial lawn grass)
Figure 17:
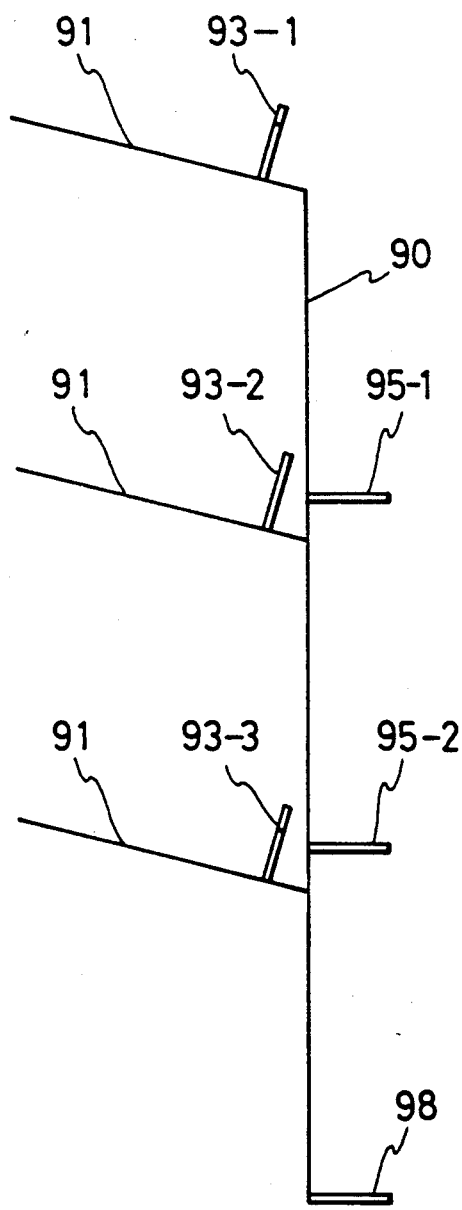

Also, the spiral chute 90 is provided, as the sheet having a tufted portion of the present invention, with an artificial lawn grass 90a, as shown in FIG. 16, which is attached to the sliding surface thereof over its entire sliding path. This artificial lawn grass 90a is preferably formed of flat nylon yarns (length: about 9 mm, width: 0.5 mm, thickness: 0.05 mm) planted in a basic material in such a manner as 22 [pieces/place]×6 [places/cm$^2$]. The flat yarns of the artificial lawn grass 90a may be of polypropylene or the like. Also, there can be suitably selected the dimension thereof, the density of the planting of the yarns, etc. Also, the sheet having the tufted portion in the present invention is not limited to the artificial lawn grass. Instead, it may suitably be selected from various sheets according to the configuration, weight, etc. of the goods B, such as one formed of a substrate of a woven and knitted ground formed with a pile, a woven and knitted ground or a nonwoven fabric, etc. planted with yarn-like elements, hair-like elements, etc., or one formed of a sheet-like material partly cut and tufted. That is, tufted fabrics are preferably used as the sheets. More particularly, a pile woven and knitted ground, a cut-pile woven and knitted ground, one formed of a sheet planted with a hair tuft like yarn-like material, hair-like material, etc. by a needle or the like, or one coated on its reverse side with resin, etc. after the planting, or one formed of a sheet-like material cut into a wedge shape or a comb teeth shape and tufted are preferably used. Also, in order to transfer the goods B smoothly and without damaging their outer surface, the length of the tufted portion is preferably 5 mm to 20 mm.

Also, the gate 93 of the chute 91, the intermediate gate 95 disposed in the midway of the spiral chute 90 and the gate 98 disposed at the downstream end of the spiral chute 90 can be controlled opening and closing by a sequencer (not shown) as a control unit.

That is, the goods B are taken out of the goods drop-out device 80 onto the chute 91 and are stopped by the closing state of the gate 93 and are stored in the pooling portion 92 and/or the chute 91. Thereafter, the goods B are discharged onto the spiral chute 90 in such a manner as to merge with the goods B, which are taken out of another goods drop-out device 80 and which are to be stored in the same storing box F, on the spiral chute 90.

The goods B discharged onto the spiral chute 90 are transferred (slid) on the spiral chute 90, stopped at the intermediate gate 95 (or gate 98) and stored in the pooling portion 96 (or pooling portion 97) of the spiral chute 90 and/or on the spiral chute 90 at the upstream side of the pooling portion 96 (or pooling portion 97).

In case that the goods B taken out are not required to be stopped by the gate 93 of a certain chute 91 or by the intermediate gate 95 in a midway of the spiral chute 90, the goods B are taken out while the gate 93 or the intermediate gate 95 is in released-state. The goods B are continuously transferred (slid) downward without being temporarily stopped at the gate 93 or at the intermediate gate 95 and stopped by a predetermined intermediate gate 95 or gate 98 disposed in a midway of the spiral chute 90.

The above-mentioned merging control, that is, the opening and closing control of the gate 93 of the chute 91 and the intermediate gate 95 and the gate 98 of the spiral chute 90 will now be described with reference to the embodiment of FIG. 17 through FIG. 20. The storing boxes F are transferred to position corresponding to the pooling portion 97 in the increasing order of the storing box No. Also, there is provided a sequencer as a control unit for opening and closing of the gate 93, the intermediate gate 95 and the gate 98 of the goods feeding apparatus D of this embodiment. The storing box No. in which the goods B to be fed after passing through the gates 93, 98 and the intermediate gate 95 is to be stored, is registered in CPU (not shown) beforehand. And, the sequencer is incorporated with respective registers 99 corresponding to the gates 93, 98 and the intermediate gate 95. As in shown in FIG. 18, four storing box No. in which the goods B to be fed after passing through the gates are to be stored can be written in the register 99 as data per each gate. As soon as the sequencer receives a predetermined picking command (start), a storing box No. in which the first goods B to be fed after passing through the gates is to be stored is written in the fourth register 99 for each gate. The data (storing box No.) written is sequentially transmitted (shifted) and registered in the first register 99. Likewise, in the next scanning, the storing box No. in which the next goods B to be fed after passing through the gates is to be stored is registered in the second register 99. Likewise, maximum four pieces of the storing box No. are registered. When the goods B are discharged by opening and closing the respective gates in accordance with the data (storing box No.) registered, the data is sequentially shifted forward one by one, and a new data is written in the fourth register which is now empty because the old data has been shifted. An END data is written in a place after the final data to be registered per each gate for registration. By this, the sequence of procedure for feeding the goods B is finished.

In FIG. 17 through FIG. 20, 93-1, 93-2, 93-3 respectively show the first stage gate from the top, the second stage gate from the top and the third stage gate from the top. Also, 95-1 and 95-2 respectively show the first stage intermediate gate 95 from the top and the second stage intermediate gate 95 from the top.

At the time when the goods B are assembled and stored with respect to the storing box F (see FIG. 1 and FIG. 3) which is transferred to position corresponding to the pooling portion 97 disposed at the downstream end of the spiral chute 90, firstly, as is shown in FIG. 19, in case that any of the fourth data $D_w(93\text{-}1)$, $D_w(93\text{-}2)$, $D_w(93\text{-}3)$, $D_w(95\text{-}1)$, $D_w(95\text{-}2)$ and $D_w(98)$ is in its empty state (the state in that "0" is written) in the register 99 for each gate, the sequencer outputs a data settable signal to CPU (Step S-1) and receives the pertinent data from CPU and then writes the date in the data settable register 99 (Step S-2). That is, in Step S-2, the storing box No., in which the goods passed through the gates 93-1, 93-2 and 93-3 and the intermediate gates 95-1, 95-2 and 98 are to be stored, is written respectively as data. The procedure in Step S-2 will be described in more detail with reference to concrete examples. If the storing box No., in which the goods B passed through the gate 93-1 are to be stored, are, for example, 1, 3, 5, 7, 9, ..., and END and that $D_w(93\text{-}1)$ is empty ("0" is written), data "1" is written in $D_w(93\text{-}1)$. Furthermore, since $D_2(93\text{-}1)$, $D_1(93\text{-}1)$ and $D(93\text{-}1)$ are also empty, the data "1" already written are sequentially shifted forward and registered in the first register 99. Furthermore, data "3" is written in $D_w(93\text{-}1)$ in the next scanning and since $D_2(93\text{-}1)$ and $D_1(93\text{-}1)$ are empty, the data "3" written is registered in the second register 99. Likewise, data "5" and "7" are sequentially written in the register 99, and data "1", "3", "5" and "7" are written in the register 99 for the gate 93-1. Likewise, if the storing box No., in which the goods B passed through the gate 93-2 are to be stored, are 2, 4, 9, 11, 12, ..., END, data "2", "4", "9" and "11" are sequentially written in the register 99 for the gate 93-2 in the same procedure as in the case of the gate 93-1. Also, if the storing box No., in which the goods B passed through the gate 93-3 are to be stored, are 1, 3, 5, 6, 9, 11, ..., END, data "1", "3", "5", and "6" are written in the register 99 for the gate 93-3. Also, if the storing box No., in which the goods B passed through the gate 95-1 are to be stored, are 1, 3, 5, 7, 9, ..., END, data "1", "3", "5" and "7" written in the register 99 for the gate 95-1. Also, if the storing box No., in which the goods B passed through the gate 95-2 are to be stored, are 1, 2, 3, 4, 5, 7, 9, 11, 12, ..., END, data "1", "2", "3" and "4" are written in the register 99 for the gate 95-2. Also, if the storing box No., in which the goods B passed through the gate 98 are to be stored, are 1, 2, 3, 4, 5, 6, 7, 9, 11, 12, ..., END, data "1", "2", "3" and "4" are written in the register 99 for the gate 98. In this embodiment, since the goods B are not assembled and stored in the storing boxes F of the storing box No. 8 and 10 by the spiral chute 90, data "8" and "10" are not written in the register 99 for the gate 98.

Next, when the gates 93 and 98 and the intermediate gate 95 are controlled to open and close by the sequencer and the goods B are discharged according to data $D(93\text{-}1)$, $D(93\text{-}2)$, $D(93\text{-}3)$, $D(95\text{-}1)$, $D(95\text{-}2)$ and $D(98)$ which were written in the first register 99 for each gate in the manner as described, data written in the registers 99 corresponding to the gates being opened and closed are shifted forward one by one. This procedure will be described in more detail with reference to the gate 93-1, for example. When the goods B are discharged from the gate 93-1, since $D(93\text{-}1)$ is rewritten from data "1" to data "0", the first register 99 becomes empty, and therefore, the data "3" registered in $D_1(93\text{-}1)$ is shifted to and written in $D(93\text{-}1)$ and at the same time, $D_1(93\text{-}1)$ is rewritten to data "0". Similarly, $D_2(93\text{-}1)$ is written in $D_1(93\text{-}1)$ and $D_w(93\text{-}1)$ is written in $D_2(93\text{-}1)$, and a new data is written in $D_w(93\text{-}1)$. According to the data which has been shifted from $D_1(93\text{-}1)$ to $D(93\text{-}1)$ and newly written in $D(93\text{-}1)$, the gate 93-1 is controlled opening and closing again. Similarly, the opening and closing action of each gate is repeated by Steps S-3, S-9, S-16, and S-26 until all of the first data of the register 99 for each gate become "END" data to assemble and store the goods B.

The open and close controlling of the gates 93, 98 and the intermediate gate 95 will now be described in detail with reference to the flow charts of FIG. 19 and FIG. 20. In Step S-3, it is determined whether a registration data of the storing box No. is remained (whether END) in the first register 99 corresponding to the gate 93-1. And, if it is determined as remained (not END), it goes to Step S-4.

It is determined whether the first data $D(93\text{-}1)$ and $D(95\text{-}1)$ of the registers 99 for the gate 93-1 and the intermediate gate 95-1 are coincident with each other (Step S-4). As a result, if it is determined that they are coincident, the gate 93-1 is opened whether the goods B have been taken out of the goods drop-out device 80 or whether the storing box F has arrived (Step S-5).

The gate 93-1 opened is closed in Step S-6 under the following conditions. That is, in case that the goods B are not yet stored in the gate 93-1 when the gate 93-1 is to be opened, firstly, the gate 93-1 is closed upon confirmation of the facts that a certain period of time has passed after the goods B have been taken out of the corresponding goods dropout device 80 and that the pooling portion 92 and/or the chute 91 have become empty since the goods B had been discharged therefrom, that is, a photoswitch PH disposed in the vicinity of the gate 93-1 was subjected to light incidence (Step S-7). And, the first register 99 for the gate 93-1 is rewritten with data "0". At the same time, the second data is shifted to the first position. Similarly, the third and the fourth data are shifted (Step S-8) and then, it goes to the next Step S-9.

Also, in case that the goods B are already stored in the gate 93-1 when the gate 93-1 is opened, the gate 93-1 is closed upon confirmation of the fact that a certain period of time has passed from the time when the gate 93-1 had been opened and the corresponding pooling portion 92 had become empty from the light incident on PH (Step S-7). Thereafter, it goes to Step S-9 via Step S-8.

Also, in the above-mentioned Step S-3, when all data registered in the gate 93-1 are processed and the first data D(93-1) of the register 99 for the gate 93-1 is END, it also goes to the above-mentioned Step S-9. Also, when the respective first data D(93-1) and D(95-1) of the gate 93-1 and the intermediate gate 95-1 are not coincident with each other, it also goes to the above-mentioned Step S-9.

In Step S-9, it is determined whether the first data D(95-1) and D(93-2) in the respective registers of the intermediate gate 95-1 and the gate 93-2 which forms one pair with the intermediate gate 95-1 are END. If it is determined that the respective data are not END, it goes to Step S-10. If it is determined that at least any one of them is END, it goes to Step S-11.

In the above-mentioned Step S-10, the respective first data D(95-1) and D(93-2) in the registers 99 of the intermediate gate 95-1 and the gate 93-2 are compared. If the result of the comparison reveals that the data D(95-1) and D(93-2) are coincident with each other, it goes to Step S-12. If the former is smaller than the latter, it goes to Step S-13. If the former is larger than the latter, it goes to Step S-14.

In Step S-12, the respective first data D(95-1), D(93-2) and D(95-2) in the registers 99 for the intermediate gate 95-1 or the gate 93-2 and the intermediate gate 95-2 are compared. If the result of the comparison reveals that the data for them are coincident with each other, the intermediate gate 95-1 and the gate 93-2 are opened and closed under the same condition as that of the aforementioned opening and closing action of the gate 93-1 (Step S-5 through Step S-8) and the goods B are transferred to the intermediate gate 95-2 (Step S-15). Also, if the result of the comparison reveals that the first data D(95-2) of the intermediate gate 95-2 in the register is smaller than that of the intermediate gate 95-1 or the gate 93-2, it goes to Step S-16 of FIG. 20. On the contrary, if the first data D(95-2) of the intermediate gate 95-2 is larger, it indicates an error and the open and close controlling (assembling and storing work) of the gate is stopped. Then, it waits until the abnormal state is removed and a normal state is recovered.

Also, in the above-mentioned Step S-13, the respective first data D(95-1) and D(95-2) in the registers 99 for the intermediate gate 95-1 and the intermediate gate 95-2 are compared. If the result of the comparison reveals that both of them are coincident with each other, the intermediate gate 95-1 is opened and closed under the same condition as that of the afore-mentioned opening and closing action of the gate 93-1 (Step S-5 through Step S-8), and the goods B are transferred to the intermediate gate 95-2 (Step S-17).

Also, in the above-mentioned Step S-14, the respective data D(93-2) and D(95-2) in the registers 99 for the gate 93-2 and the intermediate gate 95-2 are compared. If the result of the comparison reveals that both of them are coincident with each other, the gate 93-2 is opened and closed and the goods B are transferred to the intermediate gate 95-2 (Step S-18) in the same manner as described.

Figure 20C:
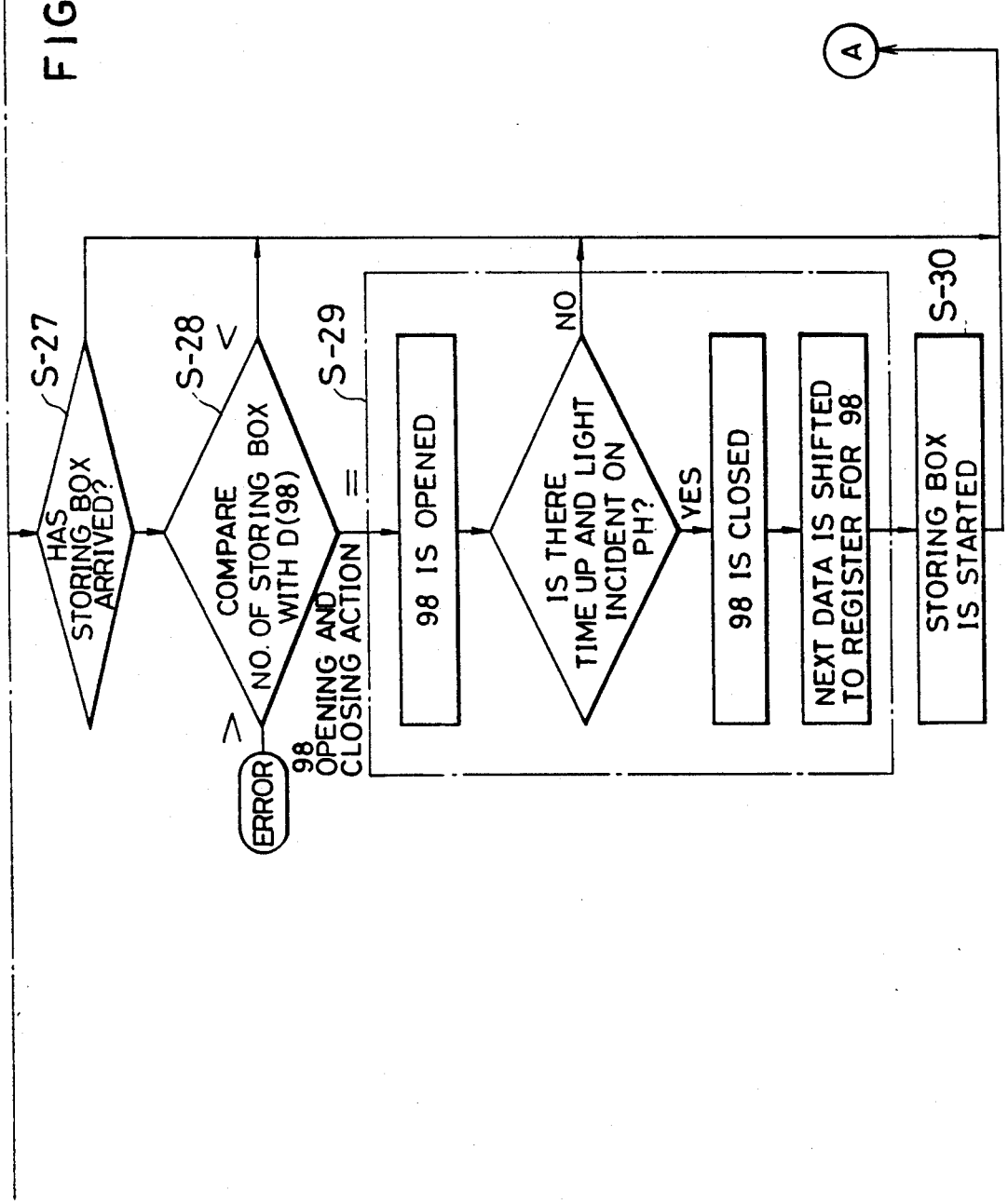

Also, if the result of the comparison reveals that the first data D(95-1) of the intermediate gate 95-1 in the register 99 is larger than that of the intermediate gate 95-2, it goes to Step S-16 of FIG. 20. On the contrary, if the first data D(95-1) of the intermediate gate 95-1 is smaller, it indicates an error and the open and close controlling of the gate is stopped as described.

Also, if the result of the comparison in the above-mentioned Step S-14 reveals that the first data D(93-2) of the gate 93-2 in the register is larger than that of the intermediate gate 95-2, it goes to Step S-16 of FIG. 20. On the contrary, if the intermediate gate 93-2 is smaller, it indicates an error as mentioned.

Also, in the above-mentioned Step S-11, if the first data D(93-2) of the register 99 for the gate 93-2 is END, it goes to Step S-13. Also, if the first data D(95-1) of the register 99 for the intermediate gate 95-1 is END, it goes to Step S-14. Also, if the first data D(93-2) and D(95-1) of the respective registers for the gate 93-2 and the intermediate gate 95-1 are END, it goes to Step S-16 of FIG. 20.

In Step S-16, the same determinating procedure with respect to the intermediate gate 95-1 and the gate 93-2 in the above-mentioned Step S-9 is applied with respect to the intermediate gate 95-2 and the gate 93-3 which are disposed at place which is located by one stage downstream side from the gates 95-1 and 93-2. Therefore, the intermediate gate 95-2 and the gate 93-2 are opened and closed respectively, in the same manner as that in Steps S-15, S-17 and S-18, in accordance with the determinations made in Step S-19 following Step S-16 and in Steps S-20, S-21 and S-22 which are branched from Steps S-19 (Step S-23, Step S-24 and Step S-25).

Then, the various gates of the chute 91 and the various intermediate gates 95 disposed midway in the spiral chute 90 are all opened and closed in the manner as described, and the goods B taken out of the respective goods drop-out devices 80 are repeatedly merged with each other on the spiral chute 90 and assembled and stored in the pooling portion 97 and/or on the spiral chute 90 at an upstream side of the pooling portion 97.

At this time, in Step S-26, it is determined whether the first data D(98) of the register 99 for the gate 98 disposed at an downstream end portion of the spiral chute 90 is END. If the result of the determination is "not END", it is determined whether the storing box F corresponding to the gate 98 has arrived (Step S-27). If the result of the determination is affirmative, the storing box No. and the first data D(98) of the register 99 for the gate 98 are compared (Step S-28). If the result of the comparison reveals that both of them are coincident, the gate 98 is opened and closed under the same condition as that of the above-mentioned various gates 93 and the various intermediate gates 95. That is, the gate 98 is opened, and the goods B assembled and stored are fed into the storing box F. As soon as the goods B assembled and stored are fed into the storing box F, the gate 98 is closed (Step S-29). After the gate 98 is closed, the various gates 93 and/or the intermediate gates 95 are opened as mentioned, and the goods B which are to be fed to the next arriving storing box F are assembled and stored in the pooling portion 97 and/or on the spiral chute 90 at an upstream side of the pooling portion 97. Also, the goods B which are to be fed to a desired storing box F arriving thereafter are being assembled and stored in the pooling portion 96 and/or on the spiral chute 90 at an upstream side of the pooling portion 96.

Therefore, since the goods feeding apparatus D of the present invention is provided with the intermediate gate 95 midway in the goods transfer path of the spiral chute 90, before the storing box F arrives at a position corresponding to the pooling portion 97 at the downstream end of the spiral chute 90, the goods B which are to be stored in the storing box F can be stored in the pooling portion 97 and/or on the spiral chute 90 at an upstream side of the pooling portion 97 in advance. In addition, the goods B which are to be stored in the storing boxes F which are to sequentially arrive at position corresponding to the pooling portion 97 can also be stored in the pooling portion 92 of each chute 91 and/or on the spiral chute 90 at an upstream side of the pooling portion 92 in advance. Furthermore, the goods which are to be stored in a plurality of storing boxes F can be assembled and stored per each storing box F and stored in advance. Therefore, when compared with a case where the intermediate gate 95 is not provided, the goods B which have been stored in advance can sequentially be fed to the downstream side and the sliding distance (transferring distance) of the goods B down to the storing box F can be shortened. Therefore, the feeding performance of the goods B to the storing box F can be greatly increased.

Although the goods feeding apparatus D of this embodiment has been described with reference to one embodiment of the present invention and a mode for feeding goods thereof, the present invention is not limited to these embodiments. Regarding the intermediate gates 95, for example, at least one piece of such gate 95 may be disposed at the spiral chute 90. Also, the chute provided with the gate 93 may be one piece only. Also, it may be designed as such that the goods B discharged from a plurality of goods drop-out devices 80 which are disposed at position of a generally same height are taken out on a single chute. Also, the goods B which are to be shifted are not limited to those of a bottle shape. Instead, they may be of box shape, bag shape, etc. It goes without saying that the structure and the shape of the spiral chute 90, the chute 91, the gate 93 or the intermediate gate 95 are not limited to the those of the above-mentioned embodiment. Also, the destination of the goods are not limited to the storing Box F.

Figure 21:
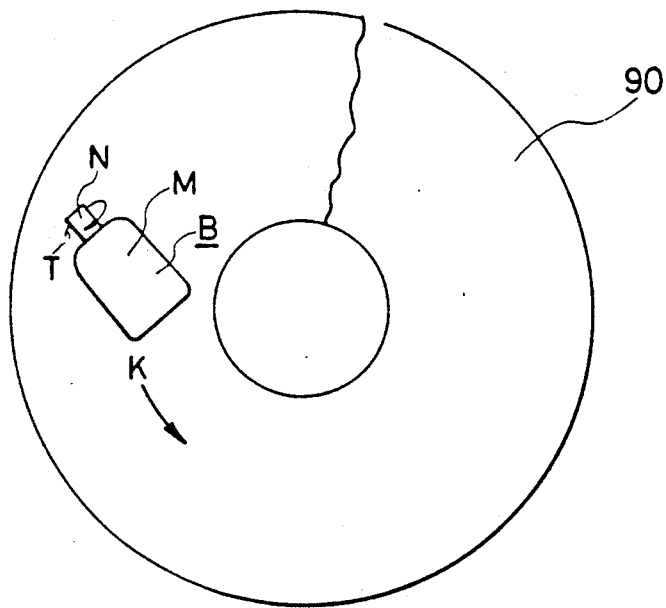
FIG. 21 is a plan view for explaining the state of goods slided on a spiral chute.

Also, according to the spiral chute 90 forming the goods feeding apparatus D of this embodiment, as described above, the sliding surface of the spiral chute 90 is spiraled in the left direction (opposite direction to the threadedly engaging direction) K and is provided with a sheet (artificial lawn grass 90a) having a tufted portion. Therefore, since the goods B having a cap N which is threadedly engaged with a threadedly engaging portion comprising a right screw receives a force in the direction (threadedly engaging direction) T for tightening the cap N of the goods B because the goods B rubs the artificial lawn grass 90a during sliding, the cap N is not loosened to come off. Therefore, the goods B can be transferred to the storing box F without scattering liquid, etc. filled in the goods B. That is, as is shown in FIG. 21, in case of the goods B having a threadedly engaging portion such as a bottle, etc. threadedly engaged with the screw type cap N, since the cap N side is lighter in weight than the bottle body M side, the lighter cap N side is swayed outside the spiral chute 90 by a centrifugal force during the sliding of the goods B. At that time, the cap N receives a frictional force acting in the direction (right direction) T opposite to the sliding direction K, that is, a force acting in the same direction to the threadedly engaging direction (right direction) of the cap N of the goods B, that is, a force for tightening the cap N from the artificial lawn grass 90a. Also, since the goods B slides on the artificial lawn grass 90a, its surface is prevented from being damaged (pressure receiving surface for equally supporting a load is vast) and there can be obtained a favorable slidability of the goods B. Also, the attaching work of the artificial lawn grass 90a to the spiral chute 90 is easy (three-dimensional flexibility of a basic material), and no adverse affection of the boundary line (joint or seam) between the planting body groups appears on the sliding surface.

Although one embodiment of a spiral chute of the present invention, a goods feeding apparatus D using the spiral chute and a mode for feeding the goods B have been described, the present invention is not limited to the embodiment and the mode mentioned. For example, it goes without saying that the spiral chute 90 for transferring the goods B having the cap N threadedly engaged with a threadedly engaging portion comprising a left screw is formed as such that its sliding surface is spiraled in the direction opposite to the threadedly engaging direction of the cap N of the goods B, that is, in the right direction. Also, it goes without saying that the structure and the configuration of the spiral chute 90, the gate 98 or the intermediate gate 95 are not limited to the above-mentioned embodiment unless they are against the function thereof.

Figure 22:
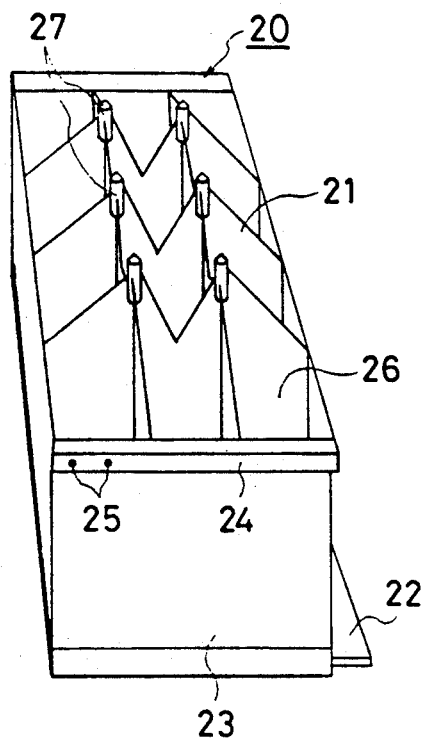
FIG. 22 is a perspective view showing a second embodiment of a goods take-out tool of the present invention.
Figure 23:
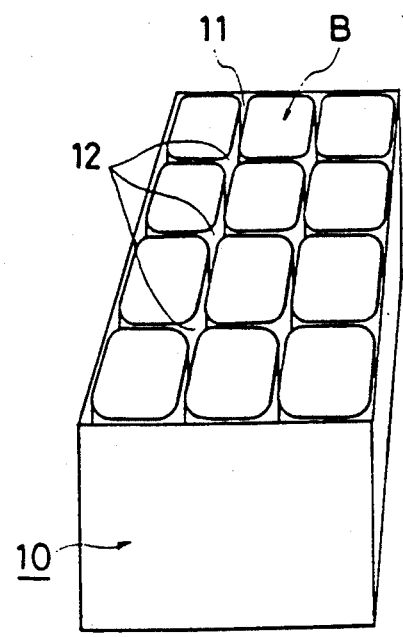
FIG. 23 is a perspective view showing a container with goods contained therein.
Figure 24:
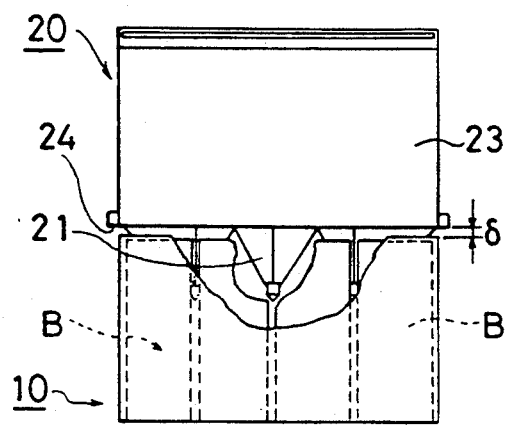
FIG. 24 is a front view showing the goods take-out tool of FIG. 22 which is superposed on the container of FIG. 23 by a superposing device.
Figure 25:
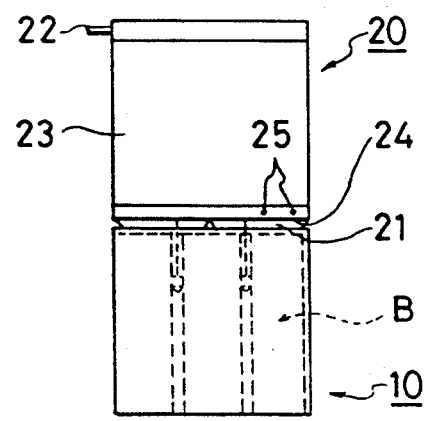
FIG. 25 is a side view of FIG. 24.

Also, the goods take-out tool 20, as shown in FIG. 22 through FIG. 26, is formed as a transferable casing 23 which includes partitions 21 disposed in an intersecting fashion, guide pieces 27 having a conical upper portion, a shutter 22, etc. The partitions 21, like the embodiments shown in FIG. 1 through FIG. 7, project outward from the basic portion 24 along the opening end of the transferable casing 23 of the goods take-out tool 20, and its upper end is of serrate shape in this embodiment. Also, the partition 21 is provided with a guide piece 27 projecting from the tip of the intersecting portion thereof. When the projecting end portion of the partitions 21 and the guide pieces 27, as shown in FIG. 24 and FIG. 25, are to be inverted to the opening portion 11 side of the container 10 to superpose the goods take-out tool 20 on the container 10, firstly, the guide piece 27 of the goods take-out tool 20 is inserted into a space defined by four goods B and successively, the foremost end of the partition 21 is inserted between one of the goods B and another of the goods B (see FIG. 24). Therefore, even if there is a small amount of displacement in centering between the container 10 and the goods take-out tool 20, the partitions 21 are inserted while correctly repositioning the goods B. And, the partitions 21, as shown in FIG. 22, separate the container 10 into goods storing portions 26 each storing one of the goods B according to the arrangement (four lines x three rows) of the goods B stored in the container 10. Also, the shutter 22, like the embodiments shown in FIG. 4 through FIG. 7, is formed of one sheet plate and open-and closably mounted with respect to the basic end portion side of the partition 21 of the goods take-out tool 20 so that all of the goods B can be shifted to the goods drop-out device 80 of the goods feeding apparatus D almost simultaneously. After the goods B are shifted from the goods take-out tool 20 to the goods drop-out device 80, the goods B are discharged onto the spiral chute through the chute 91 according to a picking command and assembled and stored in the same manner as the afore-mentioned embodiments.

Therefore, according to the goods take-out tool 20 of this embodiment, firstly, the guide piece 27 is inserted into the space 12 defined by four goods B of the goods B arranged in a matrix shape within the container 10 and successively, the foremost end of the partition 21 is inserted therein. Therefore, even in case the goods B contained in the container 10 are of generally square column shape as shown in FIG. 23, the goods B can be separated individually without fail. Also, if a space δ of approximately 5 mm is left when the goods take-out tool 20 and the container 10 are superposed as shown in FIG. 24, the goods B can smoothly be shifted to the goods take-out tool 20 from the container 10.

Figure 27:
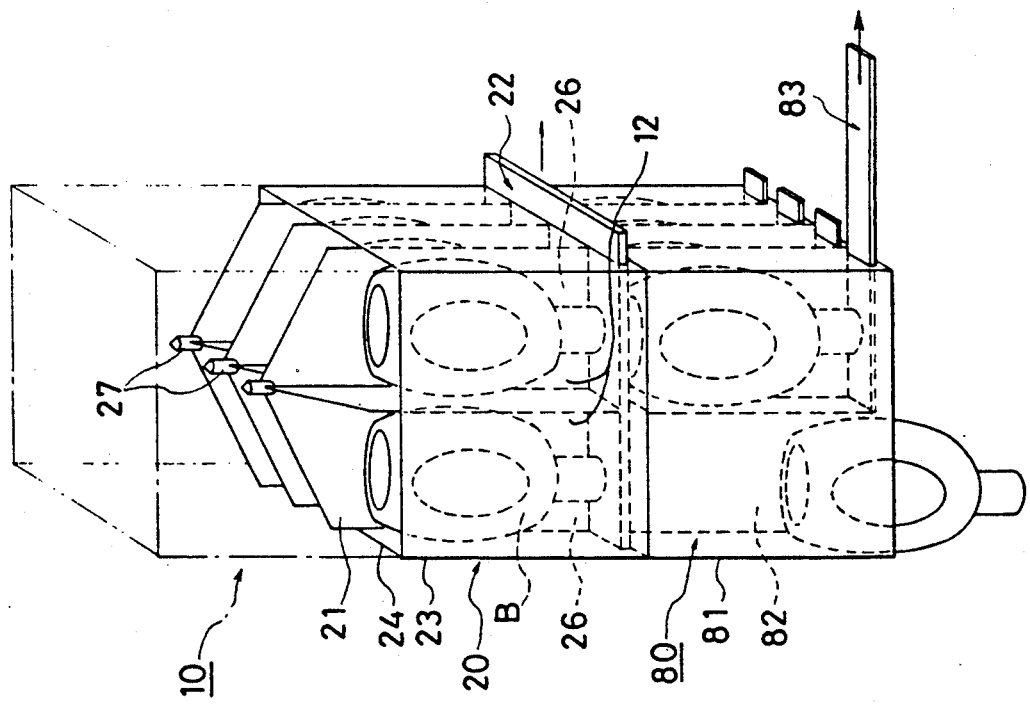
FIG. 27 is a perspective view of a goods take-out tool according to a third embodiment for taking out goods identical with those of FIG. 8 from a container and superposed on a goods drop-out device.

Also, FIG. 27 is a view showing a third embodiment of a goods take-out tool 20, and is a perspective view schematically showing a superposing state between the goods take-out tool 20 for shifting the goods B having a different configuration from that of FIG. 23, i.e., flat-shaped plastic bottles with a cap threadedly secured to its head portion and the goods drop-out device 80, wherein the goods B are being discharged. Since a certain measure of gaps 12 are present at the upper portions (cap side) of the goods B arranged in form of four lines × two rows and stored within the container 10, the arrangement of the goods is apt to be disordered when the container 10 is laterally turned. To prevent this, the partitions 21 of the goods take-out tool 20 are designed in such a manner as to project from the basic portion 24 so that when the goods take-out tool 20 is superposed on the container 10, the foremost end of the partitions 21 and the guide pieces 27 reaches to a lower position than the shoulder portions of each goods B. Therefore, even if the arrangement of the goods B are slightly disordered within the container 10 due to the gaps 12 between the goods B stored in the container 10, the goods B are taken out in an orderly arranged state because when the container 10 is superposed on the good take-out tool 20 for taking out the goods B. Firstly, the guide pieces 27 are inserted into the gaps and successively, the foremost ends of the partitions 21 are inserted therein to correctly rearrange the goods B in their original states and immediately thereafter, the partitions 21 are inserted therein to individually separate the goods B. Therefore, the goods B can be taken out into the transferable casing 23 of the goods take-out tool 20 an individually separated and orderly arranged state.

Figure 26:
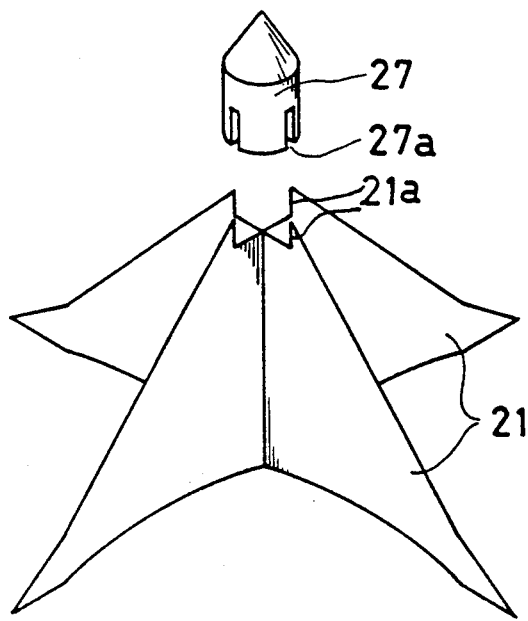
FIG. 26 is a perspective view showing the guide piece of FIG. 22 in its enlarged scale.

The guide piece 27 employed in the second and the third embodiments may extend its lower cylindrical portion to the vicinity of the shutter 22, and the configuration of the upper portion of the guide piece 27 may be of pyramid shape, arrowhead shape (sagittate shape), bullet shape, semispherical shape or the like. Also, the material of the guide piece 27 is not particularly limited. For example, plastics, etc. are preferable. In case the guide pieces 27 are of plastic bullet shape, the guide pieces 27, as shown in FIG. 26, may be each provided at its lower cylindrical portion to be fitted to the intersecting portion of the partitions 21 with grooves 27a corresponding to the respective partitions 21, so that a cut edge portion 21a of the partition 21 can be held by groove 27a thereby to secure the partition 21 to the guide piece 27.

Also, the opening portion 11 of the container 10 may be disposed to a side surface portion of the container 10.

It may be designed as such that the goods B are stored in multistage. Also, the partitions 21 may separate the container 10 as such that each section contains more than two goods B.

Figure 28:
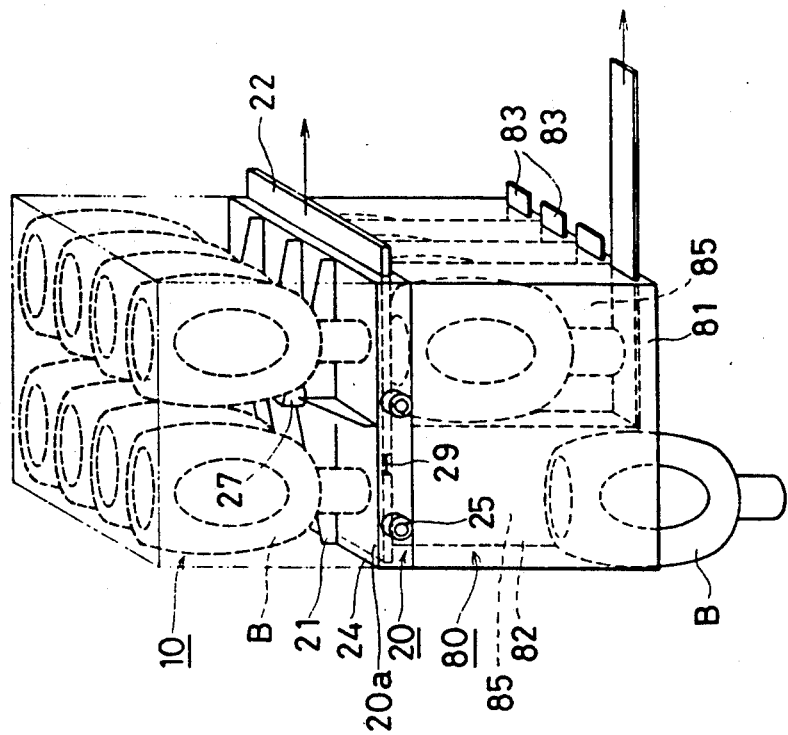
FIG. 28 is a perspective view showing a container with goods contained therein and a goods take-out tool according to a fourth embodiment inverted and superposed on a goods drop-out device.
Figure 29:
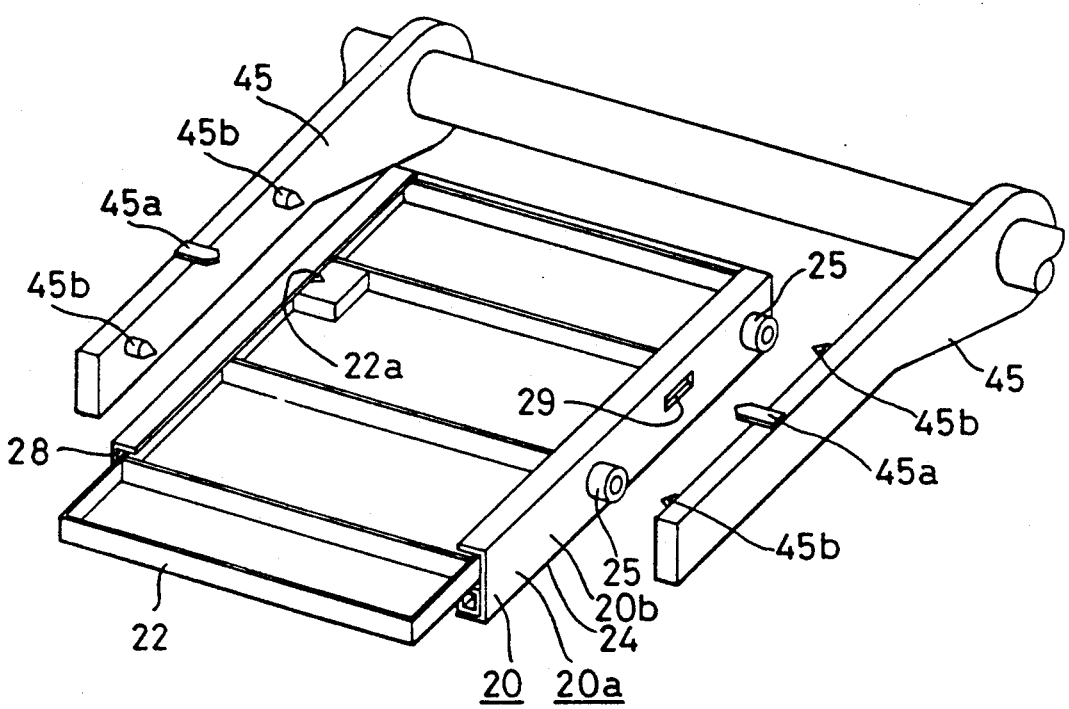
FIG. 29 is a perspective view showing the goods take-out tool and the first holding hand of FIG. 28 in their enlarged scales when they are being inverted in the normal direction.
Figure 30:
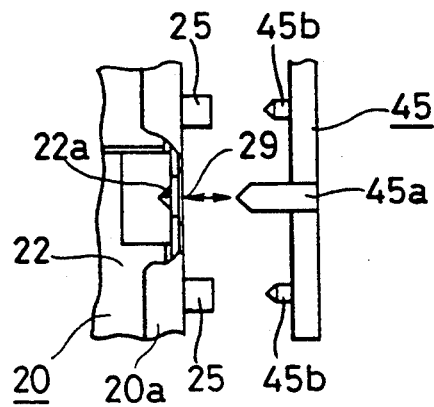
FIG. 30 is an enlarged plan view of an important portion of FIG. 29.

Also, the goods take-out tool 20 of the present invention, as shown in FIG. 28 through FIG. 30, may be omitted with the transferable casing 23 in the above-mentioned embodiments. That is, the goods take-out tool 20 may comprise a goods take-out tool body 20a including partitions 21 disposed in an intersecting state, guide pieces 27 having a conical shaped upper portion, etc., and a shutter 22, the partitions 21 projecting from the basic portion 24 along the opening portion of the goods take-out tool body 20a, the foremost end portion of the partition 21 being of mountain shape. Also, the partition 21 is provided at its intersecting portion with a guide piece 27 as such that the guide piece 27 projects from the foremost end of the partition 21. Also, the goods take-out tool body 20a comprises a framework 20b of a C-shape in section provided with the partitions 21, the guide pieces 27, etc., the framework 20b being formed at its inner side with a groove 28 (see FIG. 29). A pair of opposite side surfaces of the goods take-out tool body 20a are each provided with a cut 29 for permitting a first engaging protrusion 45a of a first holding hand 45, and an engaging recess 25 adapted to engage with a second engaging protrusion 45b of the first holding hand 45. Also, the shutter 22 is formed of one sheet of plate as in the above-mentioned respective embodiments and is slid along the groove 28 of the goods take-out tool body 20b to release the opening portion of the goods take-out tool 20 so that all of the goods B can be shifted to the goods drop-out device 80 of the goods feeding apparatus D almost simultaneously. Also, the opposite side surfaces of the shutter 22 are provided with an engaging recess 22a at position in alignment with the cut 29 of the goods take-out tool body 20a when the shutter 22 is in its closed position, so that the first engaging protrusion 45a of the first holding hand 45 is engaged with the engaging recess 22a. And, when the goods take-out tool 20 and the container 10 is inverted after the container 10 is superposed on the goods take-out tool 20 as shown in FIG. 28, the goods B are separated by the projecting partition 21 and placed on the shutter 22. Therefore, the goods B are taken out into the goods take-out tool 20 in the state as arranged and stored in the container 10 and then wait until they are shifted to the goods drop-out device 80. When a command is issued for shifting the goods B to the goods drop-out device 80, the shutter 22 is released. The goods B contained in the container 10 which has been shifted to the goods drop-out device 80 are discharged onto the spiral chute 90 through the chute 91 for assembling and storing according to a picking command.

And, in connection with the goods take-out tool 20, the first holding hand 45 employed in this embodiment is also different in construction from the above-mentioned embodiments. That is, the first holding hand 45 of this embodiment, as shown in FIG. 29 and FIG. 30, is provided with a first engaging protrusion 45a which is permitted to penetrate the cut 29 of the goods take-out tool body 20a and adapted to engage with an engaging recess 22a formed at the side surface of a shutter 22, and a second engaging protrusion 45b adapted to engaging with an engaging recess 25 formed at the side surface of the goods take-out tool body 20a. Due to the foregoing arrangement, the goods take-out tool body 20a and the shutter 22 can be held by the first holding hand 45 almost simultaneously and without fail. Therefore, the goods take-out tool body 20a is not literally dropped and the shutter 22 is not literally come off during inverting. Also, when the first holding hand 45 is caused to effect an inverting action while holding the goods take-out tool body 20a and the shutter 22 through the cut 29 of the goods take-out tool body 20a almost simultaneously, the shutter 22 will not come off because the shutter 22 is held by the first engaging protrusion 45a of the first holding hand 45.

The engaging recess portion 25 of the goods take-out tool body 20a and the second engaging protrusion 45b of the first holding hand 45 may also be omitted. Also, the first engaging protrusion 45a of the first holding hand 45 may be provided on one first holding hand 45 only. Also, the foremost end of the first engaging protrusion 45a may be of flat shape and the engaging recess 22a may be provided on the shutter 22.

Figure 31:
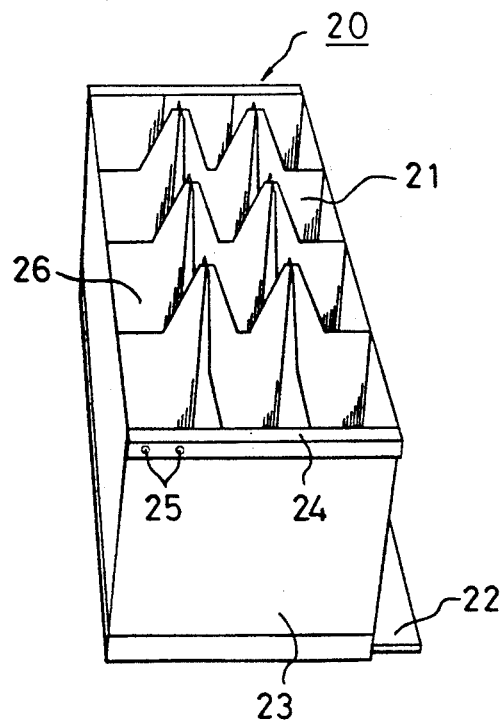
FIG. 31 is a perspective view of a goods take-out tool according to a fifth embodiment.

Also, FIG. 31 is a perspective view showing a fifth embodiment of a goods take-out tool 20. The goods take-out tool 20 of this embodiment is applicable to goods B having a different configuration from that of the goods B shown in FIG. 5, FIG. 8, FIG. 23, FIG. 27 and FIG. 28, and the configuration of the foremost end of the partition 21 is different from those of the above-mentioned embodiments.

Figure 32:
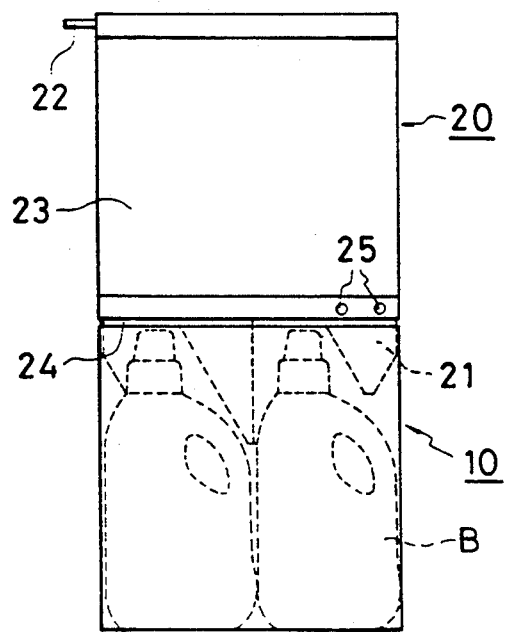
FIG. 32 is a side view of a goods take-out tool which is superposed on a container according to a sixth embodiment.

Also, FIG. 32 is a side view showing a sixth embodiment of a goods take-out tool 20, and is applicable to bottle shaped goods B shown in the figure. The goods take-out tool 20 of this embodiment includes a partition 21 which is alternatively provided at its foremost end with a large serrated protrusion and a small serrated protrusion.

Next, a goods drop-out device forming a goods take-out apparatus of the present invention will be described with reference to the embodiments shown in FIG. 33 through FIG. 36.

Figure 33:
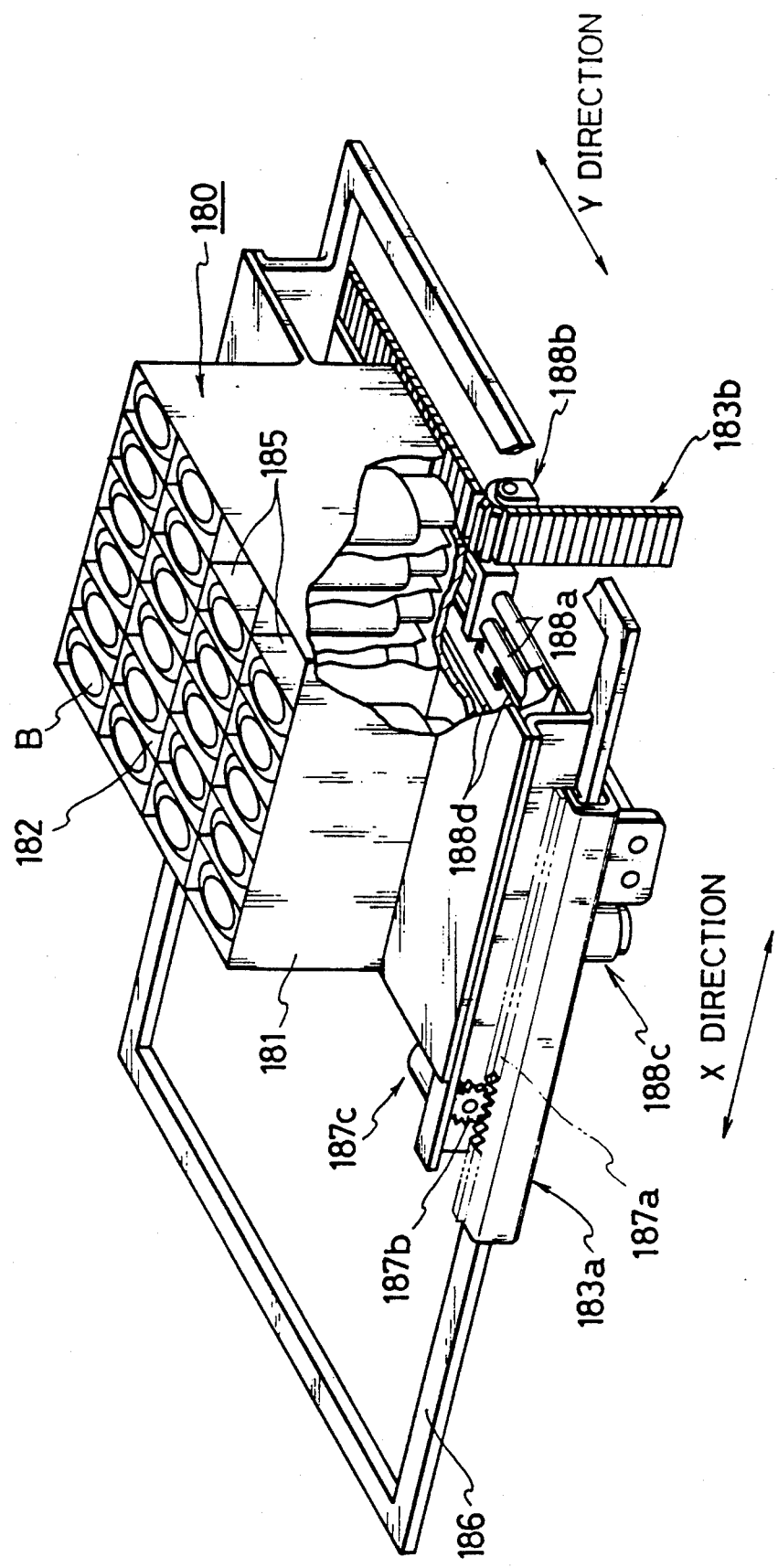
FIG. 33 is a perspective view showing one embodiment of a goods take-out apparatus according to the present invention.
Figure 34:
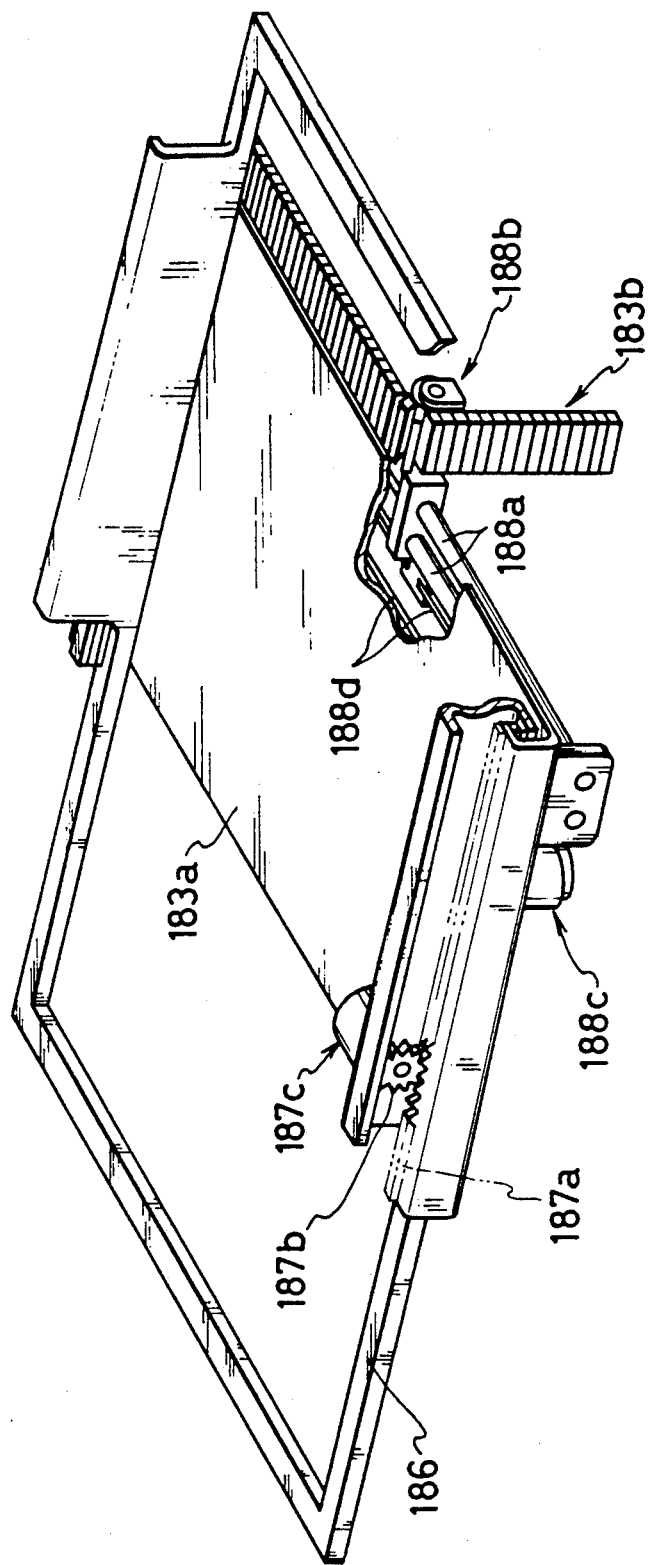
FIG. 34 is a perspective view of FIG. 33 but with a casing omitted therefrom in order to enhance an easy understanding of the construction thereof.

A goods drop-out device 180 of this embodiment, as shown in FIG. 33 and FIG. 34, comprises a casing 181 having a plurality of goods storing portions 185 which are disposed in a matrix (four lines × six rows) shape separated by a partition 182, a shutter 183 consisting of two shutters 183a and 183b, and driving mechanisms 187, 188 for driving the shutters 183a and 183b respectively, the first shutter (plate shutter) 183a being able to move in the line direction (x-direction) whereas the second shutter (caterpillar shutter) 183b being able to move in the row direction (y-direction).

The casing 181 is disposed astride a rectangular rail frame 186. The casing 181 is provided on its under-surface with a plate shutter 183a and a caterpillar shutter 183b in such a manner as to block an opening portion formed at the under-surface of the casing 181. And, the plate shutter 183a can be moved by one row portion at a time in the x-direction, whereas the caterpillar shutter 183b can be moved by one goods storing portion 185 at a time in the y-direction. Thus, the plate shutter 183a is slid in the x-direction by means of a driving force of a servo motor 187c through a pinion 187b meshing with a rack 187a disposed along one side of the rail frame 186 which is secured to the casing 181 as mentioned. Also, by pulse controlling the servo motor 187c, the plate shutter 183a is brought to a position corresponding to the position of one row portion of the opening portion of the goods storing portion 185 to determine the stopping position of the plate shutter 183a. On the other hand, the caterpillar shutter 183b is secured at one end of its catapillar portion to the under-surface of the plate shutter 183a, and the other end thereof is left free. And, the caterpillar portion is supported by a supporting table 188b which is slidable along a guide shaft 188a extending in the y-direction of the casing 181 at a lower side of the plate shutter 183a. The supporting table 188b is moved in the y-direction by the servo motor 188c hauling a wire 188d. In addition, by pulse controlling the servo motor 188c, the stopping position of the supporting table 188b is determined corresponding to position of the opening portion of the goods storing portion 185. Furthermore, by suspending a free end of the caterpillar portion from a portion of the caterpillar portion supported by the supporting table 188b, the opening portions of the goods storing portions 185 are released one by one in the row direction. The caterpillar shutter 183b is juxtaposed in such a manner as to project from one side edge of the plate shutter 183a by a length of one row portion so that the goods B are taken out by each goods storing portion 185 at a time by means of the activation of the supporting table 188b.

Next, one mode for carrying out a goods take-out method of the present invention using the goods take-out apparatus of this embodiment will be described.

Figure 9:
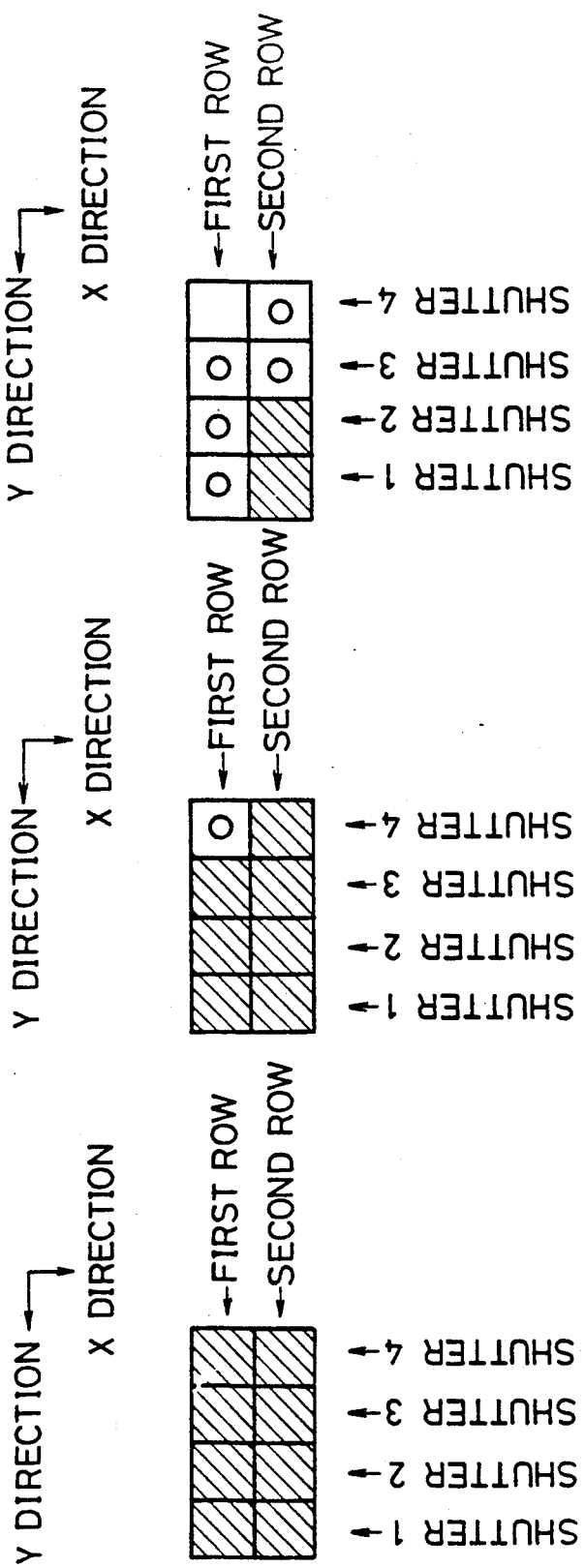
FIG. 9 is a schematic plan view of FIG. 8 for explaining the movement of shutters.

FIG. 35 is a schematic plan view of FIG. 33 showing which position the plate shutter 183a and the caterpillar shutter 183b are moved to based on a total of six pieces of the goods B taken out as in the embodiment of FIG. 8 and FIG. 9. In order to wholly close the opening portions of the goods storing portions 185, the positional coordinate of the shutter 183, when the free end of the caterpillar portion of the caterpillar shutter 183b is located at the external angular portion of the casing 181, is defined as origin O, the moving line direction (x-direction) of the plate shutter 183a is defined as x-axis, and the moving row direction (y-direction) of the caterpillar shutter 183b is defined as y-axis, and the moving direction of the shutter 183 will be described in accordance with this definition. According to this definition, FIG. 35 shows a case where the coordinate of the position to which the plate shutter 183a and the caterpillar shutter 183b are to be moved is (1, 2).

Figure 36A:
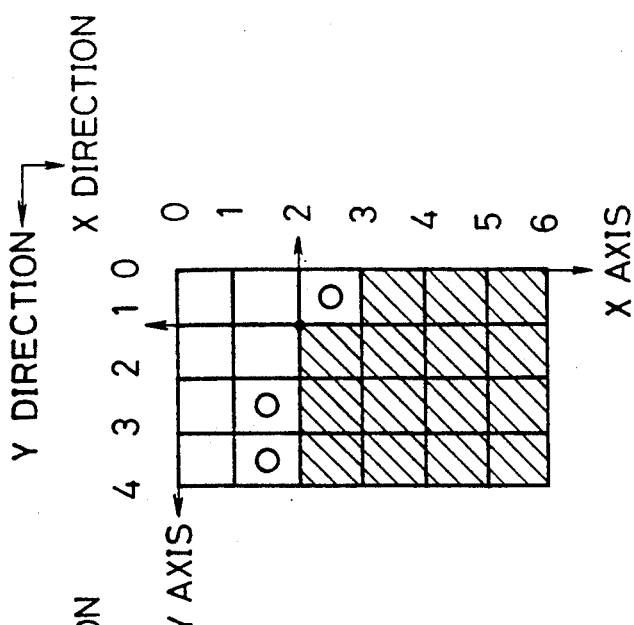
Figure 36B:
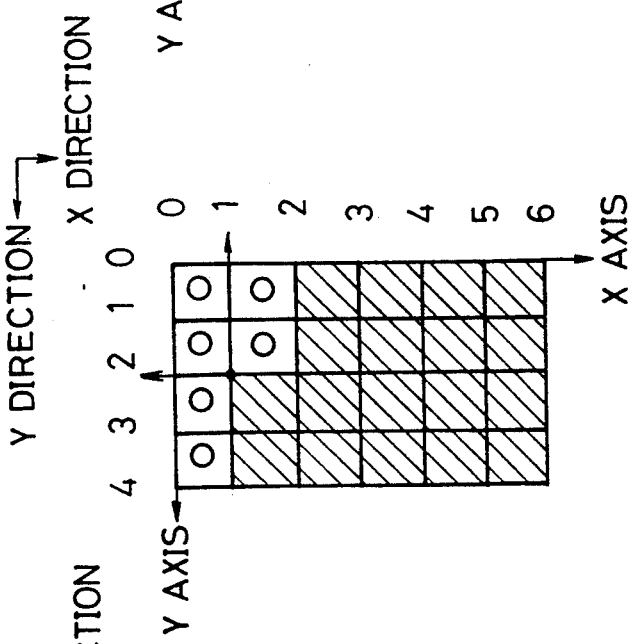
Figure 36C:
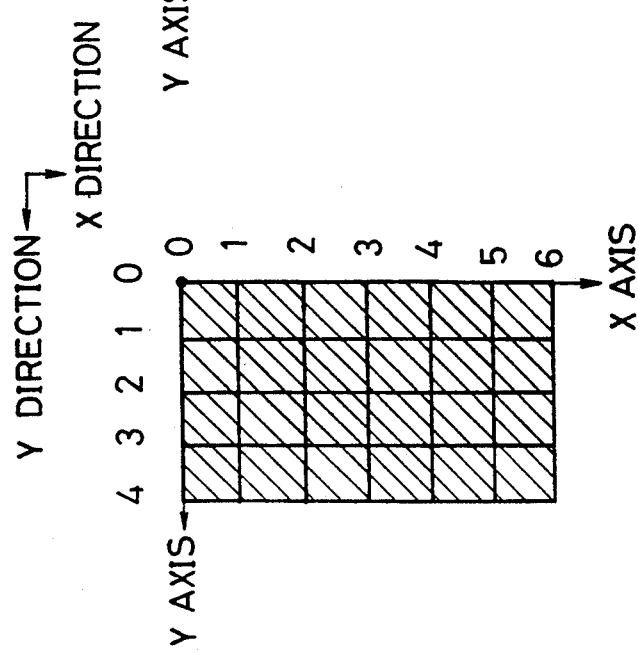

That is, as shown in table 2 as will be listed and FIG. 36a–36c, when six pieces of goods B are taken out in the state where the shutter 183 is wholly closed (shutter 183 is located at position (0, 0) of the origin O, the plate shutter 183a is moved by one row direction in the x-axis direction and at the same time, the caterpillar shutter 183b is moved by two piece portion of the goods storing portion 185 in the y-axis direction, thereby the plate shutter 183a and the caterpillar shutter 183b are moved in order to take out four pieces of goods B corresponding to one row portion and two pieces of the goods B of next on row, thus a total of six pieces of the goods B. That is, the shutter 183 is moved to a position where the positional coordinate of the free end of the caterpillar portion of the caterpillar shutter 183b forming the shutter 183 becomes (1, 2). In this case, the numerical value 12 obtained by converting the total take-out number of six pieces of the goods B in a decimal to a base 4 number corresponding to the line number 4 of this embodiment are coincident with the above-mentioned positional coordinate 1, 2). That is, the x-coordinate of the positional coordinate is coincident with the figure of the higher place of a base 4 number, whereas the y-coordinate is coincident with the figure of the lower place of base 4 number. In three additional pieces of the goods B are to be taken out, that is, in case the total take-out number is nine pieces, the caterpillar shutter 183b is first moved by one row portion within the row of the goods storing portion 185, i.e., by −1 in the y-axis direction to close, and then, the plate shutter 183a is moved by one row portion, i.e., by +1 in the x-axis direction, thereby three pieces of the goods B can be taken out. In this case, the positional coordinate of the free end of the caterpillar portion of the caterpillar shutter 183b is (2, 1), and the respective coordinates are coincident with the numerical number 21 (9 in a decimal number) in base 4 number.

That is, if the total line number in the y-axis direction of the goods storing portion 185 in the casing 181 is represented by n, after the total number of the take-out goods B is converted to n-ary number (base n number) corresponding to the numerical value of the above-mentioned total line number n from a decimal number (base 10 number), the position to which the shutter 183 is to be moved can be calculated with ease according to the total take-out number by regarding the lower place of the n-ary number after conversion as the y-coordinate showing the stopping position of the free end of the shutter, that is, the caterpillar portion of the caterpillar shutter 183b in this embodiment and the higher place (digit) as the x-coordinate. By properly setting a pulse number corresponding to the size of the goods B, goods B of various sizes can be taken out by one kind of the shutter 183 without exchanging the shutter 183 and without changing the location of the shutter 183. In the apparatus of this embodiment as in the case with the goods drop-out device 80 of FIG. 8, by controlling the movement of the shutter 183 according to the total take-out number of the goods B which was converted to an n-ary number from a decimal number, a desired number of the goods B can be taken out correctly and without fail.

The plate shutter 183a or the caterpillar shutter 183b shown in FIG. 33 and FIG. 34 may be driven by a chain.

Figure 37:
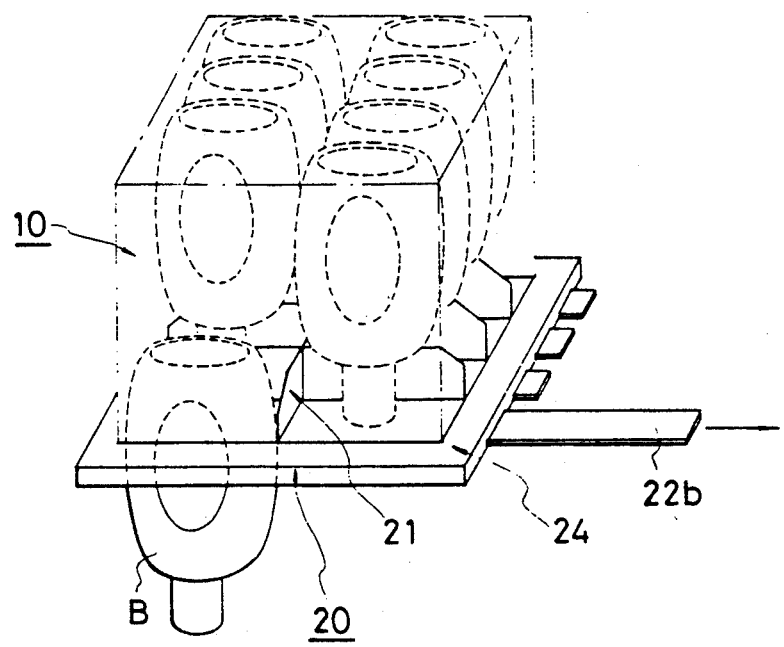
FIG. 37 is a perspective view showing another embodiment of the goods take-out tool.

FIG. 37 is a perspective view showing another embodiment of the goods take-out tool 20. The goods take-out tool 20 of this embodiment is provided with a shutter 22b able to take out the goods B one by one. By employing the goods take-out tool 20 of this embodiment, the goods take-out method of the present invention can be carried out without the goods drop-out tool 80.

Figure 38:
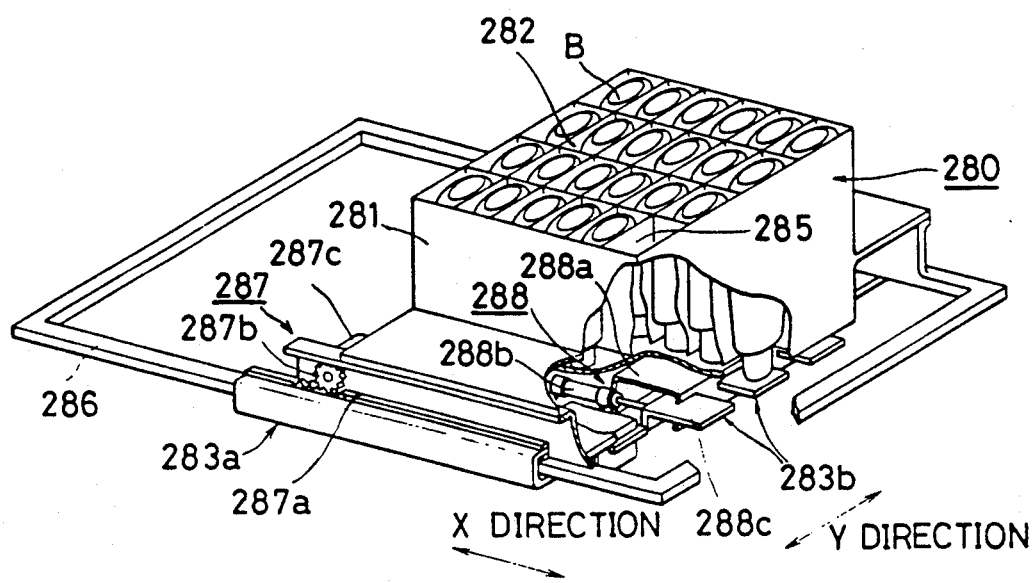
FIG. 38 is a perspective view showing a goods take-out apparatus according to a second embodiment.
Figure 39:
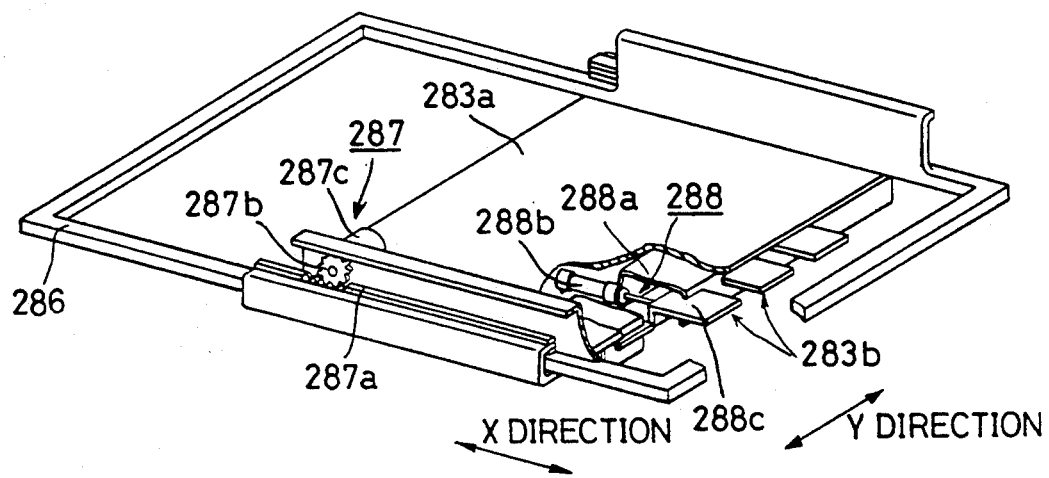
FIG. 39 is a perspective view of FIG. 38 but with a casing omitted therefrom in order to enhance an easy understanding of the construction thereof.

Also, a goods take-out apparatus (goods drop-out device) 280 of the present invention will now be described with reference to FIG. 38 and FIG. 39. FIG. 38 is a perspective view showing the goods drop-out device 280, and FIG. 39 is a perspective view in which a casing 281 is omitted so that the structure of the goods drop-out device 280 of FIG. 38 can be understood more easily. The goods drop-out device 280, as shown in FIG. 38, is adapted to store therein the goods B which were shifted from the goods take-out tool 20 (not shown) and discharged one by one. The goods drop-out device 280 is fixedly located on a chute 91 for guiding the goods B onto a spiral chute 90. And, the goods drop-out device 280 includes partitions 282 for individually separating the goods B in such a manner as to correspond to the partitions 21 of the goods take-out tool 20, a casing 281 provided with a plurality of goods storing portions 285 defined by the partitions 282 in a matrix (four lines x six rows) shape, a first shutter (plate shutter) 283a and a second shutter (discrete shutter) 283b for opening and closing the goods storing portions 285, and a first driving mechanism 287 for driving the plate shutter 283a and a second driving mechanism 288 for driving the discrete shutter 283b. The plate shutter 283a is formed of a plate having a width of generally four line portions and is able to move in the line direction (x-direction of FIG. 38). The discrete shutter 283b is formed of a plate having a width of generally one line portion and is provided with four discrete shutters respectively corresponding to each of the goods storing portions 285 in the row direction (y-direction of FIG. 38), the discrete shutter 283b being able to move in the x-direction individually. Also, the goods drop-out device 280 is provided on its upper end with a guide plate 84 (see FIG. 3) adapted to guide the goods take-out tool 20 as such that the goods take-out tool 20 can smoothly be superposed on the goods drop-out device 280.

The casing 281 is disposed astride a rectangular rail frame 286. The casing 281 is provided on its under surface with the plate shutter 283a and the discrete shutter 283b which are disposed in such a manner as to block an opening portion formed at the under surface of the casing 281. The plate shutter 283a and the discrete shutter 283b are integrally and relatively movably and can be moved in the x-direction by generally one row portion at a time. Thus, the plate shutter 283a is slid in the x-direction by the driving force of the servo motor 287c through the pinion 287b meshing with the rack 287a disposed along one side of the rail frame 286 which is secured to the casing 281 as mentioned, and by pulse controlling the servo motor 287c, the stopping position of the plate shutter 283a is determined in such a manner as to correspond to the position of one row portion of the opening portion of the goods storing portion 285. On the other hand, the discrete shutter 283b can be moved reciprocally in the x-direction from one side edge of the plate shutter 283a by a length of a generally one row portion. That is, the plate shutter 283a is provided on its reverse surface with a channel-like guide frame 288a disposed in the y-direction and with an air cylinder 288b mounted in such a manner as to be perpendicular to the inner side surface of the guide frame 288a. Further, the air cylinder 288b is provided with the discrete shutter 283b mounted on the tip of a rod thereof. And, by the activation of the air cylinder 288b, the rod is reciprocally moved and as a result, the discrete shutter 283b penetrating a guide hole 288c formed in the external side surface of the guide frame 288a is individually and reciprocally moved.

The goods B, which have been shifted to the goods storing portions 285 defined in a matrix shape consisting of four lines x six rows within the goods drop-out device 280 of this embodiment (see FIG. 38), are discharged by each goods storing portion 285 at a time and dropped on the chute 91 by the movement of the plate shutter 283a and the discrete shutter 283b for opening and closing the opening portion of the goods storing portion 285 in the line direction (x-direction). When all of the goods B have sequentially been discharged from the goods drop-out device 80, the shutter 22 of the goods take-out tool 20 is immediately released so that all of the goods B stored in the goods take-out tool 20 are automatically shifted to the goods drop-out device 280.

In this embodiment, when the goods B are to be automatically taken out of the goods drop-out device 280, the goods B which have been shifted to the goods drop-out device 280 are sequentially taken out in the following manner. That is, after converting the total number of the goods taken out to a base 4 number from a base 10 number according to a desired number of the goods B according to a picking command, the plate shutter 283a and the discrete shutter 283b are moved in the line direction (x-direction) as shown, for example, in FIG. 40 according to figures shown in a base 4 number converted, more particularly, to figures of each place of the base 4 number, and a desired number of the goods B are sequentially taken out.

FIG. 40 is a schematic plan view of FIG. 38 showing what position the plate shutter 283a and the discrete shutter 283b are moved to in case the total take-out number of the goods B taken out of the goods drop-out device 280 is six pieces. And, in order to wholly close the opening portion of the goods storing portions 285, when all of four pieces of the discrete shutter 283b are in position for closing the goods storing portions 285 (position where all of the discrete shutters are projected), that is, when the right foremost end portion of the plate of the rightmost discrete shutter 283b is positioned at the external angular portion of the casing 81, if, as in the same case of the afore-mentioned goods take-out apparatus 180, the line direction (x-direction) for the plate shutter 283a and the discrete shutter 283b to move to is defined as x-axis and if a direction perpendicular thereto, that is, the row direction (y-direction) is defined as y-axis by serving the positional coordinate of the shutter 283 comprising the plate shutter 283a and the discrete shutter 283b as origin O, FIG. 40 shows the coordinate (1, 2) of the position where the plate shutter 283a and the discrete shutter 283b should be moved to.

That is, as shown in table 2 as will be listed and FIG. 36, in case six pieces of the goods B are to be taken out from the state where the shutter 283 are wholly closed (the shutter body 283 are located at the origin O position (0,0) the plate shutter 283a is moved by one row portion in the x-axis direction and at the same time, the rightmost discrete shutter 283b and the next discrete shutter 283b next from the rightmost, thus two pieces of the discrete shutter 283b in total, are moved in such a manner as to be opened (the discrete shutter 283b is retreated). By this, the plate shutter 283a and two pieces of the discrete shutter 283b are moved in the x-direction respectively so that four pieces of the goods B corresponding to one row portion and two pieces of the goods B belonging to the next one row, thus six pieces of the goods B in total, are taken out. That is, the shutter 283 is moved until the positional coordinate of the right foremost end of the plate of the rightmost discrete shutter 283b among the third and the fourth discrete shutters 283b from the right which are in projecting state. In this case, the FIG. 12 obtained by converting the total take-out number of six pieces of the goods B in a decimal number to a base 4 number corresponding to the line number 4 of this embodiment and the afore-mentioned positional coordinate (1, 2) are coincident with each other. That is, the x-coordinate of the positional coordinate is coincident with a figure of a higher place of a base 4 number, whereas the y-coordinate is coincident with a figure of a lower place of a base 4 number.

Furthermore, in case three more pieces of the goods B are taken out, that is, in case the total take-out number is nine pieces, the second discrete shutter 283b from the right is first projected to close the corresponding goods storing portion 285 and then, the plate shutter 283a is further moved by one row portion, thereby three pieces of the goods B are taken out. In this case, the positional coordinate of the right foremost end of the plate of the discrete shutter 283b is (2, 1) and the respective coordinates are coincident with the FIG. 21 (9 in a decimal number) in base 4 number.

That is, if the total line number in the y-axis direction of the goods storing portion 285 in the casing 281 is represented by n, after converting the total number of the goods B which are to be taken out is converted to a n-ary number corresponding to the total line number n, the position for the shutter 283 can be easily calculated. The plate shutter 283a and the discrete shutter 283b are moved according to the total take-out number by serving the lower place of the n-ary number converted as the y-coordinate showing the position of the right foremost end of the plate of the discrete shutter 283b which is in projecting state and the higher place thereof as the x-coordinate. The plate shutter 283a and the discrete shutter 283b are moved in accordance with the figures of each place which were obtained by calculation. By properly setting a pulse value corresponding to the size of the goods B to the servo motor 287c and by adjusting the mounting position of the guide frame 288a, the goods B having various sizes can be taken out by one kind of the plate shutter 283a and the discrete shutter 283b without exchanging the plate shutter 283a and the discrete shutter 283b and without changing the arrangement thereof. Therefore, a desired number of the goods B can be taken out correctly and without fail by controlling the movement of the plate shutter 283a and the discrete shutter 283b in accordance with the total take-out number of the goods B which was converted to an n-ary number from a decimal number as in the above-mentioned embodiments.

In the embodiments shown in FIG. 38 through FIG. 40, instead of providing the fourth (the leftmost) discrete shutter 283b from the right, there may be provided a fixed plate. That is, the number of the discrete shutters (the second shutters) 283b may be one piece less than the line number of the goods storing portion 285. In this case, if, for example, the goods B stored in the fourth line (the leftmost) from the right are to be taken out by one piece only, it may be designed as such that the rightmost discrete shutter 283b through the third discrete shutter 283b from the right are be projected to close the corresponding goods storing portions 285 and then, the plate shutter 283a is moved by the row portion. That is, the plate shutter 283a is opened by one row portion, thereby to take out the goods B from the proper goods storing portion 285 by one piece.

Next, a third embodiment of a goods take-out apparatus of the present invention will be described with reference to FIG. 41 and FIG. 42.

Figure 41:
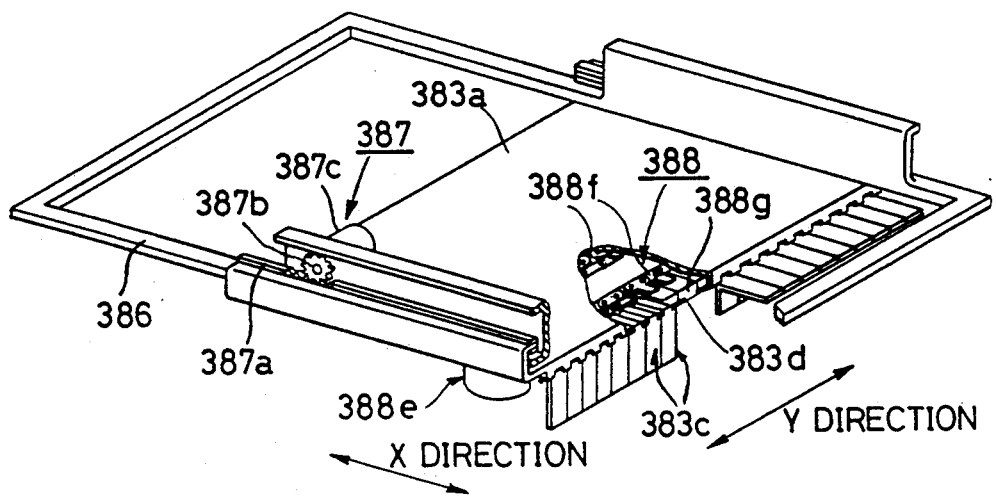
FIG. 41 is a perspective view corresponding to FIG. 39 showing a goods take-out apparatus according to a third embodiment.
Figure 42:
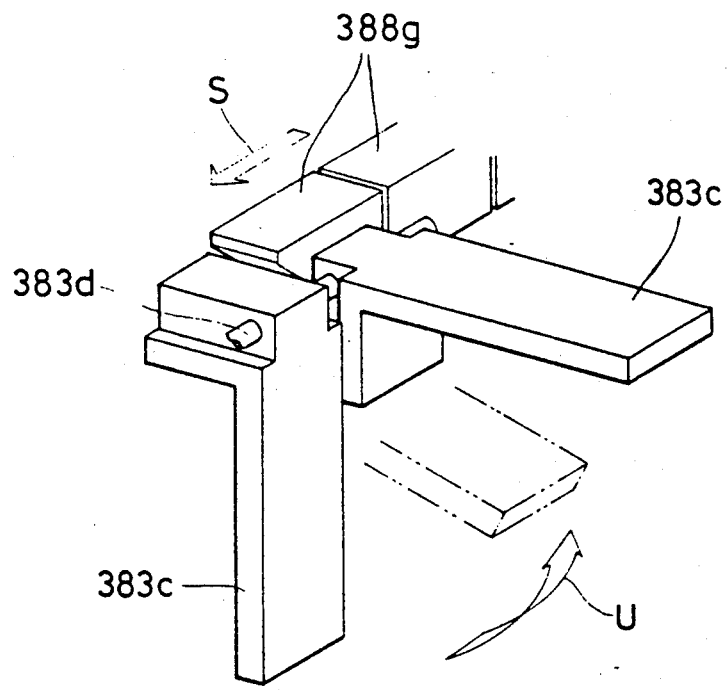
FIG. 42 is a perspective view of a second shutter and a dog thereof in their enlarged scales.

FIG. 41 is a perspective view corresponding to FIG. 39 showing a goods take-out apparatus (goods drop-out device) 380 which is different from that of FIG. 38. FIG. 42 is a perspective view showing a second shutter 383c and a dog 388g thereof in enlarged scale. The goods drop-out device 380, as shown in FIG. 41 and FIG. 42, is provided with a second shutter 383c which is of different structure from that of FIG. 38. That is, the first shutter (plate shutter) 383a is capable of moving in the line direction (x-direction) as in the same case with the goods drop-out device 380 of FIG. 38, and a larger number of the keyboard-shaped second shutters (keyboard shutter) 383c than the line number is provided. The keyboard shutters 383c are pivotally supported on the under-surface of the plate shutter 383a through a shaft 383d. The keyboard shutters 383c are pivoted about the shaft 383d by approximately 90° through the dog 388g mounted on an endless chain 388f which is turned in the row direction (y-direction) by a servo motor 388 and is projected by a length of a generally one row portion in the x-direction from one side edge of the plate shutter 383a. By pulse controlling the servo motor 388e, the dog 388g is moved to a predetermined position and the keyboard shutters 383c are pivoted by a predetermined quantity to open and close the opening portion of the desired goods storing portions 385. Also, since the tip of the dog 388g is formed in bow shape, when the dog 388g is moved in the direction as shown by an arrow S of FIG. 42, one piece of the keyboard shutter 383c formed in an L-shape is pushed down with the tip of the dog 388g. As a result, the other piece is lifted up in the direction as shown by an arrow U of FIG. 42 to close the opening and closing portion of the goods storing portion 385. Also, in case that the opening portion of the goods storing portion 385 is to be opened, the dog 388g may be moved in the direction opposite the arrow S of FIG. 42. Since there are provided more keyboard shutters 383c than the line number of the goods storing portion 385, the opening portion of the goods storing portion 385 can be closed by a plurality of keyboard shutters 383c according to the size of the opening portion of the goods storing portion 385. Thus, by properly setting the pulse value to the servo motor 388e according to the size of the goods B, the goods B having various sizes can be taken out by one kind of the keyboard shutter 383c without exchanging the keyboard shutter 383c and without changing the arrangement thereof.

The plate shutters 283a, 383a of FIG. 39 and FIG. 41 may be driven by a chain.

It goes without saying that in the above-mentioned various embodiments, any direction may be taken as the line and any direction may be taken as the row in the matrix-shaped arrangement of the goods storing portions 285, 385.

Figure 43:
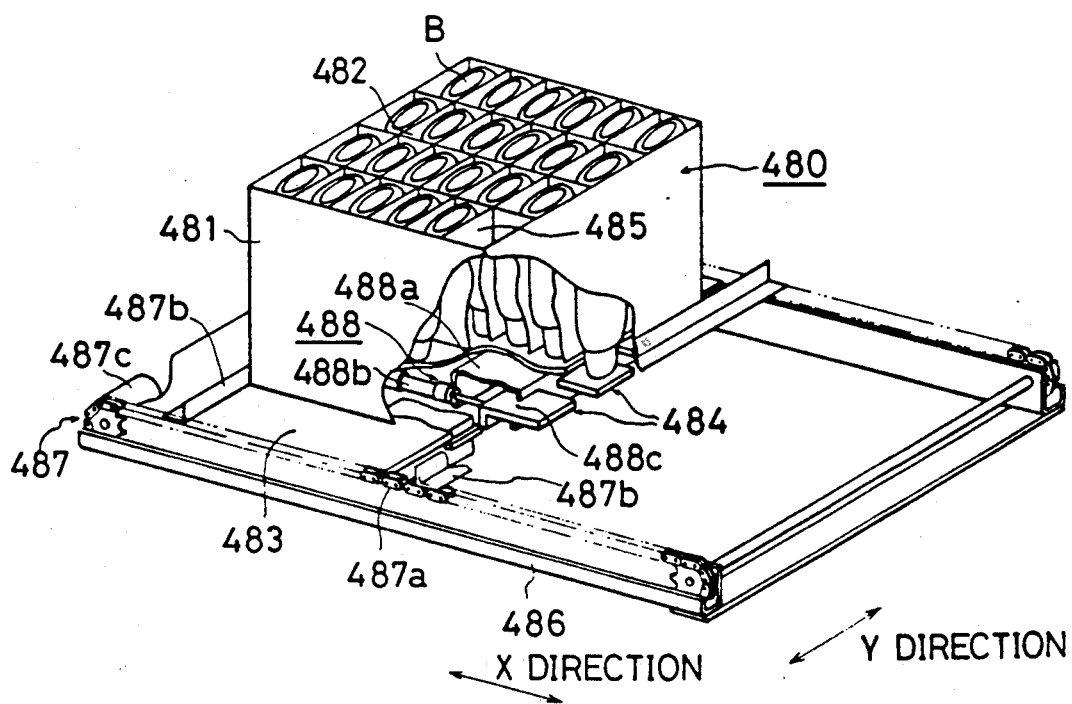
FIG. 43 is a perspective view showing a goods take-out apparatus according to a fourth embodiment.

Another goods take-out apparatus (goods drop-out device) 480 used in the present invention, as shown in FIG. 43, comprises a goods storing device (casing) 481 having a plurality of goods storing portions 485 which are defined in a matrix shape, a closing member (plate) 483 fixedly located in such a manner as to close an opening portion of the casing 481, a shutter 484 able to open and close the opening portion mounted on the plate 483 per each goods storing portion 485, and a driving mechanism 487 for driving the casing 481, the casing 481 being moved along the plate 483 by the driving mechanism 487.

That is, the goods drop-out device 480 of this embodiment, as shown in FIG. 43, stores therein the goods B which were shifted from the goods take-out tool 20 (not shown) and discharges one by one. The goods drop-out device 480 is fixedly located on an upper portion of a chute 91 which is adapted to guide the goods B to a spiral chute 90. And, the goods drop-out device 480 comprises partitions 482 for individually separating the goods B to correspond to the partitions 21 of the goods take-out tool 20, a goods storing device (casing) 481 having a plurality of goods storing portions 485 which are defined in a matrix shape (four lines x six rows) by the partitions 482, a closing member (plate) 483 for closing an opening portion of the casing 481, a shutter 484 able to open and close the opening portion mounted on the plate 483 per each goods storing portion 485, a driving mechanism 487 for driving the casing 481, and an opening and closing mechanism 488 for opening and closing the shutter 484. The plate 483 has an area of a portion consisting of generally four lines x six rows. Also, the shutter 484 comprises a small plate having a width of a generally one line portion and is provided with four shutters 484 corresponding to the respective goods storing portions 485 and is moved reciprocally from the y-direction end of the plate 483 to the x-direction end thereof per each shutter 484. Also, a guide plate 84 (see FIG. 3) adapted to smoothly superpose the goods drop-out device 480 on the casing 481 is erected from a rectangular frame 486. Also, the casing 481 is moved on the upper surface of the plate 483 along the plate 483 by the driving mechanism 487 mounted on the frame 486. Also, the plate 483 is fixedly located on an upper end portion of the chute 91 through the frame 486. The casing 481 receives a driving force of the servo motor 487c through an endless chain 487a mounted on the frame 487 fixedly located on the chute 91 and is slidedly moved on the plate 483 in the x-direction, and the stopping position thereof is determined corresponding to a position of one row portion of the opening portion of the casing 481 by pulse controlling the servo motor numeral. 487b denotes a mounting metal piece for connecting the casing 481 to the endless chain 487a. On the other hand, the shutter 484 is reciprocally movable by a length of a generally one row portion in the x-direction from one side edge of the plate 483. That is, the plate 483 is provided with a channel-like guide frame 488a arranged on the reverse surface of the plate 483 in the y-direction. An air cylinder 488b is mounted in such a manner as to perpendicular to the inner side surface of the guide frame 488a. Furthermore, the cylinder 488b is provided on the tip of its rod with the aforementioned shutter 484. By activation of the air cylinder 488b, the rod is reciprocally moved to reciprocally and separately move the shutter 484 penetrating a guide hole 488c formed in the external side surface of the guide frame 488a.

Therefore, the goods B, which were shifted from the goods take-out tool 20 respectively to the goods storing portions 485 (see FIG. 43) defined in a matrix shape consisting of four lines × six rows within the goods drop-out device 80, are discharged by each goods storing portion 485 at a time according to the movement of the casing 481 and the shutter 484 in the line direction (x-direction) and dropped on the chute 91. When all of the goods B have been taken out subsequently from the goods drop-out device 480, the casing 481 is moved to a position (the right upper portion of the casing 481 to the position of the origin O in FIG. 44) where the casing 481 and the goods take-out tool 20 are superposed, and successively, the shutter 22 of the goods take-out tool 20 is released to permit all of the goods B contained in the goods take-out tool 20 to be automatically shifted to the goods drop-out device 480.

In this embodiment, when the goods B are to be automatically taken out of the goods drop-out device 480, the goods B shifted to the goods drop-out device 480 are taken out by a desired number at a time according to a picking command by moving the casing 481 and the shutter 484 in the line direction (x-direction).

Figure 44:
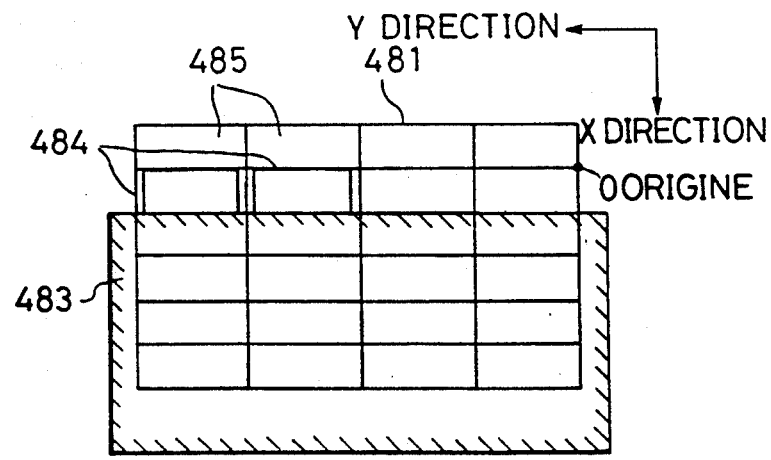
FIG. 44 is a schematic plan view showing the moving states of the casing and the shutters of FIG. 43.

FIG. 44 is a schematic plan view of FIG. 43 showing what part of the position the casing 481 and the shutter 484 are moved to in case the total take-out number of the goods B taken out of the goods drop-out device 480 is six pieces. That is, in case the goods B are taken out by six pieces, the casing 481 is moved by one row portion in a direction opposite the x-direction and the rightmost shutter 484 and the shutter next therefrom. Thus, shutters 484 in total, are moved in such a manner as to be opened (the shutters 484 are retreated), thereby four goods B corresponding to one row portion and two goods B of the next row, thus six goods B in total, are taken out.

Furthermore, in case three more goods B are to be taken out, that is, in case the total take-out number is nine pieces, the second shutter 484 from the right is first caused to project to close the corresponding goods storing portion 485, and then, the casing 481 is further moved by one row portion in a direction opposite the x-direction. Three goods B can thereby be taken out.

In the goods drop-out device 80, for example, in FIG. 44, a fixed small plate may be provided instead of the fourth (the leftmost side) shutter 848 from the right. The shutter 484 may be provided with one piece less than the line number of the goods storing portion 485. In this case, in the state where the goods B stored in the first through the third lines from the right are already taken out for example, in case that the goods B stored in the fourth line (the leftmost side) from the right are taken out by one piece only, the right most shutter 383 through the third shutter from the left may be projected to close the corresponding goods storing portions 485 and then, the casing 481 may be moved by one row portion in a direction opposite the x-direction. That is, the casing 481 may be opened by one row portion, thereby the goods B are taken out by one piece from the corresponding goods storing portion 485.

Also, the shutter 484 may be directly mounted on the frame 486 instead of being mounted on the plate 483.

Also, the casing 481 may be driven by a rack and a pinion.

Next, there will be described one embodiment of the goods transfer apparatus A which is used when an empty container discharging conveyor 100 is disposed at a lower part of the storing facilities C.

Figure 45:
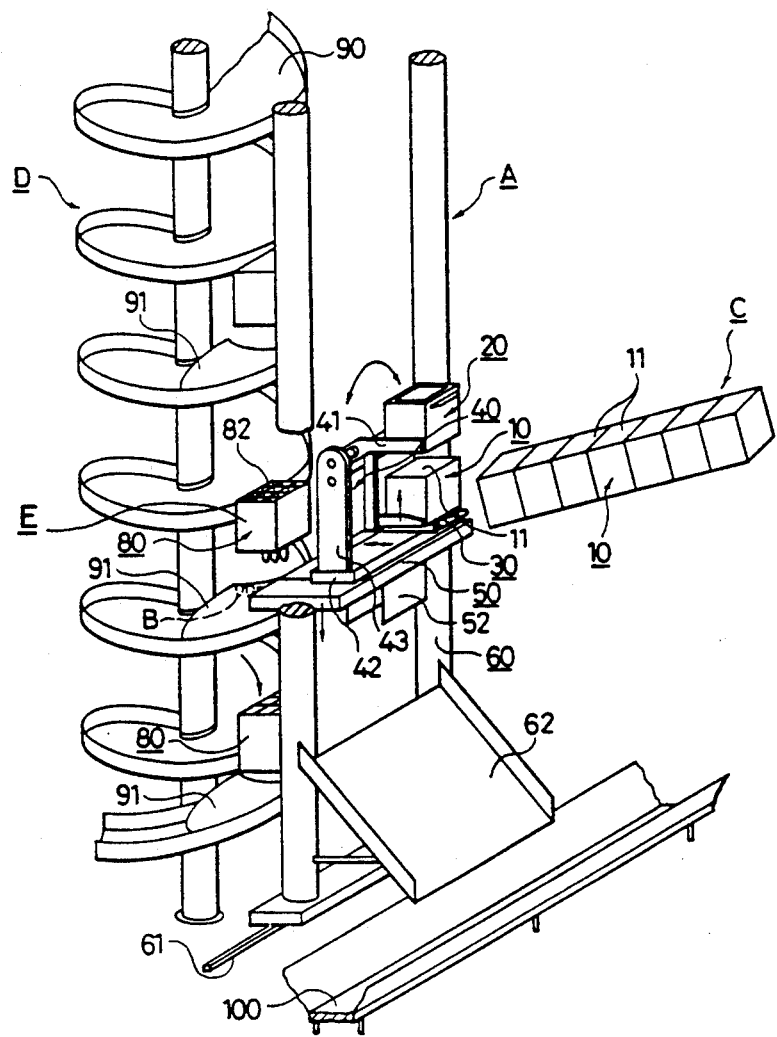
FIG. 45 is a perspective view showing a goods shifting apparatus to which a transfer apparatus according to the present invention is applied.
Figure 46:
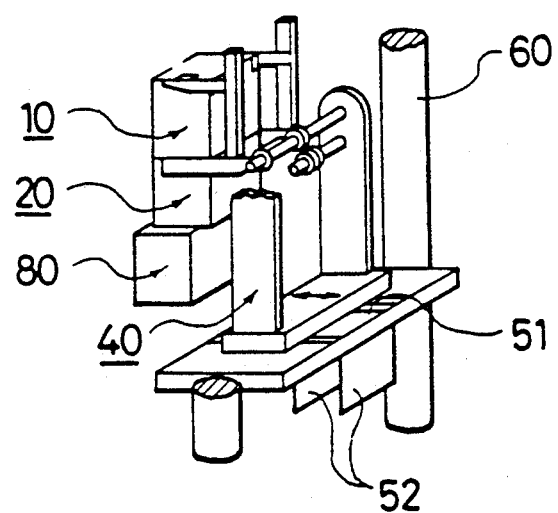
FIG. 46 is a perspective view showing a container and a goods take-out tool inverted to a goods drop-out device side by an inverting apparatus of a transfer apparatus.
Figure 47:
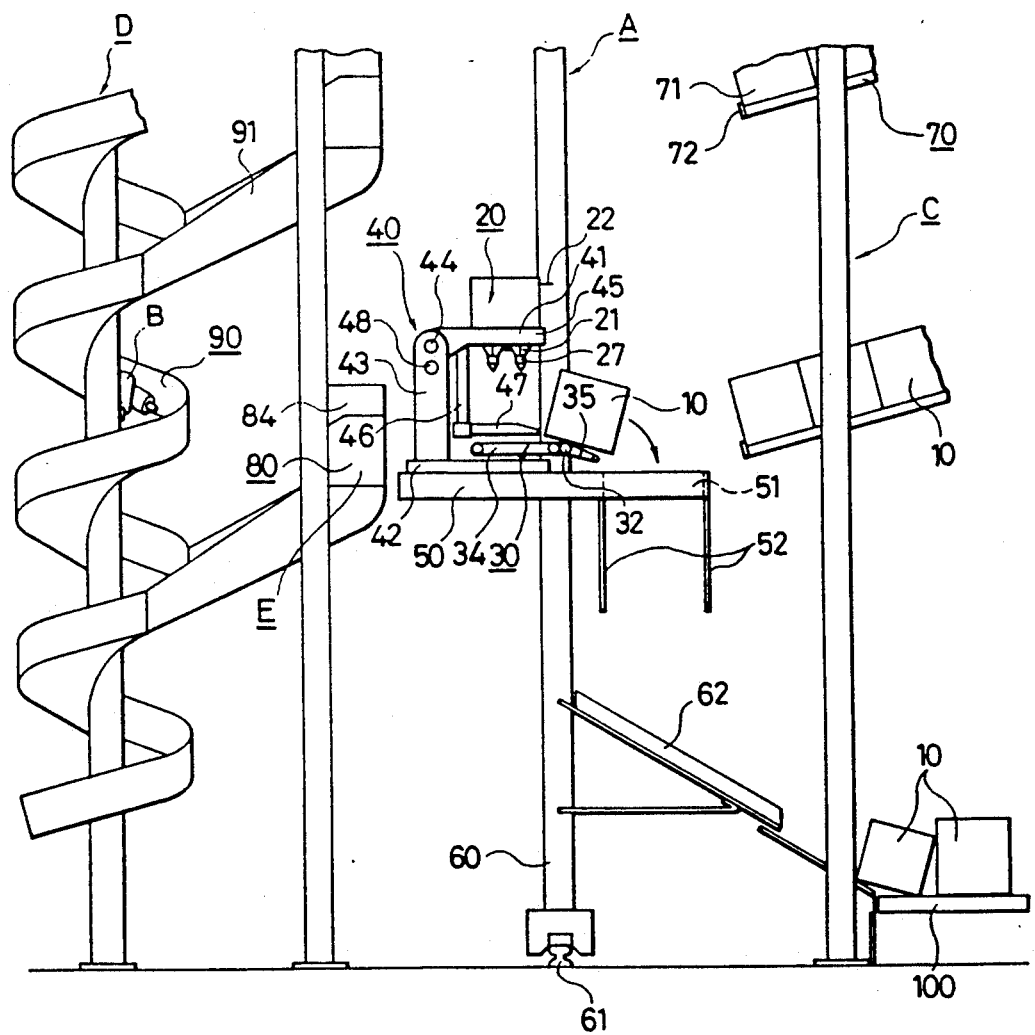
FIG. 47 is a side view of FIG. 45.

The goods transfer apparatus A of this embodiment, as shown in FIG. 45 and FIG. 47, is designed as such that a container 10 containing therein the goods B is taken out from the storing facilities C for storing the goods B stored in the container 10 and transferred to the goods take-out apparatus E and only the goods B contained in the container 10 are shifted. The empty container 10 is taken out from the goods take-out apparatus E side again and the empty container 10 is discharged onto the empty container discharging conveyor 100. The goods transfer apparatus A is disposed between the storing facilities C and the goods feeding apparatus C as in the same case of FIG. 1 and FIG. 3. The goods feeding apparatus D of this embodiment is provided with a spiral chute 90 which is spiraled in a direction opposite that of the afore-mentioned one.

The goods transfer apparatus A, like the afore-mentioned various embodiments, comprises a goods take-out tool 20, a container transfer device (container take-out device) 30 for transferring (taking out) a container 10 from storing facilities C, an inverting device 40 including a superposing device 41 adapted to superpose the goods take-out tool 20 and the container 10 with each other, a traveling table 42 with the container take-out device 30 and the inverting device 40 mounted thereon and being able to travel toward the storing facilities C, a carriage 50 movably carrying the traveling table 42, and a stacker crane 60 for vertically movably supporting the carriage 50. The traveling table 42 and the stacker crane 60 are moved in directions generally perpendicular to each other, and the carriage 50 is formed therein with a through-hole 51 as a passage for drop discharging the container 10 therethrough.

Also, a gravity flow rack 70 of the storing facilities C, like one previously described, comprises inclination conveyors of a multirow and a multistage, and an inclined front end thereof is formed with a take-out compartment 71. Also, the inclination conveyor is provided on its front end portion with a stopper 72 so that the container 10 fed is slid down the inclination conveyor by its own weight. An empty container discharging conveyor 100 is disposed in a space formed at a lower portion of the gravity flow rack 70. The empty container 10 taken out onto the container take-out device 30 by the inverting device 40 mounted on the carriage 50 is dropped into the through-hole 51 by the reversely rotating container take-out device 30, i.e., conveyor 34 and a tilt conveyor 35 tilted downward and is drop discharged onto the empty container discharging conveyor 100 from the through-hole 51 via the guide plates 52, 52 and the chute 62, and is then conveyed to a downstream processing process (not shown) by the empty container discharging conveyor 100.

Therefore, according to this embodiment, when the goods B contained in the goods take-out tool 20 have been shifted to the goods drop-out device 80, according to the stacker crane 60 and the vertical reciprocal movement of the carriage 50, the inverting device 40 is caused to travel to a position opposite the empty container 10 and the goods take-out tool 20, and at the same time, the distance of the first holding hand 45 of the inverting device 40 is moved to a position slightly wider than the width of the goods take-out tool 20 and the distance of the second holding hand 47 is moved to a position slightly wider than the width of the container 10. Thereafter, the traveling table 42 is moved to the goods drop-out device 80 side. At this time, since the inverting device 40 is already waiting facing the goods drop-out device 80 side, it is not necessary to invert the inverting device 40 prior to the taking-out of the empty container 10 and the goods take-out tool 20. As described in the foregoing, when the inverting device 40 is caused to advance to the goods drop-out device 80 side to bring the opened first and second holding hands 45 and 47 to the external side of the engaging recess 25 of the goods take-out tool 20 and the external side of the container 10 respectively, the first holding hand 45 and the second holding hand 47 are closed to hold the empty container 10 and the goods take-out tool 20 respectively. After the first holding hand 45 and the second holding hand 47 are rotated clockwise by approximately 10° in the side view of FIG. 47, the traveling table 42 is moved forward toward the gravity flow rack 70. After the first holding hand 45 and the second holding hand 47 are further rotated clockwise by approximately 170° in that state, the traveling table 42 is moved backward again to the end portion of the goods drop-out device 80 side, thereby to make appearance of the through-hole 51 provided in the traveling passage of the traveling table 42 as shown in FIG. 47. And, upon opening of the second holding hand 47, the empty container 10 is released onto the conveyor 34 and conveyed to the through-hole 51 by the conveyor 34 and the tilt conveyor 35 which are being driven in the discharging direction. Then, the empty container 10 is dropped onto the chute 62 guided by the guide plates 52, 52 and discharged onto the empty container discharging conveyor 100 via the chute 62. When the empty container 10 has been discharged, the goods transfer apparatus A is activated in the same manner as in the afore-mentioned embodiment to shift the container 10 from the storing facilities C to the goods take-out apparatus E.

When the container 10 is to be taken out of the gravity flow rack 70, a plurality of containers 10 may be taken out simultaneously and after the plurality of containers 10 taken out is shifted to the goods drop-out device 80 simultaneously, the plurality of empty containers 10 may be discharged simultaneously.

Also, the chute 62 for discharging the empty container 10 may be disposed at the empty container discharging conveyor 100 side. Also, the empty container discharging conveyor 100 may be disposed at a lower part of the through-hole 51.

According to the goods transfer apparatus A of this embodiment, as described above, since a container having the opening portion 11 containing the goods B such as a corrugated fiberboard box, a plastic container, etc. can be picked out of the storing facilities and the empty container 10, which is still in position where the goods B have been taken out therefrom, can be discharged at that position, the empty container 10 can be discharged with high efficiency and the overall transferring capacity can be greatly increased. In case that the take-out compartment 70 and the goods drop-out device 80 are not opposite each other, after the empty container 10 is taken out, the empty container 10 may be discharged during the movement of the stacker crane 60 to the desired take-out compartment 70. Also, by providing the guide plate 52 at the lower side of the through-hole 51 and by providing the chute 62 to the stacker crane 60, the container 10 can be discharged more safely.

Figure 49:
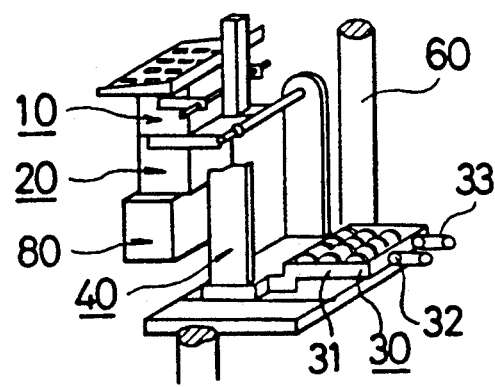
FIG. 49 is a perspective view showing a container and a goods take-out tool inverted to a goods drop-out device side by an inverting device of a goods shifting apparatus.
Figure 48:
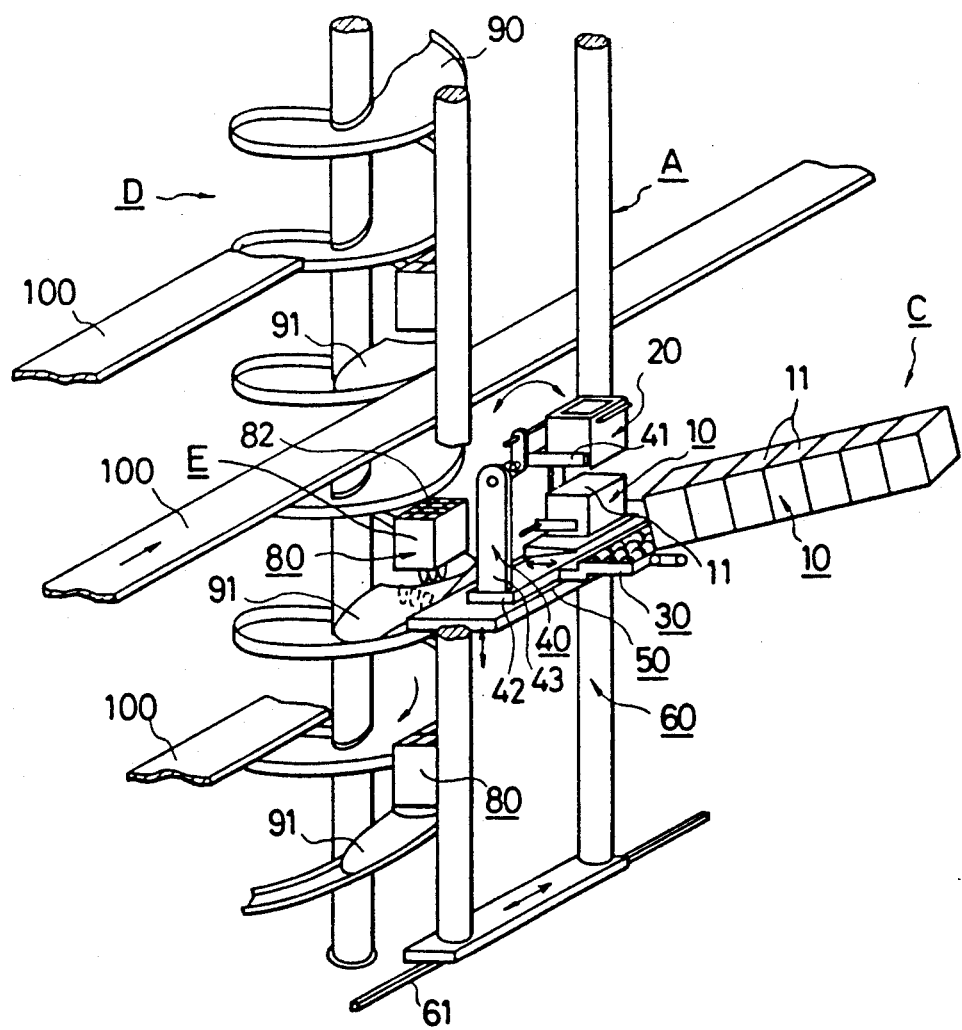
FIG. 48 is a perspective view showing another goods shifting apparatus according to the present invention.
Figure 50:
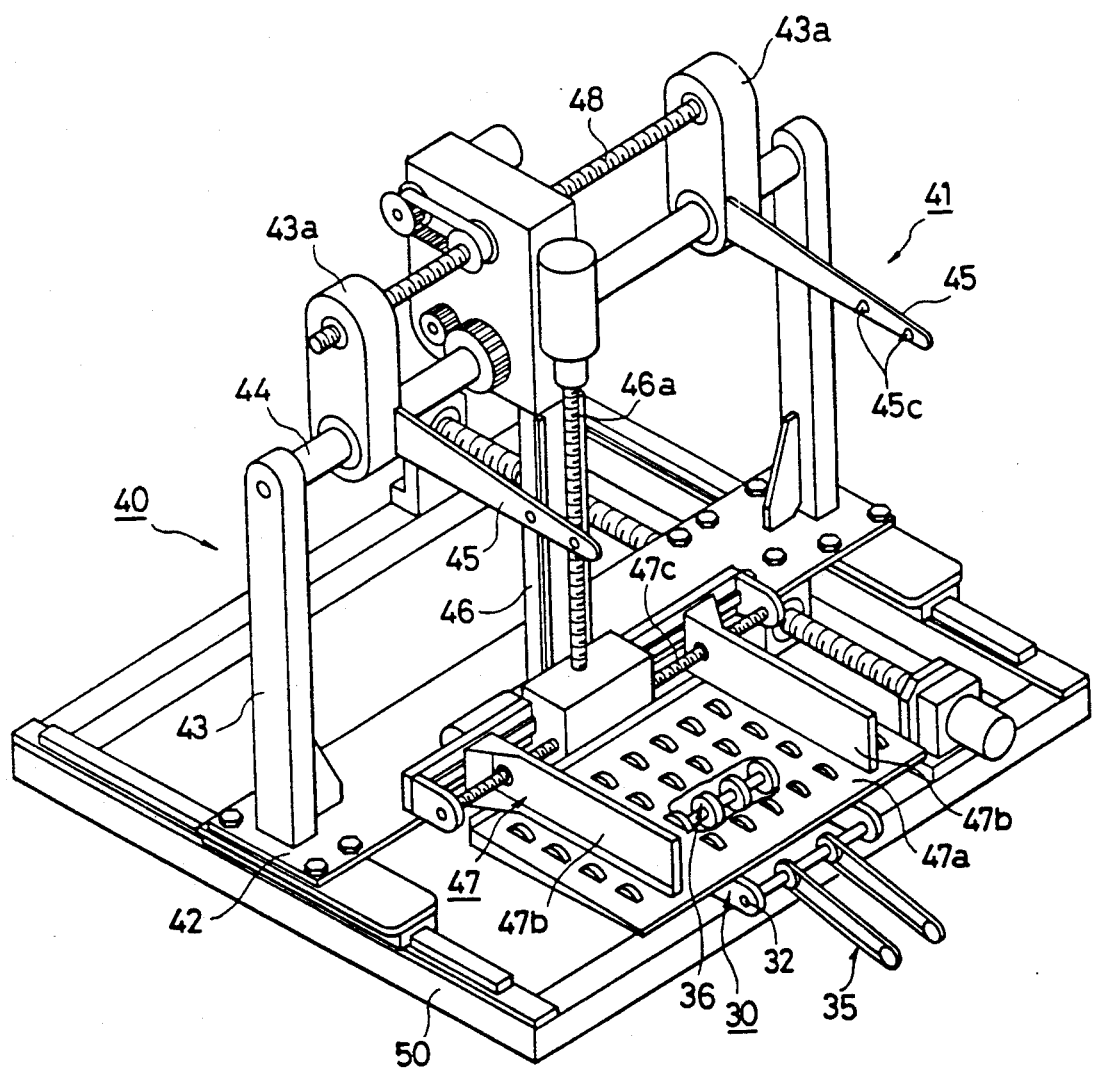
FIG. 50 is a perspective view, partly broken, for showing an inverting device.

Also, by making the structure of the goods transfer apparatus A of the above-mentioned various embodiments as those shown in FIG. 48 through FIG. 50, the goods B can be shifted safely without disordering the storing state of the goods B within the container 10.

That is, as shown in FIG. 48, the goods transfer apparatus A of this embodiment is designed as such that, as in the above-mentioned various embodiments, the container 10 containing the goods therein is taken out of the storing facilities C and then only the goods B within the container 10 is shifted to the goods take-out apparatus E. The goods transfer apparatus A of this embodiment is disposed between the storing facilities C and the goods feeding apparatus D.

The inverting device 40 comprises a traveling table 42 which can travel on the carriage 50 of the stacker crane 60 in the flowing direction, i.e., in the forward and backward direction with reference to the gravity flow rack 70, of the container 10 stored on the gravity flow rack 70, a frame 43 erected on the traveling table 42, a rotary shaft 44 supported in the vicinity of the upper end of the frame 43, a first holding hand being opened and closed in the axial direction (hereinafter referred to as the "right and left direction") to hold the goods take-out tool 20, a guide member 46 hanging down in the direction of approximately 90° clockwise with respect to the hanging direction of the first holding hand 45 about the axis of the rotary shaft 44 from a position slightly offset toward the foremost end side of the first holding hand 45 from its basic end, and a second holding hand 47 being moved upward and downward along the guide member 46 while holding the container 10 and superposing the container 10 on the goods take-out tool 20 held by the first holding hand 45. Of these, the first and the second holding hands 45, 47 and the guide member 46 form the superposing device 41, and the inverting device 40 integrally pivot the superposing device 41 about the rotary shaft 44. Also, the first and the second holding hands 45, 47 are vertically attached to the rotary shaft 44 through the arms 43a, 43a so as to be rotated together with the rotary shaft 44. Also, between the pair of arms 43a, 43a, the screw shaft 48, that is, the screw shaft 48 being provided at one side from its center with a right screw and at the other side therefrom with a left screw, extends in parallel with the rotary shaft 44, so that the distance between the pair of arms 43a, 43a is expanded and contracted by means of the activation of the screw shaft 48, thereby to open and close the pair of first holding hands 45, 45. Also, the first holding hand 45 is provided at its inner side with an engaging protrusion 45c adapted to engage with an engaging recess formed in the vicinity of the basic portion 24 of both sides of the opening end of the goods take-out tool 20 so that the first holding hand 45 can hold the goods take-out tool 20 safely and without dropping it during the inverting. Also, the second holding hand 47 comprises a container receiving table 47a formed of a perforated plate for supporting the bottom surface of the container 10 in its generally flat shape, a pair of holding plates 47b, 47b being able to move in the right and left direction above the container receiving table 47a, and a screw shaft 47c for opening and closing the holding plate 47b, 47b, that is, the screw shaft 47c being formed at one side from its center with a right screw and at the other side therefrom with a left screw, the holding plates 47b, 47b being moved in the right and left direction until they form a desired holding distance for holding the container. Also, when the container receiving table 47a is located at the lowering terminal, a wheel of a wheel conveyor 36 is inserted into a hole portion of the container receiving table 47a and projected from the hole portion. Also, the guide member 46 is provided with a screw shaft 46a therealong. Due to the foregoing arrangement, the actuation of the screw shaft 46a causes the second holding hand 47 to be moved upward and downward along the guide member 46 so as to superpose the container 10 on the goods take-out tool 20.

Therefore, according to the present invention, by means of the traveling of the stacker crane and the upward and downward movement of the carriage 50, the inverting device 40 is moved to a desired position and the container take-out device 30 is caused to take out the container 10 stored in a desired take-out compartment 71. That is, when the carriage 50 of the stacker crane 60 is stopped at a desired position, the traveling table 42 is moved forward toward the take-out compartment 71 and the tilt conveyor 35 is pivoted upward at its container take-out side about a pivotal point 32 to take out one piece of the container 10 and convey it to a predetemined position of the wheel conveyor 36. At this time, since the container receiving table 47a is located at the lowering terminal beforehand, the container receiving table 47a is located beneath the container 10 conveyed.

Thereafter, when the second holding hand 47 is moved upward to the centering position along the guide member 46, that is, when the upper surface of the container receiving table 47a is moved upward to position higher than the upper surface formed by the wheel conveyor 36, the container 10, while being carried at its bottom surface in its generally flat shape, is held at the side surfaces thereof for centering by the holding plates 47b, 47b which are closed to a predetermined distance by means of the actuation of the screw shaft 47c. After centering, the second holding hand 47 is moved upward along the guide member 46 to lift the container 10 held by it upward to the vicinity of the basic portion 24 of the goods take-out tool 20 and stopped with the foremost end of the partitions 21 projecting downward from the basic portion 24 and the guide member 27 being inserted into the container 10. Therefore, since the container 10 is carried and supported at its bottom surface by the container receiving table 47a in its generally flat shape, the partitions 21 can smoothly be inserted into the opening portion 11 of the container 10 without disordering the storing state of the goods B stored within the container 10.

The container receiving table 47a may be formed in a comb teeth shape and a plurality of chain conveyors instead of the wheel conveyor 36 may be disposed adjacent to the gaps between the comb teeth.

Also, the container take-out device 30 may be disposed independently on the carriage 50 instead of providing it on the traveling table 42, so that it can be traveled independently from the traveling table 42.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

each of the rows and columns in the take-out tool having a single shutter provided therebelow, the shutters being independently operable for sequential discharge of the goods.

3. The goods take-out apparatus as recited in claim 1, wherein the goods take-out tool comprises a transferable casing provided with the partitions, the casing having an upper edge and a lower edge, the movable shutter being located proximate to the lower edge and the partitions extending above the upper edge thereof, the partitions above the upper edge of the casing being insertable into the container to maintain orientation of the goods during movement of the good from the container to the take-out tool.

4. The goods take-out apparatus as recited in claim 3, wherein an edge of the partitions above the upper edge of the casing is generally flat except at chamfered portions thereof on outer sides facing the upper edge of the casing.

5. The goods take-out apparatus as recited in claim 3, wherein longitudinal and transverse portion sections are provided to form the partitions, each longitudinal section intersecting at least one transverse section of the partitions at corners thereof, the take-out tool having apexes at the corners and further having guide pieces on each of the apexes.

6. A goods take-out apparatus comprising a plurality of goods storing portions disposed in a matrix shape, first shutter means and second shutter means for open-

TABLE 1

| taken-out number | total taken-out number | | position of shutter 83 | | | | state of shutter 83 |
|---|---|---|---|---|---|---|---|
| | decimal number | base 4 number | No. 1 | No. 2 | No. 3 | No. 4 | |
| — | 0 | 0 | 0 | 0 | 0 | 0 | see FIG. 9 (hatching portion is closed) |
| 1 | 1 | 1 | 1 row | 0 | 0 | 0 | see FIG. 9 (hatching portion is closed) |
| 5 | 6 | 12 | 2 rows | 2 rows | 1 row | 1 row | see FIG. 9 (hatching portion is closed) |

TABLE 2

| taken-out number | total taken-out number | | coordinate of shutter 183 (283) (x, y) | state of shutter 183 (283) |
|---|---|---|---|---|
| | decimal number | base 4 number | | |
| — | 0 | 0 | (0, 0) | see FIG. 36 (hatching portion is closed) |
| 6 | 6 | 12 | (1, 2) | see FIG. 36 (hatching portion is closed) |
| 3 | 9 | 21 | (2, 1) | see FIG. 36 (hatching portion is closed) |

What is claimed is:

1. A goods take-out apparatus for taking out a predetermined number of goods from a container containing a plurality of goods, said apparatus comprising:
   a goods take-out tool including partitions for separating the goods contained in the container according to the storing states thereof, the goods being provided in a plurality of rows and columns in the take-out tool; and
   shutter means for sequentially taking out a desired number of goods one by one by receiving the goods separated by the goods take-out tool and thereafter releasing the goods one by one.

2. The goods take-out apparatus as recited in claim 1, wherein the shutter means comprises a plurality of shutters positioned beneath the goods take-out tool, one of ing and closing an opening portion of the goods storing portions, the opening portion being beneath an end of the goods and the goods being sequentially removed when the portion therebelow is opened, and driving mechanisms for driving the first shutter means and the second shutter means respectively, one of said first and second shutters means being movable in a line direction and the other being movable in a row direction, movement of first and second shutter means allowing the goods to be removed one by one and one good being completely removed from the goods storing portions before a subsequent good is removed.

7. A goods take-out apparatus comprising a plurality of goods storing portions disposed in a matrix shape, a first shutter for opening and closing an opening portion of the goods storing portions and a second shutter mounted on the first shutter, and driving mechanism for driving the first shutter and the second shutter respectively, the first and second shutters being movable in generally a same direction, the second shutter being relatively movable with respect to the first shutter.

8. A goods take-out apparatus comprising a plurality of goods storing portions disposed in a matrix shape, a first shutter for opening and closing an opening portion of the goods storing portions and a second shutter mounted on the first shutter, and driving mechanisms for driving the first shutter and the second shutter respectively, the first and second shutters being generally movable in a line direction, a larger number of the second shutter than the number of the line of the goods storing portions being provided.

9. A goods take-out apparatus comprising a goods storing device including a plurality of goods storing portions disposed in a matrix shape, a blocking member fixedly located so as to close an opening portion of the goods storing device, a driving mechanism for driving the goods storing device along the blocking member, and shutter means integrally mounted on the blocking member for opening and closing the opening portion of the goods storing device at a position where the goods storing device is moved by the driving mechanism to thereby sequentially remove goods one by one.

10. A goods take-out apparatus comprising:
a goods take-out tool including partitions for separating a plurality of goods into a predetermined number of rows and columns, the goods take-out tool receiving the plurality of goods from a container, the goods take-out tool having a movable shutter on a lower side thereof, the shutter being movable between an open and closed position, the goods being discharged from the goods take-out tool when the shutter is in the open position; and
a goods drop-out device having a first side, the goods drop-out device receiving the plurality of goods through the first side thereof from the take-out tool when the shutter is moved to the open position, the goods drop-out device further comprising discharge means for releasing the goods from the goods drop-out device, the goods being released through a second side, the second side being opposed to the first side of the goods drop-out device.

11. The goods take-out apparatus as recited in claim 10, wherein longitudinal and transverse partition sections are provided to form the partitions, each longitudinal section intersecting at least one transverse section of the partitions at corners thereof, the take-out tool having apexes at the corners and further having guide pieces on each of the apexes.

12. The goods take-out apparatus as recited in claim 11, wherein an outer periphery of the goods take-out tool is generally open such that the partitions can be generally completely inserted in the container.

13. The goods take-out apparatus as recited in claim 10, wherein longitudinal and transverse partition sections are provided to form the partitions, each longitudinal section intersecting at least one transverse section of the partitions at corners thereof, cone shaped sections being formed at each corner by the longitudinal and transverse partitions, the cone shaped sections being generally flat on an upper side thereof to form a frustum shape.

14. The goods take-out apparatus as recited in claim 10, wherein longitudinal and transverse partition sections are provided to form the partitions, at least one of the longitudinal and transverse partition sections having an extension formed thereon which is alternatively provided at a foremost end with a large serrated protrusion and a small serrated protrusion.

15. The goods take-out apparatus as recited in claim 10, wherein the goods drop-out device comprises a casing for storing the goods in a matrix fashion, the casing being mounted on the discharge means, the discharge means comprising a plate shutter and an eject shutter, both the plate shutter and casing being movable.

16. The goods take-out apparatus as recited in claim 15, wherein the plate shutter is movable in a first direction and the eject shutter is movable in a second direction, the first and second directions being different directions.

17. The goods take-out apparatus as recited in claim 15, wherein the casing has a plurality of first direction storing positions and a plurality of second direction storing positions due to the matrix fashion of goods storage, the plate shutter being movable in a first direction by increments of one storage position and the shutter being movable in a second direction by increments of one storage position to thereby sequentially expose the goods in the storage positions and thereby discharge the goods one by one from the second side of the goods drop-out device.

18. The goods take-out apparatus as recited in claim 17, wherein the eject shutter is a caterpillar shutter, the caterpillar shutter being secured at one end to the plate shutter and the other end thereof is free, a supporting table being provided beneath the caterpillar shutter, the supporting table being reciprocable in the second direction to close the second side of the goods drop-out device with the caterpillar shutter between the supporting table and the end of the caterpillar shutter secured to the plate shutter.

19. The goods take-out apparatus as recited in claim 17, wherein the eject shutter is formed of a plurality of discrete shutters each having a width of generally one storage position, the discrete shutters extending across the plate shutter and being independently movable to thereby open and close the second side of the goods drop-out device beneath one row of goods, the plate shutter being movable in a first direction to thereby position the discrete shutters beneath successive rows of goods.

20. The goods take-out apparatus as recited in claim 17, wherein the eject shutter is formed of a plurality of keyboard shutters, more keyboard shutters being provided than storage positions in a single row, the keyboard shutters being pivotable to thereby open and close the second side of the goods drop-out device beneath one row of goods, the plate shutter being movable in a first direction to thereby position the keyboard shutter beneath successive rows of goods.

21. The goods take-out apparatus as recited in claim 20, wherein the keyboard shutters are pivotably connected to the plate shutter by a shaft, a dog being mounted on an endless chain at an end of the keyboard shutters adjacent the plate shutter, the dog being reciprocable in a transverse direction to thereby sequentially pivot the keyboard shutters by engagement and disengagement of the ends of the keyboard shutters with the dog.

22. The goods take-out apparatus as recited in claim 15, wherein the casing is movable relative to the plate shutter.

* * * * *